(12) United States Patent
Delgado et al.

(10) Patent No.: US 11,568,620 B2
(45) Date of Patent: Jan. 31, 2023

(54) AUGMENTED REALITY-ASSISTED METHODS AND APPARATUS FOR ASSESSING FIT OF PHYSICAL OBJECTS IN THREE-DIMENSIONAL BOUNDED SPACES

(71) Applicant: SHOPIFY INC., Ottawa (CA)

(72) Inventors: Byron Leonel Delgado, Ottawa (CA); Daniel Beauchamp, Toronto (CA); Maas Mansoor Ali Lalani, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/082,253

(22) Filed: Oct. 28, 2020

(65) Prior Publication Data

US 2022/0130126 A1    Apr. 28, 2022

(51) Int. Cl.
| | | |
|---|---|---|
| *G06T 19/20* | (2011.01) | |
| *G06T 7/593* | (2017.01) | |
| *G06T 7/521* | (2017.01) | |
| *G06T 19/00* | (2011.01) | |

(52) U.S. Cl.
CPC .............. *G06T 19/20* (2013.01); *G06T 7/521* (2017.01); *G06T 7/593* (2017.01); *G06T 19/006* (2013.01)

(58) Field of Classification Search
None
See application file for complete search history.

(56) References Cited

U.S. PATENT DOCUMENTS 10,762,716 B1 * 9/2020 Paul .................. G06F 3/165
10,824,055 B1 * 11/2020 McGuire ............. G06T 7/521
2006/0142657 A1 * 6/2006 Quaid ................ A61B 17/1703
                                                                600/424
2016/0004305 A1 * 1/2016 Pagliani .......... G06Q 10/063114
                                                                345/633
2017/0323488 A1 * 11/2017 Mott ................... G06Q 30/0643
2019/0000578 A1 * 1/2019 Yu ........................... A61B 34/10
2019/0202055 A1 * 7/2019 Wang ...................... B25J 9/1671

(Continued)

OTHER PUBLICATIONS

Perez, Sarah, "YouTube's new AR Beauty Try-On lets viewers virtually try on makeup while watching video reviews," Jun. 18, 2019, 6 pages. [Online] [Retrieved Oct. 28, 2020]. Retrieved online via URL: https://techcrunch.com/2019/06/18/youtubes-new-ar-beauty-try-on-lets-viewers-virtually-try-on-makeup-while-watching-video-reviews/.

(Continued)

*Primary Examiner* — Steven Z Elbinger

(57) ABSTRACT

Apparatuses and methods are provided for augmented reality-assisted assessment of three-dimensional (3D) fit of physical objects within a physical environment in different positions. According to an embodiment, an augmented reality (AR) device obtains 3D dimensions of a virtual object representative of a real-world physical object and displays a 3D representation of the virtual object in an AR space depicted by a user interface of the AR device that is representative of a real-world physical environment in a field of view of the AR device. The 3D representation of the virtual object is proportionally dimensioned relative to the physical environment based on the obtained 3D dimensions of the virtual object and the virtual object is repositionable in the AR space responsive to input received by the AR device to allow assessment of 3D fit of the virtual object within the physical environment in different positions.

20 Claims, 52 Drawing Sheets

(56) References Cited

U.S. PATENT DOCUMENTS

| 2019/0228581 A1* | 7/2019 | Dascola | G06F 3/048 |
| 2020/0043243 A1* | 2/2020 | Bhushan | G06F 3/04883 |
| 2020/0117336 A1* | 4/2020 | Mani | G06F 16/904 |
| 2021/0005002 A1* | 1/2021 | Barragan | G06T 13/20 |
| 2021/0019036 A1* | 1/2021 | Wang | G06F 3/013 |
| 2022/0012498 A1* | 1/2022 | Tan | G06T 19/20 |

OTHER PUBLICATIONS

"Amazon AR View: Shopping for your home? Try AR view.," 11 pages of screenshots enclosed. Video uploaded on Feb. 28, 2018 by amazon. [Retrieved Oct. 28, 2020]. Video retrieved online via URL: https://www.youtube.com/watch?v=O9n62P5_5hU.

"Say Hej to IKEA Place," 72 pages of screenshots enclosed. Video uploaded on Sep. 12, 2017 by IKEA UK. [Retrieved Oct. 28, 2020]. Video retrieved online via URL: https://www.youtube.com/watch?v=r0ViFTEb8aQ.

* cited by examiner

E-Commerce Platform | Search | John's Apparel / Jonny B. Good (JG)

Sidebar:
- Home
- Orders
- Products
- Customers
- Reports
- Discounts
- Apps

SALES CHANNELS
- Online Store
- Mobile App

View all channels

Settings

Good afternoon, Jonny B..
Here's what's happening with your store today.

Today's total sales: $98.00
Today's visits: 1

- Update your Platform Payments tax details
  We require additional information to verify your identity.
  [Update tax details]

- Advanced Cash on Delivery has been deactivated for your store
  [See why]

All channels ⌄    Today ⌄

TOTAL SALES
$98.00

$125
$75
$25

12am    8pm    4pm    11pm
        Jun 1
        2 orders

TOTAL SALES BY CHANNEL    View dashboard    Jun 1

Online Store        0 orders
$0.00

Mobile app          0 orders
$0.00

Shopify POS (126 York St)    0 orders
$0.00

FIG. 2

AUGMENTED REALITY-ASSISTED METHODS AND APPARATUS FOR ASSESSING FIT OF PHYSICAL OBJECTS IN THREE-DIMENSIONAL BOUNDED SPACES

FIELD

The present application relates to augmented reality (AR), and in particular embodiments, to assessing three-dimensional (3D) fit of physical objects in physical environments using AR.

BACKGROUND

AR relates to the enhancement of real-world experiences using computer-generated or virtual content. In some cases, AR involves superimposing virtual content over physical real-world content. This superposition can be either constructive or destructive. Constructive AR adds content to a real-world experience, whereas destructive AR masks content in a real-world experience. AR differs from virtual reality (VR). VR relates to the creation of a completely virtual experience, whereas AR maintains at least a portion of the real-world experience, but alters the perception of that real-world experience using virtual content.

SUMMARY

Some aspects of the present disclosure relate to the AR-assisted assessment of the 3D fit of physical objects in physical environments.

According to one aspect of the present disclosure, an augmented reality-assisted method of assessing fit of physical objects in three-dimensional bounded spaces is provided. The method may include obtaining three-dimensional (3D) dimensions of a virtual object representative of a real-world physical object. The method may further include displaying a 3D representation of the virtual object in an augmented reality (AR) space that is representative of a real-world physical environment. The 3D representation of the virtual object may be proportionally dimensioned relative to the physical environment based on the obtained 3D dimensions of the virtual object. The virtual object may be repositionable in the AR space to allow assessment of 3D fit of the virtual object within the physical environment in different positions. The obtaining of the 3D dimensions of the virtual object and the displaying of the 3D representation of the virtual object in the AR space may be done by an AR device, such as a mobile computing device (e.g., a smartphone, a tablet or the like), an AR headset or the like. The AR space may be depicted by a user interface of the AR device and may be representative of a real-world physical environment in a field of view of the AR device. The 3D representation of the virtual object may be repositionable in the AR space responsive to input received by the AR device, for example.

The method may further include obtaining boundaries of a 3D bounded space within the physical environment and determining whether the virtual object, in its current position within the 3D bounded space, collides with any boundary of the 3D bounded space. In such embodiments, the AR device may provide one or more indicators (e.g., one or more of a visual indication, a haptic indication, or an auditory indication) based on whether the virtual object fits within the 3D bounded space in its current position without colliding with any boundary of the 3D bounded space. In some cases, if a collision is detected, one or more visual indicators may be displayed on the user interface of the AR device to indicate where the at least one collision occurs within the AR space. In some cases, the 3D dimensions of the 3D bounded space may be obtained using one or more sensor systems of the AR device, such as one or more of a light detection and ranging (lidar) system, a radar sensor system, a depth camera, a multi-camera system, or the like.

In some embodiments, responsive to determining that the virtual object collides with at least one boundary of the 3D bounded space in its current position, the AR device may automatically reposition the virtual object to a second position within the 3D bounded space in which the virtual object fits within the 3D bounded space without colliding with any boundary of the 3D bounded space.

In some embodiments, the 3D bounded space may be defined by a potential transportation receptacle for the physical object, such as a shipping container, delivery vehicle storage space, or the like. In such embodiments, after determining that the virtual object cannot be fit within the 3D bounded space without colliding with at least one boundary of the 3D bounded space, a visual indicator may be displayed on the user interface of the AR device to allow selection of an alternative transportation option for the physical object. If it is instead determined that the virtual object fits within the 3D bounded space in its current position without colliding with any boundary of the 3D bounded space, an image may be captured of the AR space with the virtual object placed within the 3D bounded space in its current position. The image may be transmitted for display on a transportation service device to convey how the physical object is to be placed within the 3D bounded space of the physical environment for transportation of the physical object, for example.

In some embodiments, 3D representations of multiple virtual objects may be placed and repositioned within the AR space to assess whether they can be fit within the 3D bounded space of the physical environment. For example, 3D dimensions of multiple virtual object may be obtained and 3D representations of the virtual objects may be displayed in the AR space depicted by the user interface of the AR device, such that each virtual object is independently repositionable in the AR space responsive to input received by the AR device to allow assessment of the 3D fit of the virtual objects together within the physical environment in different positions.

According to another aspect of the present disclosure, there is provided an apparatus including: memory to store information such as models, measurements, dimensions, positions and instructions, for example; a user interface configured to depict an AR space representative of a real-world physical environment in a field of view of the apparatus; a user-operable input element configured to receive user input; and one or more processors configured to perform any method disclosed herein. For example, the one or more processors may be configured to cause the user interface to display a 3D representation of the virtual object in the AR space depicted by the user interface, the 3D representation of the virtual object being proportionally dimensioned relative to the physical environment based on the 3D dimensions of the virtual object, wherein the virtual object is repositionable in the AR space responsive to input received by the user-operable input element to allow assessment of 3D fit of the virtual object within the physical environment in different positions.

According to a further aspect of the present disclosure, there is provided a non-transitory computer readable medium storing computer executable instructions which, when executed by a computer, cause the computer to perform any method disclosed herein.

BRIEF DESCRIPTION OF THE DRAWINGS

Embodiments will be described, by way of example only, with reference to the accompanying figures wherein:

FIG. 2 is an example of a home page of an administrator, according to an embodiment;

DETAILED DESCRIPTION

For illustrative purposes, specific example embodiments will now be explained in greater detail below in conjunction with the figures.

As mentioned above, some aspects of the present disclosure relate to the AR-assisted assessment of the 3D fit of physical objects in physical environments.

In some implementations, this functionality may be provided in association with, in concert with, and/or as a part of a commerce platform. However this is by no means required. Indeed, the subject matter of the present application may be provided separate from or even without a commerce platform in some embodiments.

Example e-Commerce Platform

As mentioned above, in some embodiments, the methods disclosed herein may be performed on or in association with a commerce platform, which will be referred to herein as an e-commerce platform. Therefore, an example of an e-commerce platform will be described.

Figure 1:
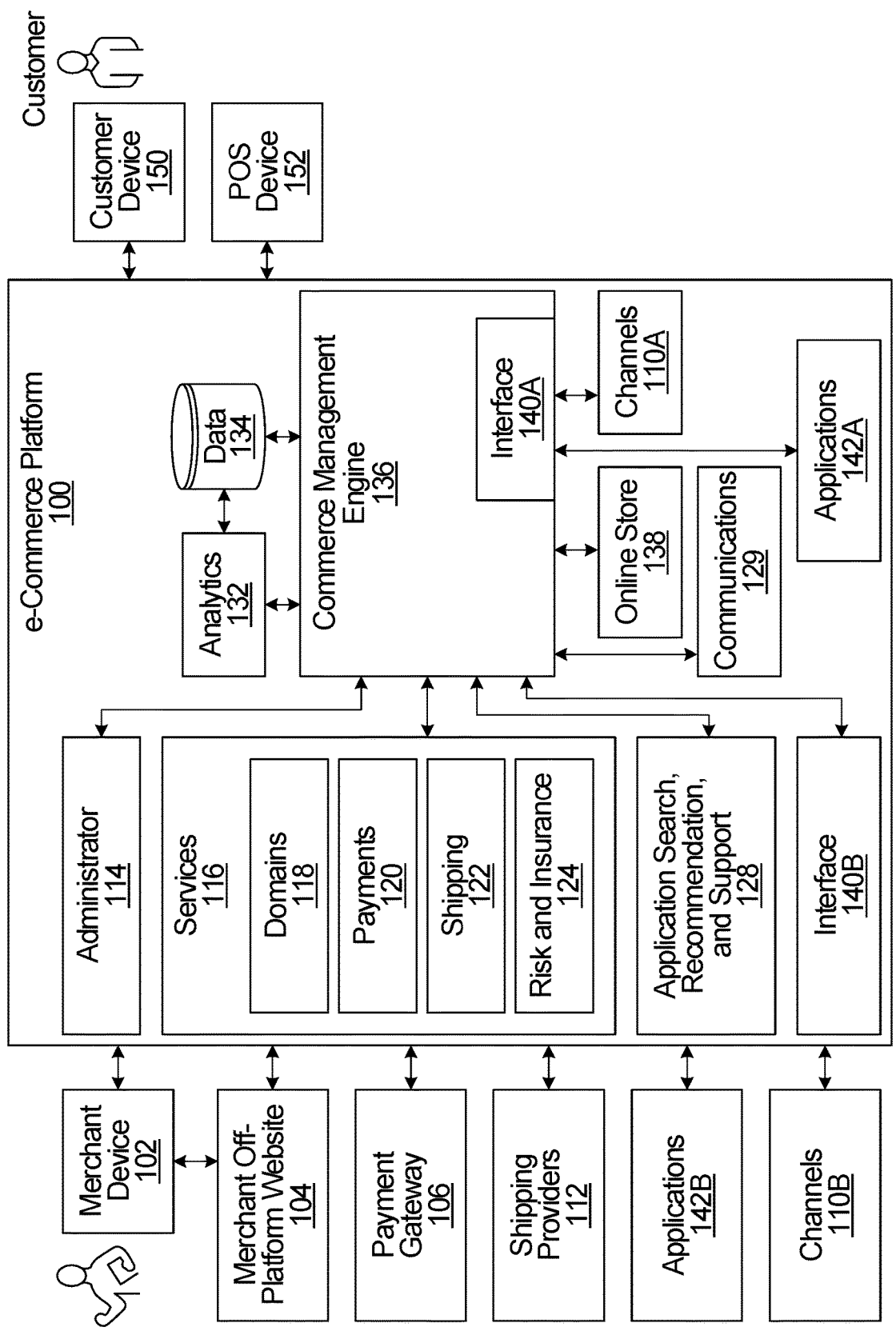
FIG. 1 is a block diagram of an e-commerce platform, according to an embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a web page provided by a server of the e-commerce platform 100. The server may receive a request for the web page from a browser or other application installed on the customer device 150, where the browser (or other application) connects to the server through an IP Address, the IP address obtained by translating a domain name. In return, the server sends back the requested web page. Webpages may be written in or include Hypertext Markup Language (HTML), template language, JavaScript, and the like, or any combination thereof. For instance, HTML is a computer language that describes static information for the web page, such as the layout, format, and content of the web page. Website designers and developers may use the template language to build web pages that combine static content, which is the same on multiple pages, and dynamic content, which changes from one page to the next. A template language may make it possible to re-use the static elements that define the layout of a web page, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation of Augmented Reality in an e-Commerce Platform

Augmented reality (AR) may be used in commerce to provide improved customer experiences. The e-commerce platform 100 may implement AR for any of a variety of different applications, examples of which are described elsewhere herein. For example, the e-commerce platform 100 of FIG. 1 may include one or more computer-implemented systems that make AR content available for use by the e-commerce platform 100, the customer device 150 and/or the merchant device 102. For example, the e-commerce platform 100 may implement an application that allows a merchant associated with the e-commerce platform 100 to provide to a customer 3D dimension data for a virtual object to allow the customer to view a 3D representation of the virtual object in an AR experience. The virtual object may be representative of the size of a product the merchant has for sale in an online store, for example. For example, as described herein, the 3D dimension data may be provided through a hyperlink that is accessible to the customer on a web page of the merchant's online store or that may be provided to the customer in an electronic message, e.g., email, Short Messaging Service (SMS), Multimedia Messaging Service (MMS), Instant Messaging (IM), or the like.

However, although the embodiments described below may be implemented in association with an e-commerce platform, such as (but not limited to) the e-commerce platform 100, the embodiments described below are not limited to the specific e-commerce platform 100. Further, the embodiments described herein do not necessarily need to be implemented in association with or involve an e-commerce platform at all or even in association with e-commerce. Indeed, AR systems unrelated to commerce may implement the systems and methods disclosed herein.

Applications of AR in Commerce

AR can supplement a user's real-world environment with virtual content to alter the user's perception of the real-world environment. Through a process known as simultaneous localization and mapping (SLAM), a representation of a user's real-world environment and a position of the user within that real-world environment can be continuously or intermittently determined by an AR capable device. It should be noted that, as used herein, a position can include both an orientation and a location. An AR experience for the user can then be generated by mapping one or more virtual models to the representation of the real-world environment. AR content for the user may include renders of the virtual models that are overlaid onto the real-world environment. The renders are generated to reflect the relative position of the user in the real-world environment and the mapping of the virtual models to the real-world environment. In this way, the AR content may provide near-seamless integration of the virtual models with the real-world space for the user.

AR can allow a customer to view and interact with a virtual product when the customer is not able to interact with a physical product. For example, AR can superimpose a virtual representation of a product onto a real-world environment that is captured in an image, which can make the product appear to be present in the real-world environment. The image could be of the customer's home or another location that is relevant to the customer, allowing the customer to view the product in an environment that is of interest to them. In some implementations, furniture retailers may use AR to enable customers to view virtual furniture within their homes. For example, a virtual representation of a television can be superimposed on a video stream of a customer's living room using AR, allowing the size and look of the television in the living room to be appreciated.

However, there are a number of potential problems/drawbacks to conventional applications of AR in commerce. One problem is related to the time, effort and storage requirements associated with creating and updating virtual 3D models that accurately represent the look and size of multiple products, which is impractical for many merchants. As such, many merchants will provide general dimensions for a product on their online store, such as the overall length, width and height of a sofa, for example, but are not in a position to make an accurate 3D model rendering of the sofa available for the customer to evaluate in AR. Unfortunately, many consumers have difficulty assessing the physical size of an object based purely on raw dimensions. It would therefore be desirable for a merchant to be able to provide a virtual 3D representation of a product for use in an AR experience that would allow a customer to assess the size of the product in their physical environment without requiring the merchant to obtain and store a detailed virtual 3D model of the product.

Another limitation of conventional AR experiences in commerce applications is that although a conventional AR experience may allow a customer to superimpose a virtual representation of a product on an image or video stream of their physical environment, conventional AR experiences do not allow the customer accurately assess physical fit of the product within their physical environment, which may be constrained in one or more dimensions by physical objects or structures within the physical environment. In other words, conventional AR experiences do not provide a mechanism allowing a user to assess 3D fit of a virtual representation of a physical object within a 3D bounded space that is bounded in at least one dimension. It would therefore be desirable to provide an AR experience that would allow assessment of 3D fit of a virtual object in different positions within a physical environment.

It is noted that an AR system that allows assessment of 3D fit of a virtual object in different positions within a physical environment has applications beyond assisting a customer in assessing fit of a product within the location in which the customer is interested in ultimately using the product. For example, such an AR experience may be advantageous at multiple stages of a supply chain. For example, when a physical object is to be moved from one location to another, the physical size or capacity of available transportation receptacles (e.g., the physical dimensions of a shipping container available to transport the physical object and/or the physical dimensions of an intended delivery destination) is often limited. As such, in many cases the options available for delivery of a particular physical object to a particular location may be limited by the physical size or capacity of a transportation receptacle that is available for transport and/or at the intended delivery location. However, in many cases, the inability of a transportation receptacle to accommodate transportation of a particular physical object may not be discovered until a physical test fitting of the physical object into the transportation receptacle has failed. This may be an issue at several points in a product supply chain or commercial order fulfillment process as physical goods are moved from one location to another. For example, the shipping container to be used for transport of an object may vary based on shipping routes, carrier, and composition of a total shipment. This often means that some shipments cannot be delivered as intended as the delivery location is too small for the content being delivered.

Again, it is noted that while some embodiments are described in the context of commerce applications, the present disclosure is in no way limited to commerce. The systems and methods disclosed herein can also be implemented in other applications of AR.

AR-Assisted Assessment of 3D Fit of Physical Objects

The present disclosure relates, in part, to methods and apparatus for AR-assisted assessment of 3D fit of physical objects in three-dimensional bounded spaces. In some implementations, the method or apparatus may be implemented by an AR device, which is any device or combination of devices capable of providing an AR experience to a user (e.g., a mobile computing device with a camera and an integrated or external display, such as a head mounted display). In such implementations, 3D dimensions of a virtual object that is representative of the real-world physical object may be obtained that allow the AR device to display a 3D representation of the virtual object in an AR space depicted on a user interface of the AR device.

The AR space may be representative of a real-world physical environment in a field of view of the AR device and the 3D representation of the virtual object may be proportionally dimensioned relative to the physical environment based on the obtained 3D dimensions of the virtual object. This way, a user of the AR device may be able to view the 3D representation of the virtual object within the AR space where the 3D representation of the virtual object appears as though it were located within the physical environment. The 3D representation of the virtual object may be repositionable in the AR space to allow assessment of 3D fit of the virtual object within the physical environment in different positions.

Embodiments of the present disclosure will now be described in greater detail with reference to FIGS. 3 to 15.

Figure 3:
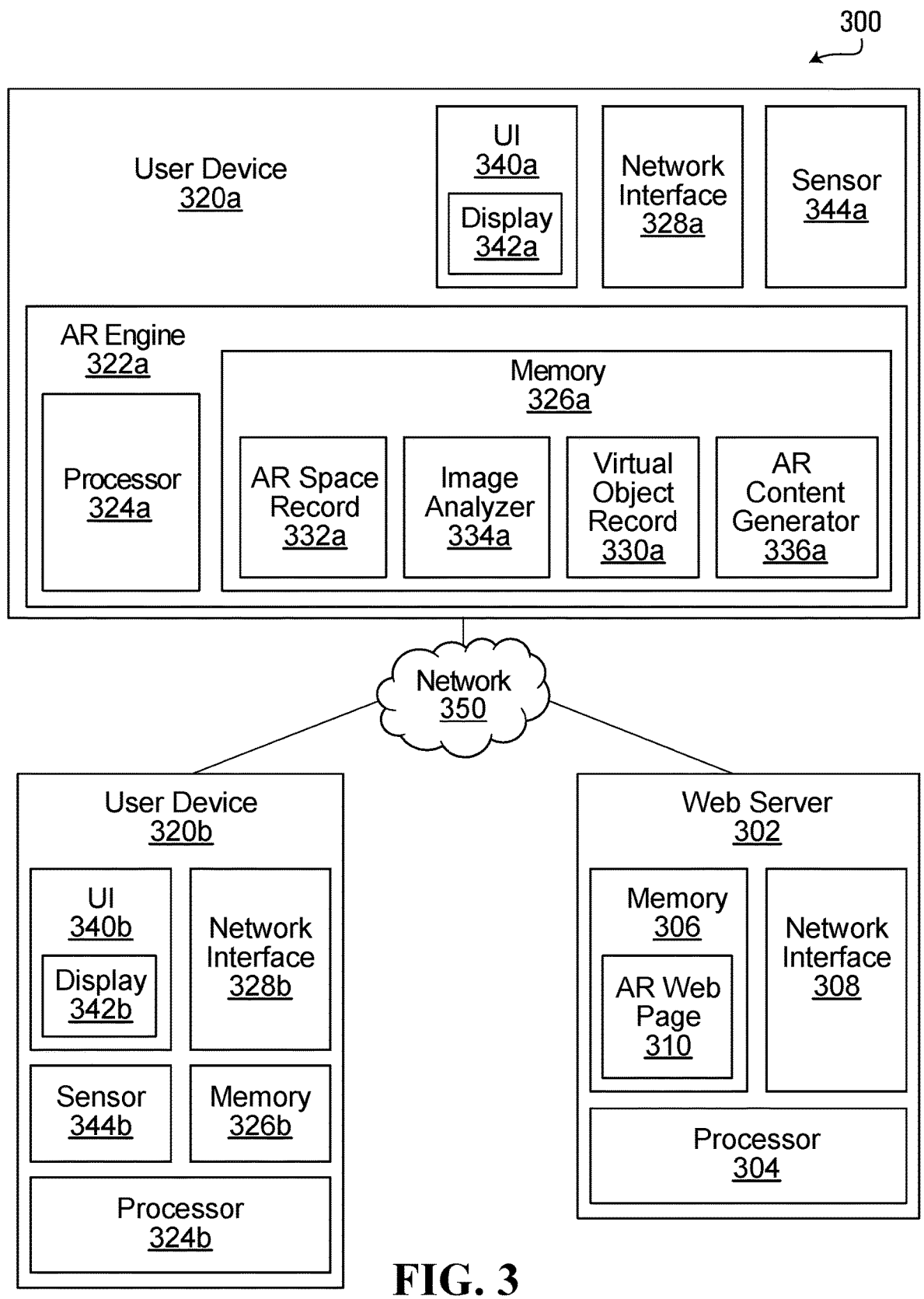
FIG. 3 is a block diagram illustrating a system for AR-assisted assessment of fit of physical objects in three-dimensional bounded spaces, according to an embodiment.

FIG. 3 is a block diagram illustrating an example system 300 for providing AR experiences enabling AR-assisted assessment of the 3D fit of physical objects in 3D bounded spaces. The system 300 includes a web server 302, a network 350, and multiple user devices 320a, 320b. In this example, at least the user device 320a is an AR device that includes an AR engine 322a capable of providing an AR experience.

The network 350 may be a computer network implementing wired and/or wireless connections between different devices, including the web server 302 and the user devices 320a, 320b. The network 350 may implement any communication protocol known in the art. Non-limiting examples of communication protocols include a local area network (LAN), a wireless LAN, an internet protocol (IP) network, and a cellular network.

The user device 320a includes a processor 324a, memory 326a, user interface 340a, network interface 328a and sensor 344a. Similarly, the user device 320b includes a processor 324b, memory 326b, user interface 340b, network interface 538b and sensor(s) 344b. The user device 320a will be described by way of example below. However, it should be noted the description of the user device 320a can also apply to the user device 320b.

The user interface 340a can include, for example, a display screen 342a (which may be a touch screen), a gesture recognition system, a speaker, headphones, a microphone, haptics, a keyboard, and/or a mouse. The user interface 340a may be at least partially implemented by wearable devices embedded in clothing and/or accessories, for example. The user interface 340a can present virtual content to a user, including visual, haptic and audio content. The network interface 328a is provided for communicating over the network 350. The structure of the network interface 328a will depend on how the user device 320a interfaces with the network 350. For example, if the user device 320a is a mobile phone, headset or tablet, then the network interface 328a may include a transmitter/receiver with an antenna to send and receive wireless transmissions to/from the network 350. If the user device is a personal computer connected to the network with a network cable, then the network interface 328a may include, for example, a NIC, a computer port, and/or a network socket.

The processor 324a and the memory 326a constitute an AR engine that is capable of providing an AR experience through the user device 320a.

The processor 324a directly performs or instructs all of the operations performed by the user device 320a. Examples of these operations include processing user inputs received from the user interface 340a, preparing information for transmission over the network 350, processing data received over the network 350, and instructing a display screen 342a to display information. The processor 324a may be implemented by one or more processors that execute instructions stored in the memory 326a. Alternatively, some or all of the processor 324a may be implemented using dedicated circuitry, such as an ASIC, a GPU, or a programmed FPGA.

The memory 306 stores a virtual object record 330a, an AR space record 332a, an image analyzer 334a, and an AR content generator 336a.

The virtual object record 330a stores virtual models of items, buildings, locations, scenery, people, anatomical features, animals and/or any other types of objects. These virtual models can be implemented in an AR experience, allowing the user to view and interact with the virtual model.

Any, one, some or all of the virtual models stored in the virtual object record 330a may be three-dimensional (3D) models. A 3D model is a mathematical representation of an entity that is defined with a length, width and height. A 3D model can be positioned or otherwise defined within a 3D virtual coordinate system, which could be a Cartesian coordinate system, a cylindrical coordinate system or a polar coordinate system, for example. A 3D model might be anchored to the origin of the virtual coordinate system such that the 3D model is at the center of the virtual coordinate system. A 3D model may be entirely computer-generated or may be generated based on measurements of a real-world entity. Possible methods for generating 3D models from a real-world entity include photogrammetry (creating a 3D model from a series of 2D images), and 3D scanning (moving a scanner around the object to capture all angles).

A 3D model allows an object to be viewed at various different angles in an AR experience. Further, when a user is viewing AR content using a device with 3D capabilities (such as a headset, for example), the 3D model allows for 3D representations of the object to be generated and included in the AR content. For example, 3D representations of an object might be achieved by displaying slightly different perspectives of the object in each eye of a user, giving the object a 3D effect.

The virtual models in the virtual object record 330a could be obtained in any of a number of different ways. In some implementations, at least some of the virtual models are obtained from a user of the user device 320a, from the web server 302 or from another user device, such as the second user device 320b, for example. A merchant could generate virtual models for any, one, some or all of the products sold in their stores. These virtual models may be provided directly to the web server 302 by the merchant, or the web server 302 may obtain the virtual models from a merchant's account on an e-commerce platform and/or from the merchant's online store. Virtual models may also be obtained from other platforms such as social media platforms, for example. In addition, some virtual models may be generated locally at user device 320a. For example, images or scans that are obtained by the user device 320a can be used to generate a 3D model.

The AR space record 332a stores representations of real-world and/or virtual spaces. A representation of a real-world space can define a real-world environment that may be overlaid with virtual content to provide AR content, and a representation of a virtual space can define a computer-generated environment that may be overlaid with virtual content to provide VR content. A representation of a space generally provides spatial information pertaining to the features of the space, including the boundaries of the space (for example, the walls of a room) and the objects within the space (for example, the structures and people in a room). The spatial information can identify any, some or all of the features in the space, and provide the position (including the location and orientation) and the dimensions of the features in the space. Non-limiting examples of such features include the surfaces, edges and corners in the space. In other words, the representation of the space may provide a topographical map, layout, or model of the space in 3D.

In some cases, a representation of a real-world space corresponds to a real-world room, building, area or other physical environment. For example, a representation of a real-world space can include, or be generated from, measurements captured by the user device 320a. These measurements may include one or more optical images, radar scans, lidar scans and/or sonar scans of the space obtained by the sensor 344a, for example. The representation of the real-world space can be continuously or intermittently updated as new measurements are received. In some implementations, a representation of a real-world space can be generated by a SLAM process.

The image analyzer 334a is provided to analyse images received and/or stored by the AR engine 322a. In some implementations, the image analyzer 334a is used to generate a representation of a real-world space based on one or more images of the real-world space. Image analysis can detect the features of the real-world space, including the surfaces, edges and/or corners of the real-world space. Image analysis can also determine the dimensions and relative positions of these features of the real-world space in 3D. The representation of the real-world space can then be generated based on the size, shape and position of the features, and optionally be stored in the AR space record 332a.

In further implementations, the image analyzer 334a is used to generate virtual models of objects through photogrammetry, for example. These virtual models can be stored in the virtual object record 330a.

More than one image could be input into the image analyzer 334a at a time. For example, multiple images of a real-world space taken from different positions could allow for the determination of a broader and more accurate representation of the real-world space. The multiple images could be obtained from a video stream or from multiple different cameras, for example. In cases where the image analyzer 334a receives a video stream for a real-world space, the image analyzer 334a could perform an initial feature detection operation to locate the features of the real-world space. These features could then be tracked in subsequent images received from the video stream in real-time. New features that are detected in the subsequent images could be added to the representation of the real-world space to expand the representation of the real-world space.

The image analyzer 334a may be implemented in the form of software instructions that are executable by the processor 304. Any of a number of different algorithms could be included in the image analyzer 334a. Non-limiting examples of such algorithms include:

Surface, corner and/or edge detection algorithms;
Object recognition algorithms;
Motion detection algorithms; and
Image segmentation algorithms.

For example, in some embodiments the image analyzer 334a is configured to determine surface data that includes 3D feature data of physical surfaces. The image analyzer 334a may be used in conjunction with image data captured via a camera and possibly other sensors (motion sensor, gyroscope, accelerometer, etc.) of the sensor 344a in order to define a coordinate system, and to use the defined coordinate system to track changes of the position and orientation of the camera between different acquired images. In such a manner, each acquired image is associated with a corresponding position and orientation of the camera in the defined coordinate system. For example, the image analyzer may determine a defined coordinate system (e.g., x, y, z cartesian coordinates) having its origin (0, 0, 0) corresponding to where a computing device camera for acquiring images is located when a first image is acquired. The AR software, in conjunction with sensor data, enables the tracking of a location and an orientation of the camera relative to the defined coordinate system.

Further, the AR software may also determine the existence of planar surfaces or other features for items in or aspects of the captured images. For example, the image analyzer 334a may allow for feature points such as edges to be recognized, such that a planar surface in an image (e.g., a shelf, a table, a rug, a counter, a wall, and the like) can be simply and easily determined. This 3D feature data relating to items in the image is useful for calculating location and orientation of real and virtual objects with respect to the defined coordinate system. This 3D feature data may also be used for recalibrating one image with respect to another, such as where the user device 320a is located in a physical environment and acquires a second image that needs to be oriented with respect to a first image with the defined coordinate system and origin at a particular location or is moved to a different physical location at a different point in time and needs to be oriented with respect to a coordinate system used at another point in time.

In some embodiments, the image analyzer 334a may use such 3D feature data to determine surface data for detected surfaces within a field of view, such as dimensions of the surface, shape of the surface, pre-existing surface items on the surface, and the like. Such 3D feature data may be used to virtually scale and/or position a 3D representation of the virtual object image adjacent to a detected surface within an AR space depicted on the user interface 340a as part of an AR experience provided to a user of the user device 320a. The AR data stored in the AR space record 332a may therefore include camera position and orientation relative to origin of surfaces that are detected by the image analyzer 334a as well as the size and orientation of those detected surfaces. For example, if the image data of a physical environment depicts a living room with a coffee table, the AR data may include dimensions of the table and orientation of its surface relative to the determined coordinate system.

Further details regarding image analysis algorithms that may be included in the image analyzer 334a can be found in Computer Vision: Algorithms and Applications by Richard Szeliski, ISBN: 978-1-84882-935-0 (Springer, 2010), the contents of which are herein incorporated by reference in their entirety.

The AR content generator 336a employs and/or implements one or more algorithms (possibly in the form of software instructions executable by the processor 324a) that are capable of generating AR content that can be overlaid onto a real-world space surrounding the user, providing the user with an AR experience. This can include overlaying the AR content on an image of the real-world space captured by a camera, for example. Alternatively, the AR content can be overlaid onto the real-world space using a transparent display in an AR headset, for example. The AR content can be generated based on a representation of the real-world space that is stored in the AR space record 332a. Non-limiting examples of AR content include:

virtual representations of one or more objects, such as the virtual representation of a product available in a merchant's online store, for example;
  virtual representations of one or more user interactions, such as the virtual representation of an interaction between a user and a virtual representation of an object, e.g. to manipulate or reposition the virtual representation of the object within an AR space.

To generate AR content for a user of the user device 320a, possible inputs to the AR content generator 336a include:

One or more virtual models defined within a virtual coordinate system. The virtual models may be obtained from the virtual object record 330a, for example.
  A representation of a real-world space associated with the user device 320a. The representation of the space may be obtained from the AR space record 332a, for example.
  An anchor point for the virtual coordinate system within the representation of the space to map the virtual coordinate system to the space. The anchor point may be received from a user of the user device via the user interface 340a, e.g., by receiving a user selection of an anchor point within an AR space depicted on a touch screen display 342a of the user interface 340a, for example.
  A location of the user within the virtual coordinate system, determined by the AR engine 322a, for example.
  A location of one or more user interactions within the virtual coordinate system, determined by the AR engine 322a, for example.

The AR content output by the AR content generator 336a can include visual, haptic and/or audio content. Visual content can allow a user to view virtual objects within an AR experience, haptic content can allow a user to touch and feel virtual objects within the AR experience, and audio content can allow a user to hear sounds within the AR experience. In some implementations, visual, haptic and/or audio content is generated based on the position (including a location and orientation) of one or more users within a virtual coordinate system of the AR experience. For example, visual content for a user can depict an object based on the relative position of the user to a model of the object in the virtual coordinate system. Haptic content can provide the sensation of touching or feeling an object based on the one or more anatomical features of the user that are abutting the object in the virtual coordinate system. Haptic content might be implemented, at least in part, using clothing with built-in haptics, for example. Audio content can implement spatial audio with a directionality corresponding to the position of the user relative to a source of the audio content within the virtual coordinate system. In some implementations, spatial audio is produced by independently controlling the sounds played into each ear of a user.

Consider an example of AR content that is generated for a particular user in an AR experience. The virtual content could include visual content depicting an object in the AR experience, haptic content providing a feel of the object, and audio content providing a sound made by the object. The size and position of the object depicted in the visual content may correspond to the position of a user relative to the object in a virtual coordinate system of the AR experience. Similarly, the directionality of the audio content may correspond to the position of the user relative to the object in the virtual coordinate system. If the object is to the left of the user, then audio content for the object might be louder in the left ear of the user. The haptic content might be based on which part of the user is touching the object (for example, if the user is touching the object with their finger or their palm) and which part of the object the user is touching in the virtual coordinate system.

AR content can be continuously or intermittently updated by the AR content generator 336a to reflect changes and/or modifications in an AR experience. If a user moves within a virtual coordinate system of the AR experience, then new virtual content can be generated to reflect the new position of the user within the virtual coordinate system. For example, when the user moves relative to a virtual model in the virtual coordinate system, then the size and orientation of a render of the model can change accordingly. Similar comments apply to audio content and haptic content included in the virtual content for the user, which can also change when the user moves.

Although the image analyzer 334a and the AR content generator 336a are illustrated as separate modules, this is only an example. Some embodiments could combine the functionality of the image analyzer 334a and the AR content generator 336a in a single software instance stored in the memory 306 or in another non-transitory computer readable medium.

In some implementations, the AR engine 322a is configured to allow a user of the user device 320a to capture an image of an AR space depicted on the user interface 340a of the user device 320a and to share the image of the AR space with one or more other users. For example, the AR engine 322a may allow a user of the user device 320a to share the captured image with a user of the second user device 320b over network 350, e.g., via email, SMS, MMS, IM, and the like.

Non-limiting examples of a user device include a mobile phone, tablet, laptop, projector, headset and computer. A user device may be a customer device that is owned and/or operated by a customer or be a merchant device that is owned and/or operated by a merchant, for example. In some implementations, either or both of the user devices 320a, 320b include implanted devices or wearable devices, such as a device embedded in clothing material or a device that is worn by a user such as glasses, with built-in displays allowing a user to view the real-world and simultaneously view AR content that is overlaid on the real-world.

As discussed above, the sensor 344a is provided to obtain measurements of the real-world environment surrounding the user device 320a. These measurements can be used to generate 3D representations of real-world spaces and/or 3D models of objects, for example. The 3D representations of the real-world spaces may be stored in the AR space record 332a and the 3D models of objects may be stored in the virtual object record 330a.

The sensor 344a may include one or more cameras, radar sensors, lidar sensors and sonar sensors, for example. In the case of a camera, the captured images may be processed by the AR engine 322a. Measurements obtained from radar sensors, lidar sensors and sonar sensors can also be processed by the AR engine 322a. Although the sensor 344a is shown as a component of the user device 320a, the sensor 344a may also or instead be implemented separately from the user device 320a and may communicate with the user device 320a via wired and/or wireless connections, for example.

In some implementations, the user device 320a may receive the virtual object record 330a, the image analyzer 334a and/or the AR content generator 336a from the web server 302 by accessing the AR web page 310.

The web server 302 supports the generation of AR content for AR experiences on AR devices. As illustrated, the web server 302 includes a processor 304, memory 306 and a network interface 308. The processor 304 may be implemented by one or more processors that execute instructions stored in the memory 306 or in another non-transitory computer readable medium. Alternatively, some or all of the processor 304 may be implemented using dedicated circuitry, such as an application specific integrated circuit (ASIC), a graphics processing unit (GPU) or a programmed field programmable gate array (FPGA).

The network interface 308 is provided for communication over the network 350. The structure of the network interface 308 is implementation specific. For example, the network interface 308 may include a network interface card (NIC), a computer port (e.g., a physical outlet to which a plug or cable connects), and/or a network socket.

The memory 306 stores an AR web page 310. The AR web page 310 is accessible (e.g. downloadable) by user devices, such as the user devices 320a and 320b. For AR devices, such as the user device 320a, the AR web page 310 can be accessed to obtain 3D dimensions of a virtual object so that a 3D representation of the virtual object can be viewed in an AR experience on the AR device to assess the 3D fit of the virtual object within a physical environment. For example, in some embodiments, the AR web page 310 may include downloadable content that allows a 3D representation of the virtual object to be generated at run-time in a web browser of the AR device. For example, a web browser application on the user device 320a could receive the virtual object record 330a, the image analyzer 334a and/or the AR content generator 336a from the web server 302.

In FIG. 3, two user devices are shown by way of example. More than two user devices may be in communication with the web server 302.

The web server 302 is provided by way of example. Other implementations of a web server are also contemplated. In some implementations, a web server is provided at least in part by an e-commerce platform, either as a core function of the e-commerce platform or as an application or service supported by or communicating with the e-commerce platform. In some implementations, a web server is implemented as a stand-alone service to facilitate AR experiences. While the web server 302 is shown as a single component, a web server could instead be provided by multiple different components that are in communication via a network.

Figure 4:
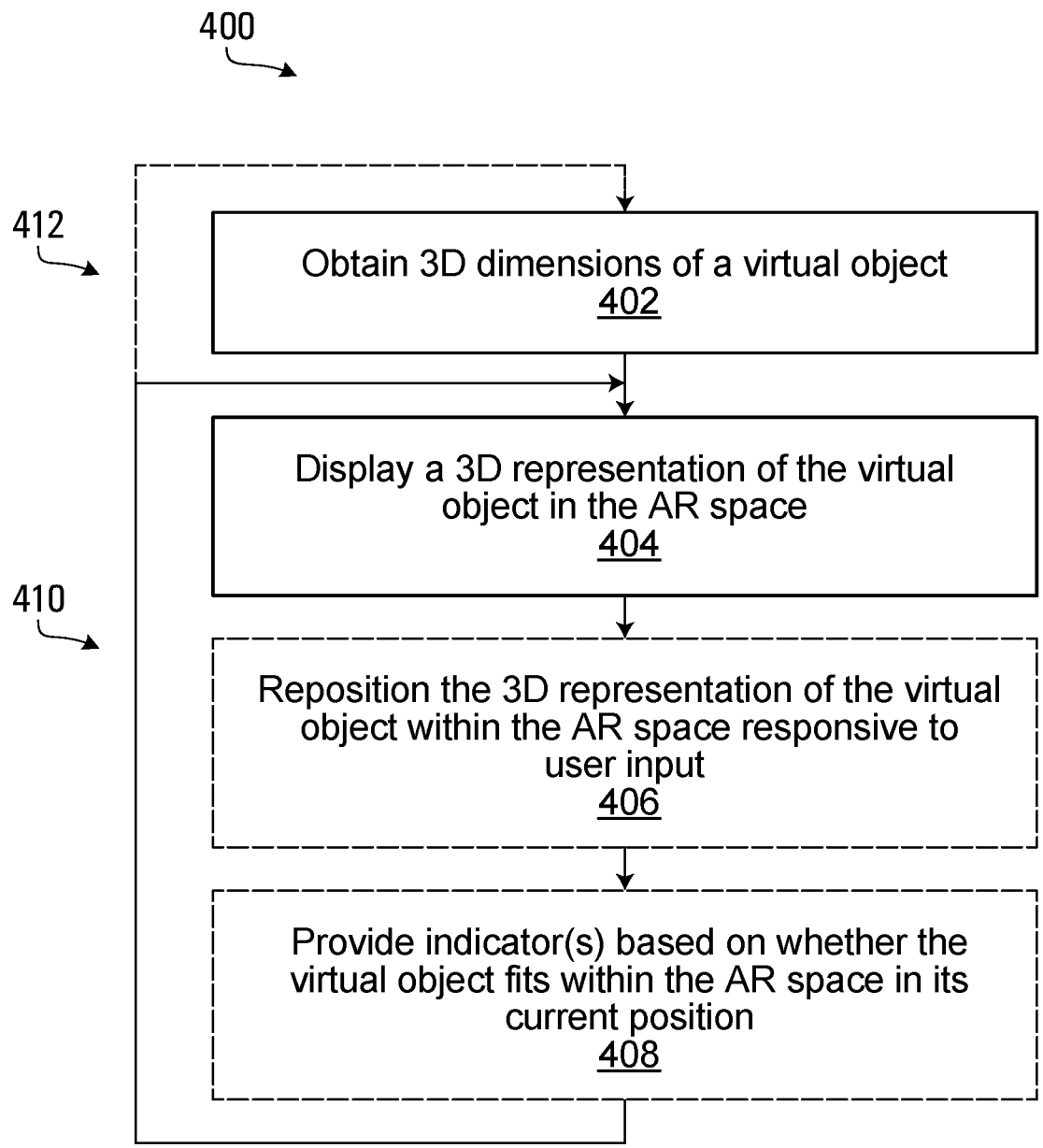
FIG. 4 is a flow diagram illustrating a method of AR-assisted assessment of fit of physical objects in three-dimensional bounded spaces, according to an embodiment.

FIG. 4 is a flow diagram illustrating an AR-assisted method 400 of assessing fit of physical objects in three-dimensional bounded spaces, according to an embodiment. The method 400 will be described as being performed by the AR device 320a of FIG. 3. However, at least a portion of the method 400 could instead be performed elsewhere, such as at the user device 320b and/or the web server 302, for example.

Step 402 includes the processor 324a obtaining 3D dimensions of a virtual object for viewing in an AR experience. The virtual object may be representative of a real-world physical object. In some implementations, the 3D dimensions of the virtual object are obtained from the virtual object record 330a, the web server 302 and/or the second user device 320b. For example, the processor 324a may obtain the 3D dimensions of a virtual object as a result of a user of the user device 320a selecting a hyperlink to the AR web page 310. For example, the hyperlink may include length, width and height dimensions of the virtual object, and selection of the hyperlink may cause a browser application of the user device 320a to access the AR web page 310 to obtain the 3D dimensions of the virtual object and enable the processor 324a to launch an AR experience on the user device 320a to allow the user to view a 3D representation of the virtual object in an AR space. In some implementations, the processor 324a launches the AR experience within an existing browser application on the user device 320a without requiring the user to download and install a new standalone AR application on the user device 320a. In some implementations, the 3D dimensions of the virtual object may be included as an identifiable string of dimensions as part of the hyperlink. For example, the hyperlink may have the following form: https://size.link?l=20&w=15&h=10&units=inc, where "size.link" is the host name of a web server, e.g., the web server 302, and "l=20&w-15&h=10&units=in" is a query component that corresponds to a virtual object in the shape of a box having length, width and height dimensions of 20 inches, 15 inches and 10 inches, respectively. For example, a merchant operating an online store may create "size" links, e.g., hyperlinks of the form indicated above, for some or all of their products, which customers can click while browsing the merchant's online store to visualize dimensions directly through their mobile browsers using AR. An example of such an embodiment is described below in further detail with reference to FIGS. 5 and 6. In addition or instead a user of the user device 320a may access the AR web page 310 to create a size link by selecting the 3D dimensions of the virtual object based on a specific item that the user wishes to assess the size of in an AR experience. An example of such an embodiment is described below in further detail with reference to FIGS. 7 to 9. In other implementations, the 3D dimensions of a virtual object may be obtained from the second user device 320b. For example, the second user device 320b may be a merchant device associated with a merchant that has created and sent a size link to the user of the user device 320a, e.g., via an email, SMS, MMS, IM or the like. An example of such an embodiment is described below in further detail with reference to FIGS. 10 to 15.

Size links such as those described above are merely one example of a mechanism by which the user device 320a may obtain 3D dimensions of a virtual object. For example, in other implementations, obtaining the 3D dimensions of a virtual object involves obtaining a 3D model of the virtual object. In some implementations, such a 3D model is obtained from a virtual model record (not shown) that is accessible to the user device 320a, e.g., through the web server 302 or another web server, service or component accessible to the user device 320a. A user of the user device 320a may select the model from such a virtual model record based on a specific item that the user wishes to view in an AR experience. For example, if the user wishes to view a particular product sold by a merchant, then step 402 may include the user searching for this product in such a virtual model record and selecting a model of the product. In other implementations, the model of the virtual object may be obtained directly from another user device, such as the user device 320b, for example.

Once obtained, the 3D dimensions of the virtual object may be stored in the virtual object record 330a.

At step 404, the processor 324a causes the user interface 340a to display a 3D representation of the virtual object in an AR space depicted by the user interface 340a. The AR space may be representative of a real-world physical environment in a field of view of the AR device, for example. The 3D representation of the virtual object may be proportionally dimensioned relative to the physical environment based on the obtained 3D dimensions of the virtual object. For example, the 3D representation of the virtual object having the 3D dimensions obtained in step 402 may be positioned or otherwise defined within a virtual coordinate system of the AR space such that the 3D representation of the virtual object can be selectively placed adjacent to a detected surface within the AR space. The 3D representation of the virtual object might be anchored to the origin of the virtual coordinate system, such that 3D representation of the virtual object is at the center of the virtual coordinate system. The dimensions of the virtual object may allow the item to be properly scaled within the virtual coordinate system to reflect the item's physical size in the AR space.

In some implementations, displaying the 3D representation of the virtual object in the AR space at step 404 includes the processor 324a determining a position of the user device 320a within the virtual coordinate system so that both the 3D representation of the virtual object and the first user device 320a will have respective positions defined within the virtual coordinate system, allowing the position of the 3D representation of the virtual object relative to the first user device 320a to be determined. It should be noted that the position of the first user device 320a in the virtual coordinate system can include a coordinate of the first user device 320a in the virtual coordinate system as well as an orientation of the first user device 320a in the virtual coordinate system.

In some implementations, the position of the first user device 320a is determined based on first information obtained by the user device 320a. The form of the first information is not limited herein. In some implementations, the first information includes or provides a representation of a space associated with the first user device 320a. This space provides a setting or environment in which the first user can view the 3D representation of the item. The virtual coordinate system can then be mapped to the representation of the space to determine the position of the first user device 320a within the virtual coordinate system.

In some cases, the space associated with the user device 320a is a 3D, real-world space where the user device 320a is physically present. For example, the real-world space may be a room of a user's house. The first information may include measurements of the real-world space that are collected by the user device 320a. The representation of the real-world space can then be generated from these measurements. If the measurements include optical images, then the image analyzer 334a may help process the images to generate the representation of the real-world space. Other examples of the measurements include radar scans, lidar scans and sonar scans of the real-world space. The representation of the real-world space may be stored in the AR space record 332a.

In other cases, the first information might include a selection of a previously generated representation of a space from the AR space record 332a. This space may correspond to a location that is specific to a user of the user device 320a (such as a room of the user's house, for example) and may be based on measurements that were previously obtained from the user.

A position of the user device 320a (including a location and orientation) in the space can be determined, possibly based on the first information obtained by the user device 320a. For example, the first information may include an indication of the position of the first user device 320a within the space. In some cases, the position of a user of the first user device 320a is considered to be equivalent to the position of the user device 320a. Examples of such cases include when the user device 320a is a smart phone or headset that is held, attached to and/or operated by the first user. In these cases, step 404 can include determining the position of the user device 320a in the space, and the position of the first user is inferred from the position of the user device 320a.

If the representation of the space is determined based on measurements obtained by the user device 320a, then the position of the first user may also be determined from the measurements. For example, analysis of the measurements may allow determination of the distance from the first user or the user device 320a to one or more surfaces in the space.

Lidar and radar have ranging capabilities to determine distances to surfaces. Further, image analysis performed by the image analyzer 334a may, additionally or alternatively, be used to determine the distances to surfaces from optical images. When the distance from the first user or the user device 320a to one or more surfaces within the space is known, then the position of the first user and/or user device 320a within the space can be determined through triangulation or other means. Global positioning system (GPS) data may also or instead be used to determine the position of the user device 320a within the space. In some cases, the process of generating a representation of a real-world space and determining the first user's position within the real-world space can be performed using a SLAM process.

An explicit indication of the position of the first user and/or the user device 320a within the space can also or instead be provided by the first information. For example, the coordinates of the first user and/or the user device 320a within the space could be directly provided to the AR engine 322a.

When the first information provides a representation of a space, step 404 can include mapping the virtual coordinate system to the representation of the space. This may involve obtaining a position (including a location and orientation) of the 3D representation of the virtual object within the space. In some cases, the first information includes a selection or indication of a desired position of the 3D representation of the virtual object within the space. For example, the first user may use the user device 320a to indicate that they would like to position the 3D representation of the virtual object at a certain location and orientation within the space. This position of the 3D representation may be used as an anchor point to map the virtual coordinate system to the space. In other implementations, a virtual coordinate system may be mapped to the space using an anchor point other than the position of the 3D representation of the virtual object. For example, in some implementations a location of the user device 320a may be used as an anchor point to map a virtual coordinate system to the space.

In some implementations, displaying the 3D representation of the virtual object at step 404 includes overlaying the 3D representation of the virtual object on an image of the real-world physical environment captured by the user device 320a. As such, the AR content can be superimposed over the real-world surroundings of a user of the user device 320a. Alternatively, the 3D representation of the virtual object might be presented on a transparent display in the user device 320a, allowing the user to view the AR content and the real-world simultaneously.

The display of the 3D representation of the virtual object at step 404 may be generated based on the position of the first user or first user device 320a within the virtual coordinate system. For example, the orientation and size of the 3D representation of the virtual object may correspond to the first user's viewpoint of, and distance from, the 3D representation of the virtual object in the virtual coordinate system. For example, as the first user moves further away from the 3D representation of the virtual object in the virtual coordinate system, then the size of the 3D representation of the virtual object for the first user can decrease.

In some implementations, a user of the user device 320a is able to interact with the 3D representation of the virtual object within the AR space through one or more inputs on the user device 320a. For example, as discussed above, the 3D representation of the virtual object may be repositionable in the AR space to allow assessment of 3D fit of the virtual object within the physical environment in different positions. For example, the user's interaction with the virtual object could involve adjusting placement of the 3D representation of the virtual object, e.g., adjusting the location and/or orientation of the 3D representation of the virtual object within the AR space. As such, in some implementations, at step 406 the method 400 further includes repositioning the 3D representation of the virtual object within the AR space responsive to user input. The user input may be received via one or more user-operable inputs of the user interface 340a of the user device 320a, e.g., via touchscreen 342a, for example.

The method may further involve obtaining boundaries of a 3D bounded space within the physical environment in the field of view of the user device 320a. For example, the 3D bounded space may be a potential transportation receptacle, such as a shipping container, the trunk of a car for curbside pick-up, or a final delivery location for delivery of the physical object (e.g. a mailbox, storage locker or the like), and the boundaries of the 3D bounded space may be defined by surfaces of the transportation receptacle (e.g., the walls of a shipping container). For example, in some implementations, if the 3D bounded space is a potential transportation receptacle for the physical object represented by the virtual object, the user may attempt to place the 3D representation of the virtual object within the 3D bounded space. If the initial orientation of the 3D model is not how the user desires (e.g. long thin box of cross-country skis that are initially placed vertically inside of a mini-van trunk), the user may be able to rotate the 3D model such as, for example, around its centre. The user may also or instead be able to translate the object in relation to the scene (such as, for example, by adjusting the centre of the object in relation to the scene) so as, to, for example, slide the object forward, backward or sideways in the AR environment, relative to the scene. In some implementations, the 3D representation of the virtual object may be automatically placed within the 3D bounded space. For example, the 3D representation of a virtual object may be placed along a detected surface in a fixed position relative to the user device 320a (e.g. along a surface centred at an intersection between the plane of that surface and a normal extending from the user device 320a).

In some cases, the AR engine 322a may determine a 3D fit of the virtual object within the 3D bounded space by performing collision detection, which detects whether the virtual object fits within the 3D bounded space without colliding with any boundary of the 3D bounded space. For example, in one embodiment, collision detection may be performed once a user has attempted to place the 3D representation of the virtual object within the 3D bounded space. The terms colliding and collision are used to refer to circumstances where placement of a first virtual object relative to a second (virtual or real) object within an AR space would result in a physical collision of the real-world counterparts of the two objects in the real world, i.e., the placement in the AR space would require the physical counterparts of the two virtual objects to occupy the same physical space at the same time. Collisions may be detected via surface detection using multiple methods, including, but not limited to: image analysis; multi-camera triangulation to determine distances across multiple points; depth camera measurements; light depth and range/radio depth and range (LIDAR/RADAR) measurements from the user device 320a, etc. For example, collision detection may involve assessing whether any detected surface within the AR space crosses a boundary of the 3D representation of the virtual object when the 3D representation of the virtual object is placed adjacent to another detected surface within the AR space.

In some implementations, the user device 320*a* may provide the user with feedback regarding the determined 3D fit of the virtual object within the 3D bounded space. For example, in some implementations, one or more indicators based on the determined 3D fit of the virtual object may be provided to the user through the user interface 340*a* of the user device 320*a* at step 408. For example, such indicators may be displayed on the display screen 3402*a* of the user device 320*a*. These indicators may be in the form of user selectable inputs that are selectable by the user to trigger one or more further processes, for example. More generally, the user device 320*a* may provide one or more indicators that include one or more of: a visual indicator, a haptic indicator, or an auditory indicator.

For example, in one implementation, if the collision detection indicates that the virtual object fits within the 3D bounded space without colliding with any boundary of the 3D bounded space, the user device 320*a* may display a user-selectable interface item prompting the user to capture an image of the AR space with the 3D representation of the virtual object placed within the 3D bounded space according to the particular placement that was determined to be collision-free. In other implementations, such an image of the AR space may be automatically captured responsive to determining that the virtual object fits within the 3D bounded space without any collision. In either case, the captured image may be transmitted for display on another user device, e.g., the second user device 320*b*, which may be a delivery service device associated with a delivery service, to convey how the physical object that is represented by the virtual object is to be placed within the 3D bounded space of the physical environment for transportation or delivery of the physical object.

As another example, in some implementations, if the collision detection indicates that the virtual object collides with at least one boundary of the 3D bounded space, the user device 320*a* may display one or more visual indicators on the user interface 340*a* to indicate where the collision(s) occur within the AR space. For example, this may involve displaying one or more icons identifying the points of collision and/or changing the display characteristics of portions of the virtual object and/or portions of the 3D bounded space within the AR space in order to visually distinguish those portions of the virtual object and/or the 3D bounded space where the collision(s) occur. For example, the one or more portions of the virtual object where collision(s) occur may be presented in a different colour than other portions of the object. In other embodiments, the display of the virtual object may be manipulated along the boundary of a collision, e.g. where the edge of a virtual object collides with a surface, and only along that part of the virtual object. Alternatively, or additionally, all portions of the virtual object that are within a colliding portion may be colored differently, highlighted, shown in stippled lines, or in distinguished in some other way from the remainder of the virtual object in order to highlight the collision. These visual indicators may be used by the user to determine how the virtual object might be repositioned, e.g., relocated and/or reoriented, to fit within the 3D bounded space without any collisions. Once the virtual object has been repositioned to remove collisions, its outline may be visually adjusted (e.g. coloured green) to indicate that all collisions have been resolved, for example.

In some implementations, if the collision detection for a first position of the virtual object within the 3D bounded space indicates that the virtual object collides with at least one boundary of the 3D bounded space, the user device 320*a* may automatically reposition the 3D representation of the virtual object to a second position in which the virtual object fits within the 3D bounded space without colliding with any boundary of the 3D bounded space. For example, in some implementations surface detection, e.g., using the image analyzer 334*a*, can also take perspective measurements to determine the actual size of the detected surface(s), which can then be used to determine a position in which the virtual object fits into the space. Movement to the second position may involve adjusting the location and/or orientation of the 3D representation of the virtual object within the AR space. For example, the AR engine 322*a* may be configured to change locations and/or orientations of the 3D representation of the virtual object in an effort to identify one or more positions in which no collision occurs. For example, the AR engine 322*a* may be configured to initially start by lining up the longest diagonal of the 3D representation of the virtual object with the longest diagonal available in the bounded space, and then rotating around that axis.

As illustrated by the feedback arrow 410 in FIG. 4, steps 404, 406, 408 can be repeated multiple times. This can allow the first user to navigate within the AR space and to reposition the 3D representation of the virtual object within the AR space and receive an updated display of the 3D representation of the virtual object in response at each instance of step 404, for example. For example, as a user physically moves themselves or the user device 320*a* within the real-world space and/or repositions the 3D representation of the virtual object within the AR space, updated positions of the user device 320*a* and the 3D representation of the virtual object can be determined based on measurements by the user device 320*a*, and the display of the 3D representation of the virtual object can be updated based on the updated positions. Furthermore, in some implementations, as the user device 320*a* captures more measurements of the real-world space, the representation of the real-world space can also be updated. This can add new features and/or areas to the representation of the real-world space.

As illustrated by the optional feedback arrow 412 in FIG. 4, in some cases 3D dimensions of multiple virtual objects may be obtained and 3D representations of the virtual objects may be displayed together in the AR space depicted by the user interface of the AR device. In such embodiments, each virtual object may be independently repositionable in the AR space responsive to input received by the AR device to allow assessment of the 3D fit of the virtual objects together within the physical environment in different positions. In some implementations, the 3D dimensions of multiple virtual objects could be obtained at one time in step 402 and included in the AR experience at step 404.

It should be noted that the order of steps 402, 404, 406, 408 in FIG. 4 are shown by way of example only. Different orders of steps 402, 404, 406, 408 are also contemplated. For example, step 408 could be performed before step 406. Additionally or alternatively, two or more of steps 402, 404, 406, 408 could be performed concurrently/simultaneously.

The AR-assisted method 400 of assessing fit of a physical object in a three-dimensional bounded space leverages AR to enable an AR device to determine whether a physical object, which may be physically remote from the operational environment of the AR device, will fit within a constrained or bounded 3D space within the field of view of the AR device. Such capability is potentially beneficial in a wide variety of applications in which physical goods must be moved from one location to another. For example, the disclosed method may be particularly useful for e-commerce transactions, because it can potentially be used at several points in the ordering, order fulfillment and delivery processes. For example, a merchant operating an online store may include a user-selectable link on their website for a particular household product that, when selected by a consumer that is browsing the website on an AR-capable device, provides the AR-capable device with 3D dimensions of the product that allow the AR-capable device to render a 3D representation or model of the product in an AR space. Using this 3D representation of the product and the collision detection of the disclosed method, the AR-capable device is able to determine if the product will fit within a particular space within the consumer's home. An embodiment of the disclosed method may also be used to select a suitable transportation option for the product by using the disclosed method to determine whether potential transportation receptacles can accommodate the 3D dimensions of the product once it is packaged for shipment/delivery. For example, an embodiment of the disclosed method may be used to assess whether curbside/trunk pick-up is a viable option for a particular product based on whether or not the product can be fit in the trunk of the consumer's vehicle. Embodiments of the disclosed method may also be useful for back office or warehousing operations, where goods may be collected or distributed as part of order fulfillment, for example.

Reference will now be made to FIGS. 5 to 15, which illustrate examples of the use of AR to assist in assessing the fit of physical objects in three-dimensional bounded spaces, according to various embodiments of the present disclosure.

Figure 5:
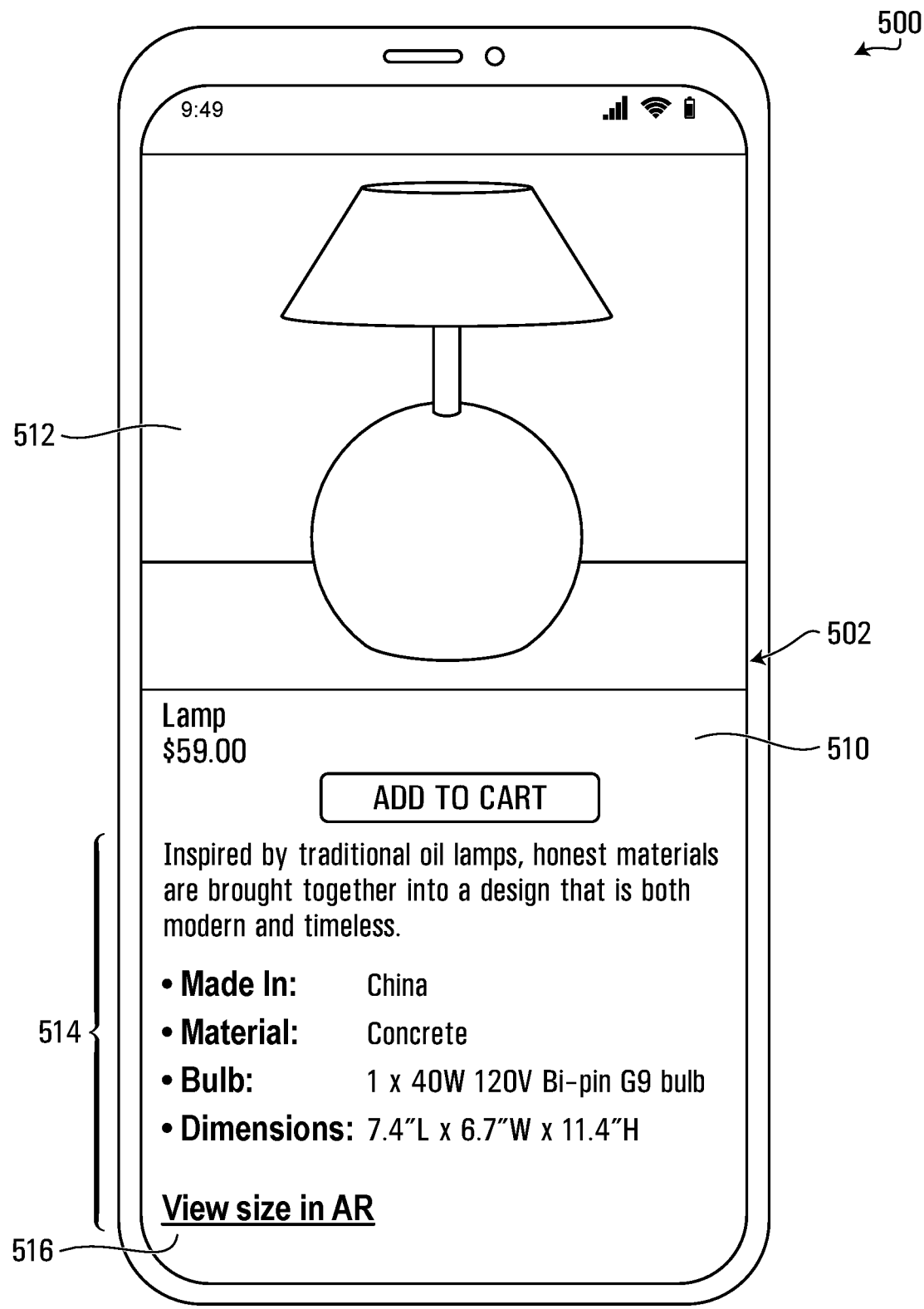
FIG. 5 illustrates a user device displaying a web page for an online store that includes a link to AR content for assessing fit of an item for sale in a physical space, according to an embodiment.

FIG. 5 illustrates a user device 500 displaying a portion of a product page for an online store, according to an embodiment. In this example, the user device 500 includes a touch screen display 502 that is displaying a portion of a product page 510 for a lamp that includes a photograph 512 and a description 514 of the lamp that provides information about the lamp such as its country of manufacture, materials used in its construction and physical dimensions. However, in addition to these conventional details about the product, the product page 510 also includes a link 516 that is selectable by a user to launch an AR experience on the user device 500 to allow the user to assess the size of the product in an AR space that is representative of the user's physical environment. For example, the link 516 may be a size link as described herein, the selection of which causes a browser application of the user device 500 to access an AR web page, such as the AR web page 310 of FIG. 3, that enables the user device 500 to launch an AR experience to allow the user to view a 3D representation of a virtual object the size of the lamp in an AR space representative of the user's physical environment. In some implementations, the user device 500 launches the AR experience within an existing browser application on the user device without requiring a standalone AR application to be installed on the user device 500.

Figure 6A:
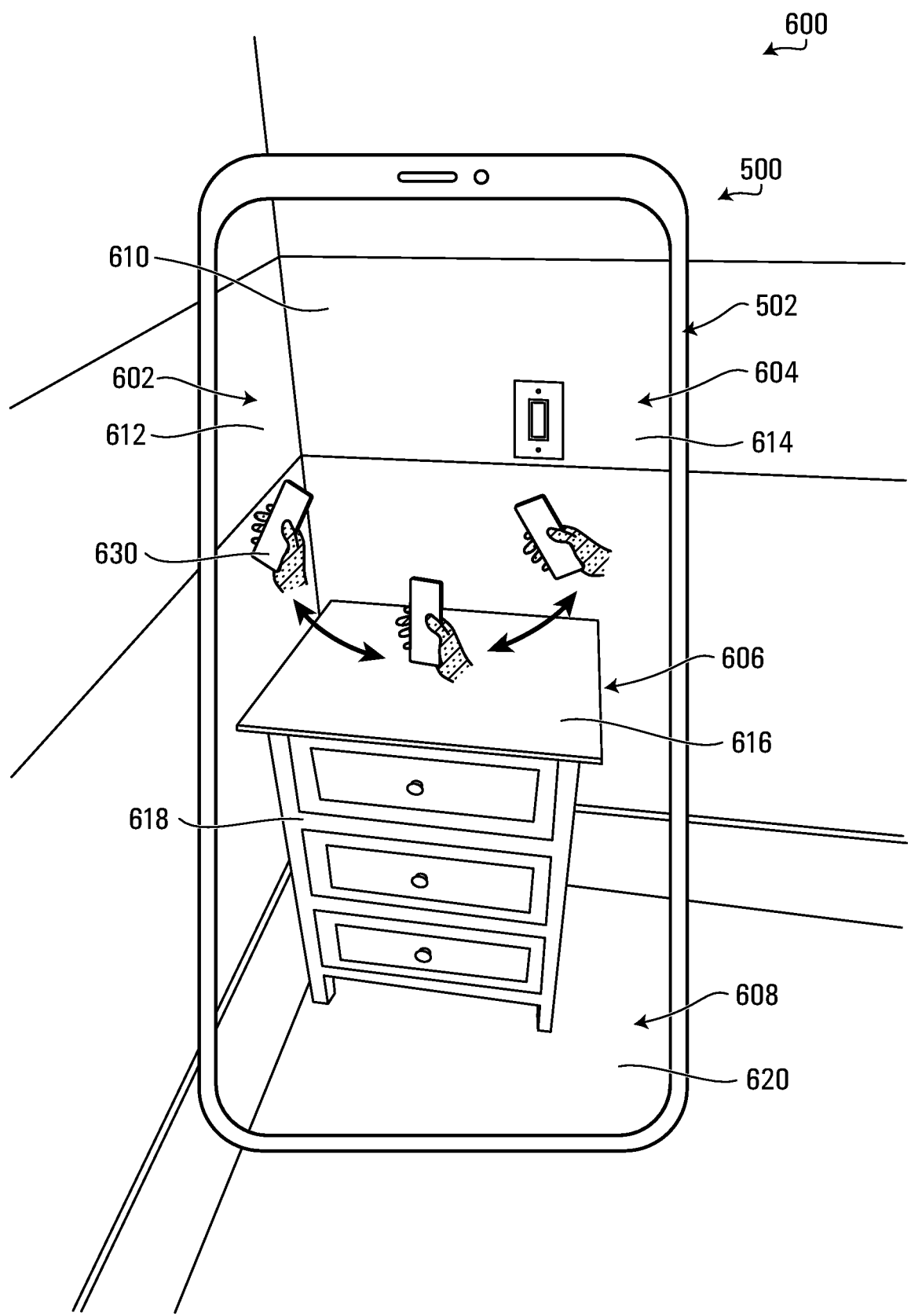
FIG. 6A is a perspective view of a physical environment and a user device depicting an AR space representative of the physical environment in a field of view of the user device after an AR experience has been initiated on the user device, according to an embodiment.

FIG. 6A is a perspective view of a physical environment 600 and the user device 500 after an AR experience has been initiated on the user device 500, according to an embodiment. The AR experience may have been initiated by selection of the link 516 of FIG. 5, for example. In FIG. 6A, the touch screen display 502 of the user device 500 depicts an AR space 610 representative of the physical environment 600 in a field of view of the user device 500. In this example, the physical environment 600 in the field of view of the user device 500 is the corner of a room that includes portions of two walls 602 and 604, a side table 606 and a portion of a floor 608.

At this stage of initiating the AR experience the user device 500 may perform surface detection in order to detect surfaces of the physical environment 600. As discussed previously, surface detection may be done using multiple methods, including, but not limited to: image analysis; multi-camera triangulation to determine distances across multiple points; depth camera measurements; LIDAR/RADAR measurements from the user device 500, etc. In this example, the user device 500 may detect the surfaces 612 and 614 of the walls 602 and 604, the top surface 616 and the front surface 618 of the side table 606 and the surface 620 of the floor 608. In some implementations, at this stage the user device 500 may provide the user with a prompt to move the user device from side to side or in a panning motion in order to facilitate surface detection. For example, the prompt may be in the form of an animation 630 or a written message prompting the user to move the user device 500. In some implementations, in addition to the detecting surfaces of the physical environment, surface detection may identify any, some or all of the special features in the space, and provide the position (including the location and orientation) and the dimensions of the features in the space. Non-limiting examples of such features include the surfaces, edges and corners in the space.

Figure 6B:
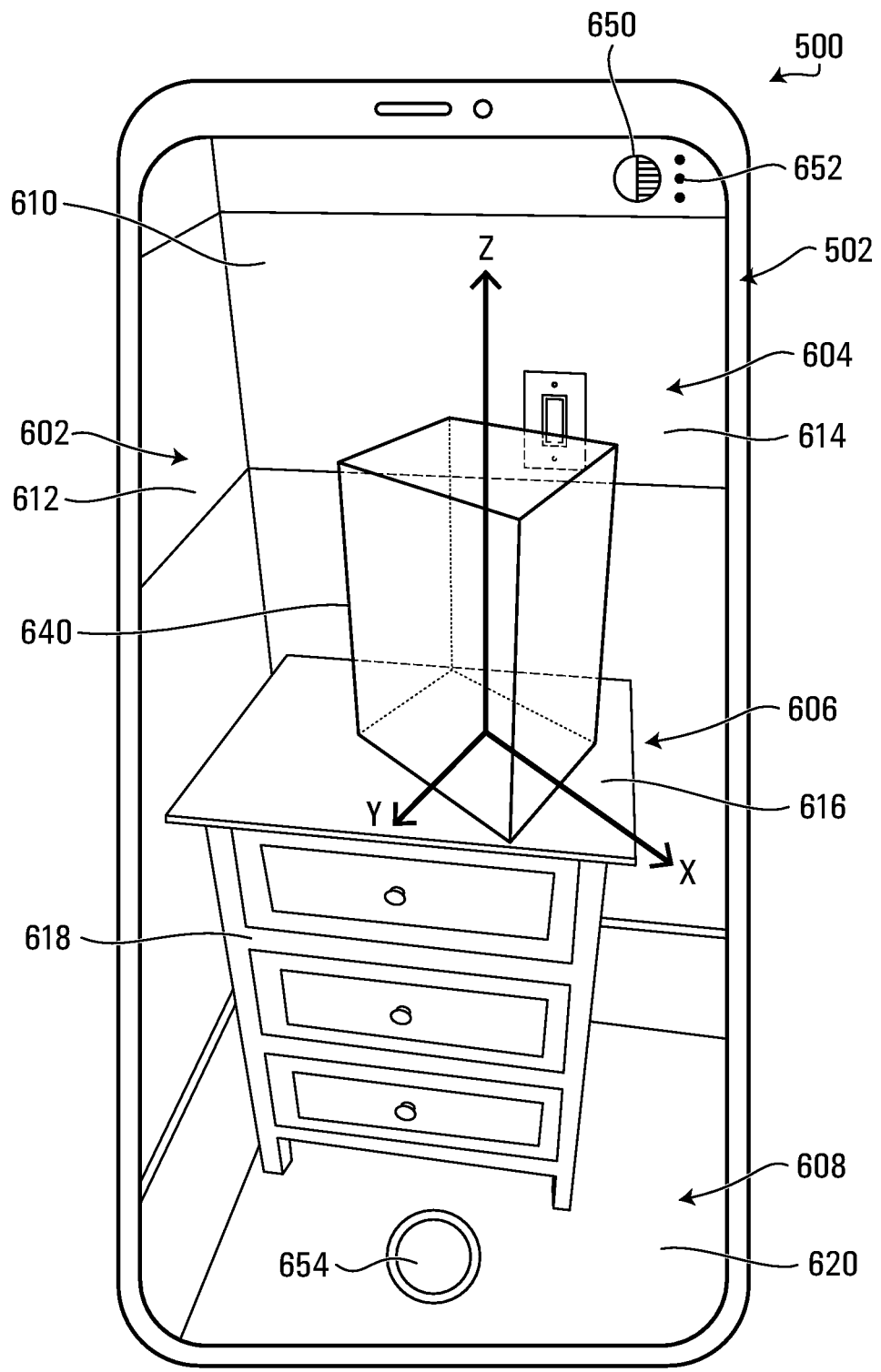
FIG. 6B illustrates the user device of FIG. 6A depicting a perspective view of the AR space with a 3D representation of the virtual object positioned at a first position within the AR space, according to an embodiment.

FIG. 6B illustrates the user device 500 depicting a perspective view of the AR space with a 3D representation of a virtual object 640 positioned at a first position adjacent to the detected top surface 616 of the side table 606, according to an embodiment. In this example, the 3D representation of the virtual object 640 is rendered as a partially transparent frame model sized according to the dimensions of the lamp from the product page 510 of FIG. 5. In some implementations, the 3D dimensions of the virtual object are obtained in step 402 of the method 400 of FIG. 4. As discussed previously, in some implementations a virtual coordinate system may be mapped to the AR space. For example, the virtual coordinate system may be a Cartesian coordinate system including an x-axis, y-axis and z-axis. As shown in FIG. 6B, the Cartesian coordinate system may be anchored at the first position of the 3D representation of the virtual object 640, such that the 3D representation of the virtual object 640 is positioned at the origin of the virtual coordinate system. However, this is not necessary, and in other implementations the origin of a virtual coordinate system may be anchored at another point in the AR space 610 and the 3D representation of the virtual object 640 may be positioned at a first position elsewhere in the AR space 610. In some implementations, the first position of the 3D representation of the virtual object 640 may be automatically selected by the user device 500, e.g., the user device 500 may attempt to automatically position the 3D representation of the virtual object 640 in the AR space 610 in a position that is collision-free, i.e., in a position in which no surface of the 3D representation of the virtual object 640 crosses a detected surface of the AR space 610 when the 3D representation of the virtual object 640 is positioned adjacent to a detected surface of the AR space 610. In other implementations, a user of the user device 500 may select the first position of the 3D representation of the virtual object 640 in the AR space 610.

As shown in FIG. 6B, the display of the AR space 610 on the user device 500 may include several user-selectable elements, such as the user-selectable elements 650, 652 and 654, that may allow the user to initiate further processes, change settings related to the display of the AR space, etc. For example, in FIG. 6B, the user-selectable element 650 is user-operable to selectively turn a "blend" function on and off. The blend function can change the display of the 3D representation of the virtual object 640 within the AR space such that any portion of the 3D representation of the virtual object 640 having a blocked line of sight to the user device 500 is visually occluded or otherwise displayed in a manner that is distinct from other parts of the 3D representation of the virtual object 640 that have a clear line of sight to the user device 500. The blend function and its potential use is assisting a user in assessing the 3D fit of a virtual object in a bounded 3D space is discussed in further detail below with reference to FIG. 6E. As another example, in FIG. 6B, the user-selectable element 654 is user-operable to cause the user device 500 to capture an image or video of the AR space 610, e.g., using one or more cameras of the user device 500, which can then potentially be shared with one or more other users. The user-selectable element 652 may be selectable by the user to access other settings for the AR experience, such as adjusting other display properties of the AR space. For example, such display properties could include adjusting the color(s) used to render 3D representations of virtual objects, adjusting the opacity with which 3D representations of virtual objects or portions thereof are rendered (e.g., from partially transparent to totally opaque). Examples of uses of such settings and adjustments are discussed later with reference to FIGS. 9 to 15.

The 3D representation of the virtual object 640 is repositionable in the AR space 610. For example, if the orientation of the 3D representation of the virtual object 640 is not how the user desires, the user may be able to rotate the 3D representation of the virtual object 640 around its centre, e.g., around the z-axis shown in FIG. 6B. The user may also or instead be able to adjust the center of the object in relation to the scene, to slide it forward, backward or sideways in the AR space 610, for example. For example, the 3D representation of the virtual object 640 may be repositionable in the AR space responsive to user inputs received by the user device 500 through the touch screen display 502. For example, the user may be able to drag the 3D representation of the virtual object 640 to a new location in the AR space 610 by contacting one of the displayed surfaces of the 3D representation of the virtual object 640 on the touch screen display 502, dragging the 3D representation of the virtual object 640 to the new location in the AR space while maintaining contact with the touch screen display 502 and then releasing the contact in order to place the 3D representation of the virtual object 640 at the new location. In some implementations, the user can rotate the 3D representation of the virtual object 640 around its centre, e.g., around the z-axis shown in FIG. 6B, by contacting the touch screen display 502 in an area of the top surface 616 of the side table 606 proximate to the base of the 3D representation of the virtual object 640, and then dragging the point of contact to the left or to the right on the touch screen display 502 in order to rotate the 3D representation of the virtual object 640 clockwise or counter clockwise around its centre.

Figure 6C:
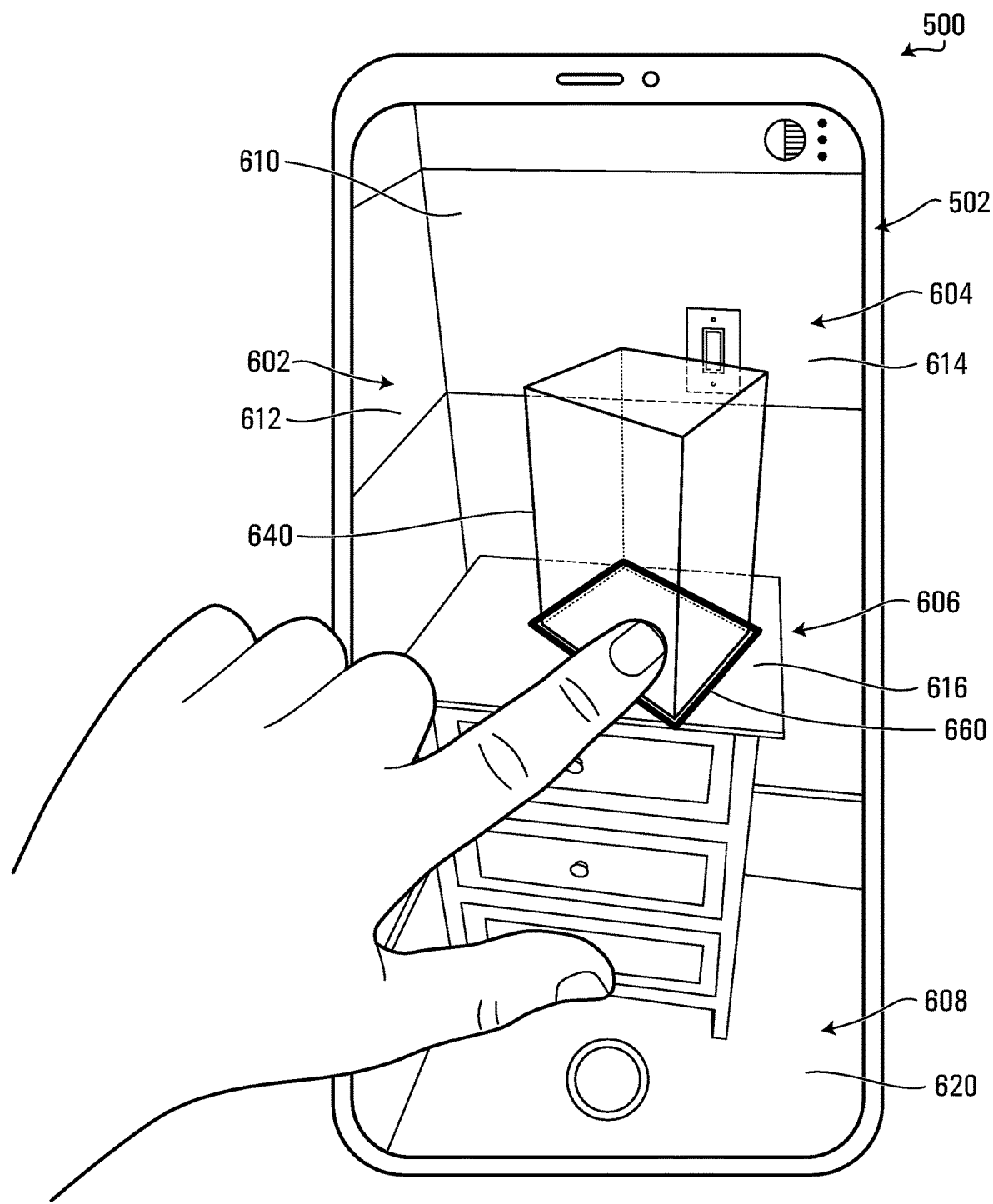
FIG. 6C illustrates the user device of FIG. 6A depicting a perspective view of the AR space as the 3D representation of the virtual object is being repositioned, at a first point in time, according to an embodiment.

FIG. 6C illustrates the user device 500 depicting a perspective view of the AR space 610 as the 3D representation of the virtual object 640 is being repositioned, at a first point in time, according to an embodiment. In particular, FIG. 6C illustrates an example in which, at the first point in time, the user has contacted the touch screen display 502 in an area of the top surface 616 of the side table 606 proximate to the base of the 3D representation of the virtual object 640 and is in the process of rotating the 3D representation of the virtual object 640 about its center to adjust the orientation of the 3D representation of the virtual object 640 in the AR space 610. As shown in FIG. 6C, in some implementations when a user interacts with the 3D representation of the virtual object 640, e.g., by contacting the touch screen display 502 in an area depicting the 3D representation of the virtual object 640 and/or an area proximate thereto, the user device 502 may update the display of the AR space 510 by adding the display of an outline 660 around the surface of the 3D representation of the virtual object 640 that can be anchored to a detected surface of the AR space 610. The outline 660 may remain displayed so long as the user continues to interact with the 3D representation of the virtual object 640, e.g., so long as the user maintains a point of contact with the touch screen display 502, for example. The outline 660 lets the user know that the 3D representation of the virtual object 640 can be rotated about an axis perpendicular to the outline 660 and/or slid forward, backward or sideways in the AR space 610. For example, at the first point in time depicted in FIG. 6C, the outline 660 lets the user know that the 3D representation of the virtual object 640 can be rotated about an axis perpendicular to the surface of the 3D representation of the virtual object 640 that is adjacent to the top surface 616 of the side table 606.

Figure 6D:
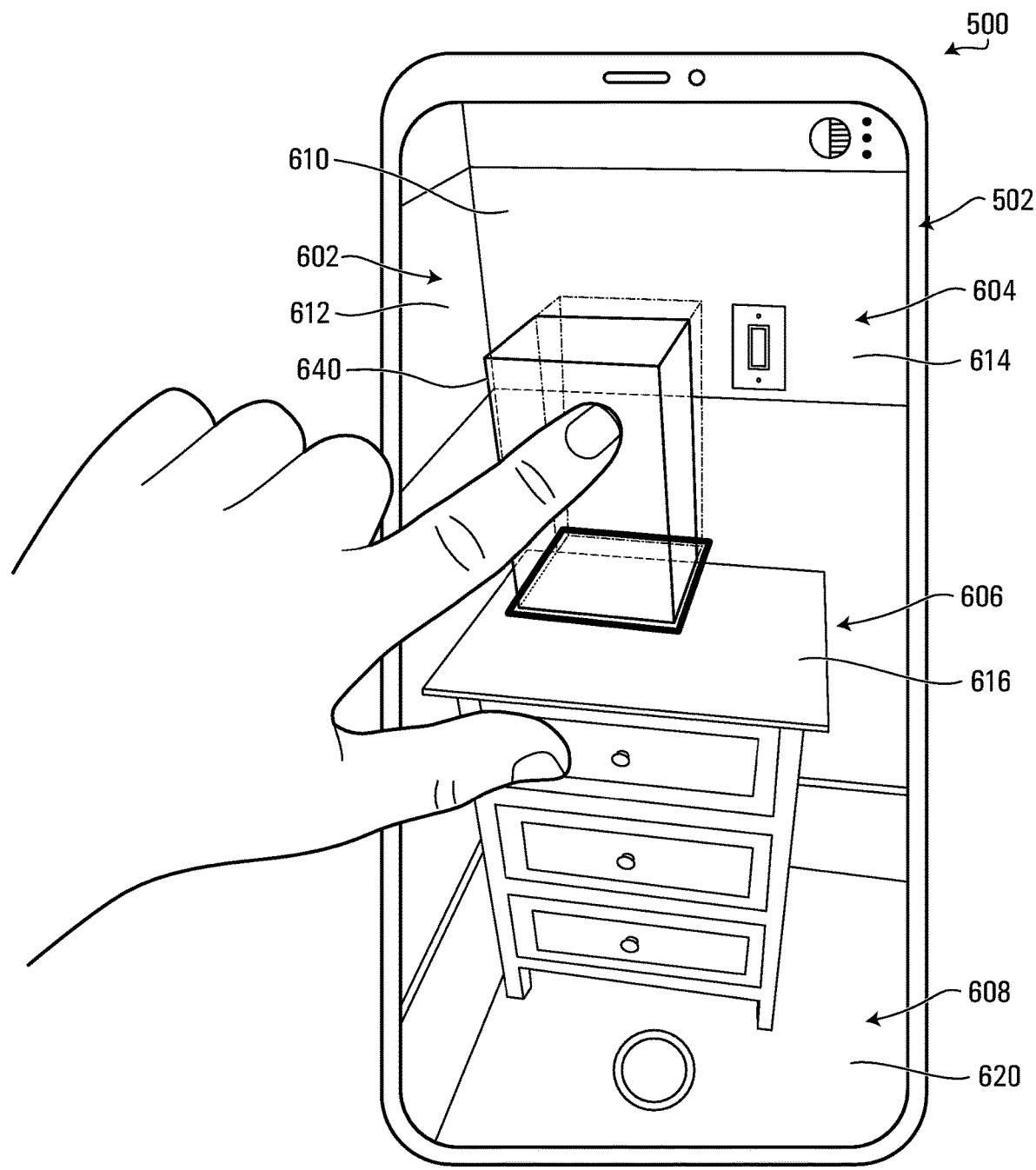
FIG. 6D illustrates the user device of FIG. 6A depicting a perspective view of the AR space as the 3D representation of the virtual object is being repositioned, at a second point in time, according to an embodiment.

FIG. 6D illustrates the user device 500 depicting a perspective view of the AR space 610 as the 3D representation of the virtual object 640 is being repositioned, at a second point in time, according to an embodiment. In particular, at the second point in time depicted in FIG. 6D, the user has dragged the 3D representation of the virtual object 640 to a second position within the AR space 610 that is more proximate to the corner of the two walls 602 and 604.

Figure 6E:
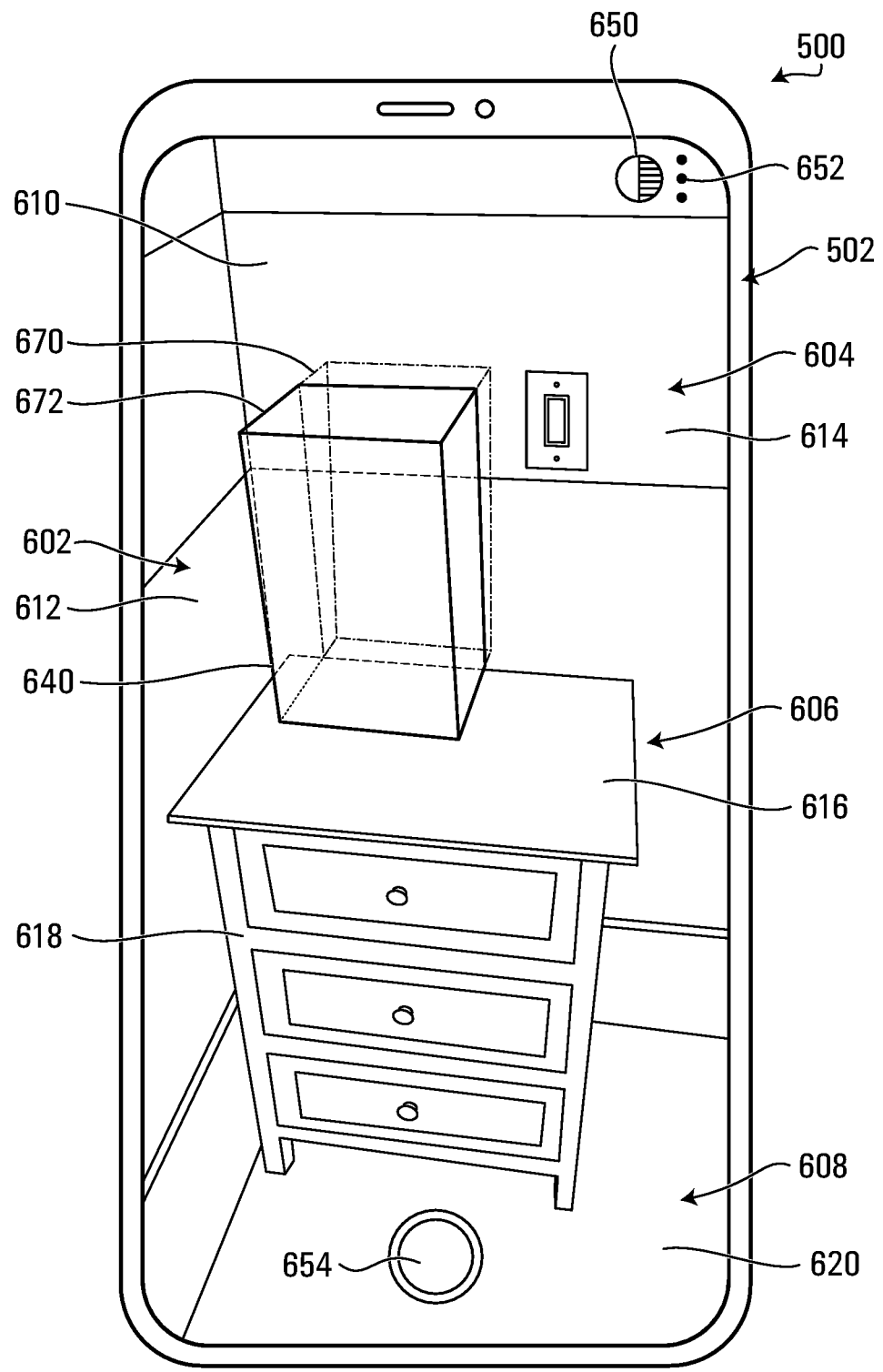
FIG. 6E illustrates the user device of FIG. 6A depicting a perspective view of the AR space after the 3D representation of the virtual object has been repositioned to a second position within the AR space, according to an embodiment.

FIG. 6E illustrates the user device 500 depicting a perspective view of the AR space 610 after the 3D representation of the virtual object 640 has been repositioned to the second position within the AR space 610 by the user, according to an embodiment. At this stage, collision detection by the user device 500 may allow the user device 500 to alert the user that there is a collision between a rear portion 670 of the 3D representation of the virtual object 640 and the wall 604. For example, this collision may be detected by the user device 500 based on a determination that, in the second position, the rear portion 670 of the 3D representation of the virtual object 640 crosses the boundary of the AR space 610 established by the surface 614 of the wall 604. In the example illustrated in FIG. 6E, the blend function has been activated so that the rear portion 670 of the 3D representation of the virtual object 640 that does not have an unblocked line of sight to the user device 500 (due to being blocked by the wall 604) is displayed in a manner that is distinct from the remaining front portion 672 of the 3D representation of the virtual object 640. For example, the rear portion 670 may be displayed with less opacity than the front portion (e.g., the rear portion 670 may be displayed with 50% of the opacity of the front portion). In some cases, only the frame edges of the rear portion 670 may be displayed and the planar surfaces of the rear portion may be transparent. In some cases, the rear portion 670 may be displayed using different color(s) than the front portion 672. In still other cases, the rear portion 670 behind the surface 614 of the wall 604 may not be displayed and the rear edges of the front portion 672 that intersect the surface 614 of the wall may be displayed with a color that indicates a collision, e.g., red. In addition or instead the user device 500 may provide one or more other indicators indicating a collision has been detected, as discussed earlier.

Figure 6F:
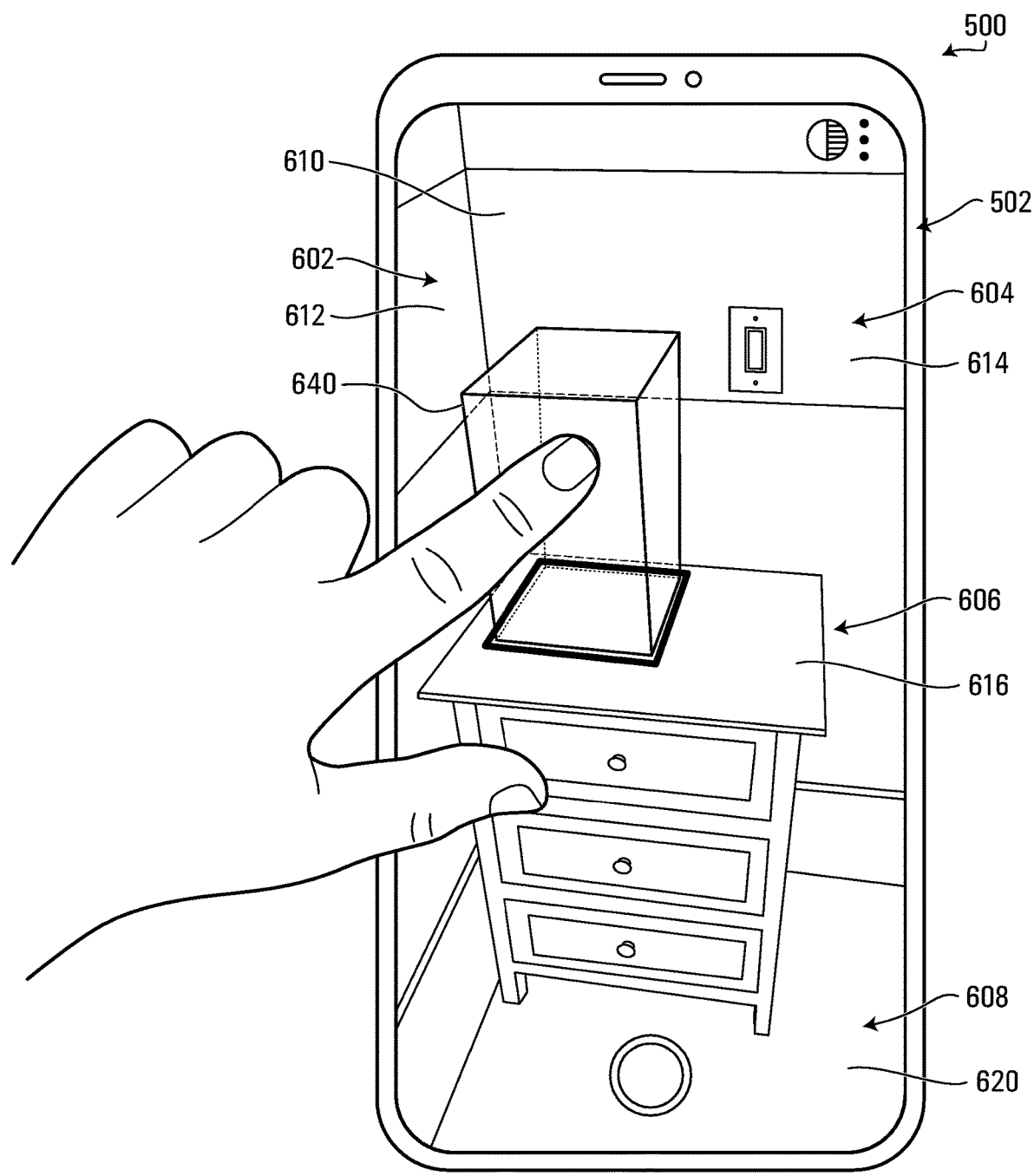
FIG. 6F illustrates the user device of FIG. 6A depicting a perspective view of the AR space as the 3D representation of the virtual object is being repositioned, at a third point in time, according to an embodiment.

FIG. 6F illustrates the user device 500 depicting a perspective view of the AR space 610 as the 3D representation of the virtual object 640 is being repositioned in the AR space 610, at a third point in time, according to an embodiment. In particular, at the third point in time depicted in FIG. 6F, the user has dragged the 3D representation of the virtual object 640 to a third position within the AR space 610 that is more proximate to the front edge of the top surface 616 of the side table 606 in order to remedy the collision detected when the 3D representation of the virtual object 640 was in the second position depicted in FIG. 6E.

Figure 6G:
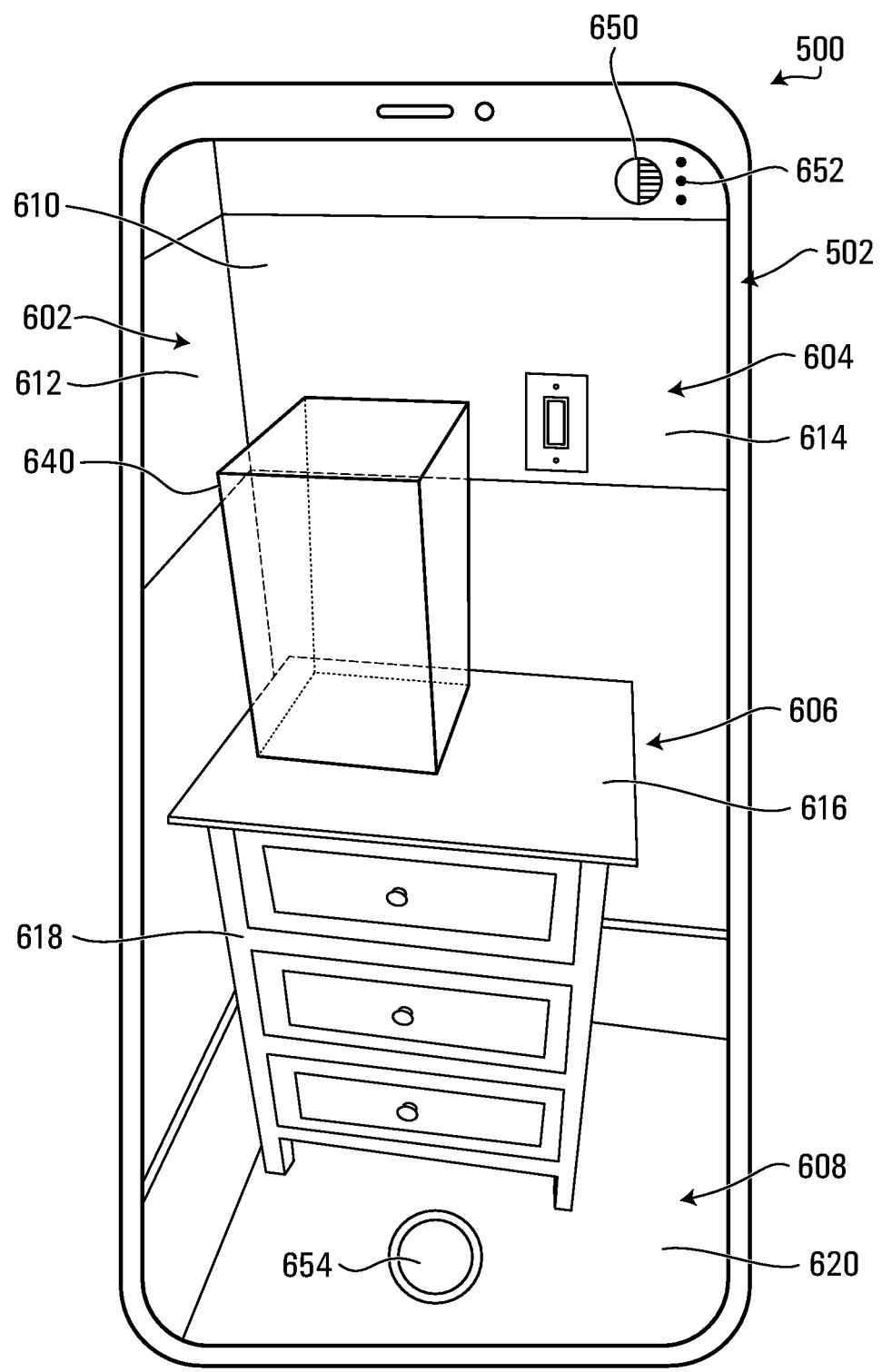
FIG. 6G illustrates the user device of FIG. 6A depicting a perspective view of the AR space after the 3D representation of the virtual object has been repositioned to a third position within the AR space, according to an embodiment.

FIG. 6G illustrates the user device 500 depicting a perspective view of the AR space 610 after the 3D representation of the virtual object 640 has been repositioned to the third position within the AR space 610, according to an embodiment. In some implementations, rather than being moved from the second position depicted in FIG. 6E to the third position depicted in FIG. 6G in response to user input (e.g., in response to the user dragging the 3D representation of the virtual object 640 from the second position to the third position as shown in FIG. 6F), the user device 500 may instead automatically reposition the 3D representation of the virtual object 640 responsive to the collision detected in the second position. For example, repositioning from the second position to the third position may be the result of one or more of the automatic repositioning processes discussed earlier. At this stage, collision detection by the user device 500 indicates that no collision is detected between the 3D representation of the virtual object 640 and any surface of the AR space. In some implementations, the user device 500 may provide the user with one or more indicators indicating that no collision is detected, which indicates that the 3D representation of the virtual object physically fits within the bounded space defined by the spatial features of the AR space 610.

Figure 6H:
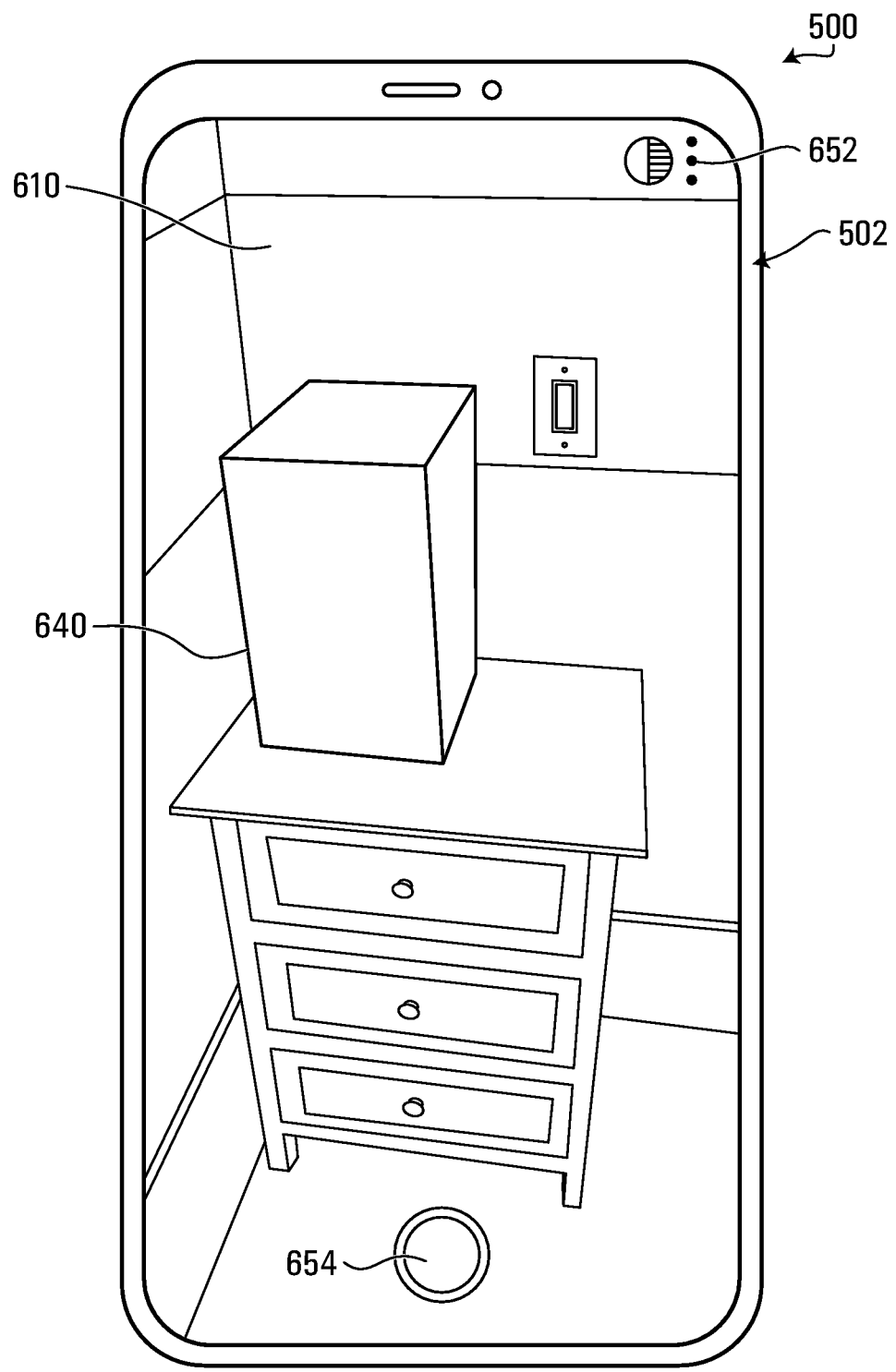
FIG. 6H illustrates the user device of FIG. 6A depicting the perspective view of the AR space illustrated in FIG. 6G, but in which an opacity of the 3D representation of the virtual object has been changed, according to an embodiment.

FIG. 6H illustrates the user device 500 depicting the perspective view of the AR space 610 illustrated in FIG. 6G, but in which an opacity of the 3D representation of the virtual object 640 has been changed, according to an embodiment. For example, the opacity of the 3D representation of the virtual object 640 may have been changed by the user by accessing a setting accessible through the user-selectable element 652, as discussed earlier. In some cases a user may choose to change the opacity of the 3D representation of the virtual object to make it opaque so that it appears to be a solid object.

Figure 6I:
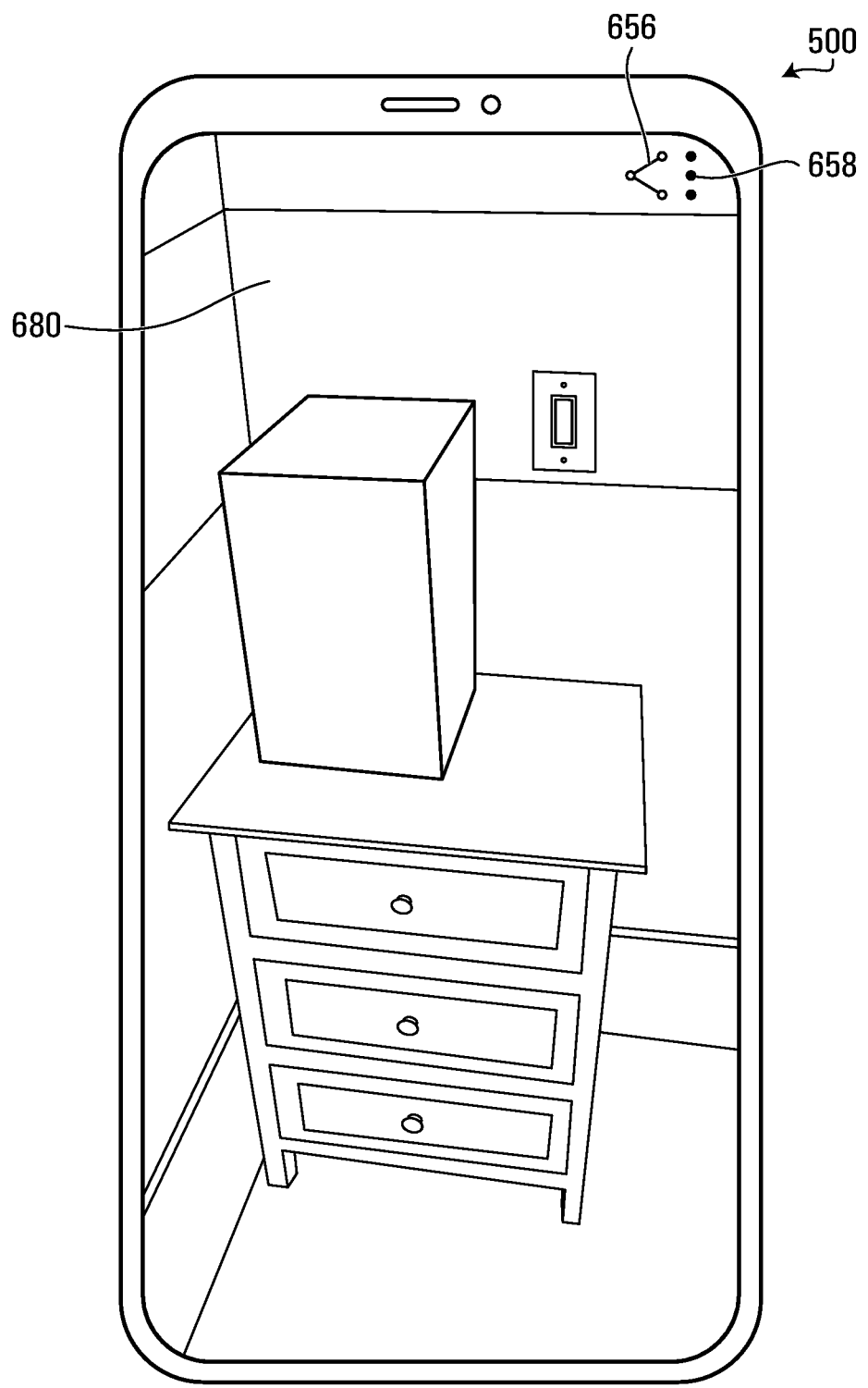
FIG. 6I illustrates the user device of FIG. 6A depicting an image captured by the user device of the AR space illustrated in FIG. 6G, according to an embodiment.

As noted earlier, the user-selectable element 654 is user-operable to cause the user device 500 to capture an image or video of the AR space 610, e.g., using one or more cameras of the user device 500, which can then potentially be shared with one or more other users. FIG. 6I illustrates the user device 500 depicting an image 680 captured by the user device of the AR space 610 illustrated in FIG. 6H, according to an embodiment.

As shown in FIG. 6I, the display of the image 680 on the user device 500 may include several user-selectable elements, such as the user-selectable elements 656 and 658, that may allow the user to initiate further processes, change settings related to the display of the image, etc. For example, in FIG. 6I, the user-selectable element 656 is operable by the user to initiate the sharing of the image 680 with one or more other users, e.g., by transmitting image data for the image 680 for display on user devices associated with the one or more other users. This allows the user of the user device 500 to share with others how the 3D representation of the virtual object physically fits within the physical environment represented by the AR space 610, for example. The user-selectable element 658 may be similar to the user-selectable element 652 of FIGS. 6B-6H, in that it may be selectable by the user to access other settings for the image, such as adjusting other display properties of the image or even editing the image (e.g., cropping, applying filters, changing file size/resolution, etc.)

It is noted that in the example shown in FIGS. 6B-6I, the 3D representation of the virtual object 640 is positioned adjacent to a horizontal surface of the AR space, i.e., the horizontal top surface 616 of the side table 606. However, this is not necessary, and in other embodiments the 3D representation of a virtual object may be positioned adjacent to a non-horizontal surface, e.g., a vertical surface such as the surface of a wall. For example, in some embodiments a virtual object representative of a television or some other object that a user may wish to mount on a wall, may be positioned and anchored to a surface of a wall within an AR space. In some implementations, the orientation of detected surfaces may be determined in conjunction with measurements from various other sensor systems of a user device, such as an accelerometer or gyroscope that can provide pose or orientation data referenced to the direction of gravity.

As noted above, the AR experience provided by the user device 500 depicted in FIGS. 6A-6I may have been initiated by user selection of the link 516 on the lamp product page 510 depicted in FIG. 5. For example, as explained above the link 516 may be a size link as described herein, the selection of which causes a browser application of the user device 500 to access an AR web page such as the AR web page 310 of FIG. 3 that enables the user device 500 to provide the AR experience.

In addition or instead a user of a user device may access an AR web page such as the AR web page 310 of FIG. 3 to create a size link by selecting the 3D dimensions of a virtual object based on a specific item that the user wishes to assess the size of in an AR experience. An example of such an embodiment is described below in further detail with reference to FIGS. 7 to 9.

Figure 7:
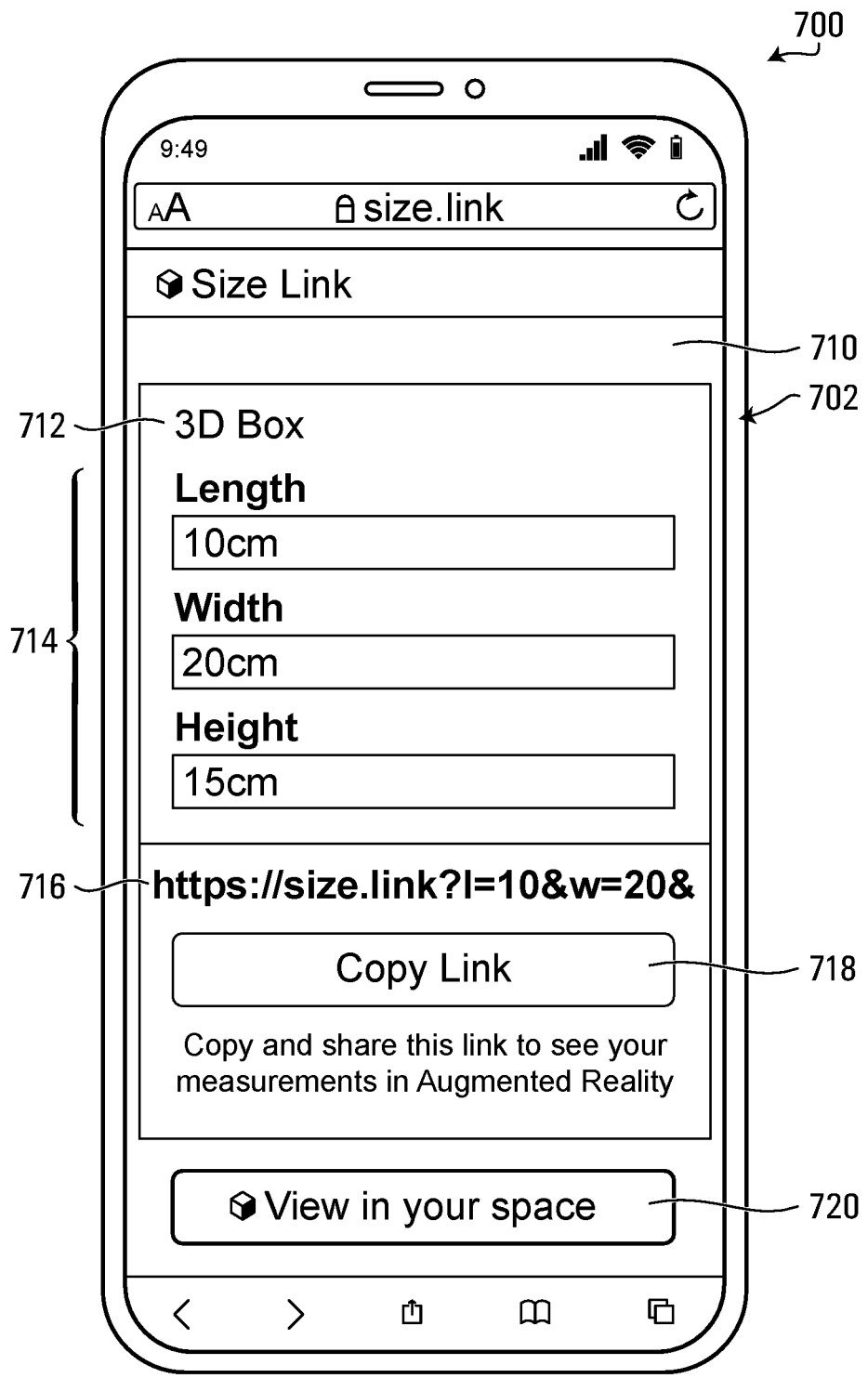
FIG. 7 illustrates a user device displaying a web page that enables a user to enter the length, width and height dimensions of an object and launch an AR experience to view a 3D representation of the object within a physical environment, according to an embodiment.

FIG. 7 illustrates a user device 700 displaying a web page 710 that enables a user to enter the length, width and height dimensions of a virtual object and launch an AR experience to view a 3D representation of the virtual object within a physical environment, according to another embodiment of the present disclosure.

In the embodiment illustrated in FIG. 7, the user device 700 includes a touch screen display 702 that is displaying the web page 710 in a browser application of the user device 700. The web page 710 includes an indicator 712 indicating that the shape of the virtual object is that of a 3D box. However, this is merely one example of a 3D shape of a virtual object that may be dimensioned and visualized in an AR experience according to the methods described herein. Other examples of 3d shapes that may be dimensioned and visualized in an AR experience according to the methods described herein include, but are not limited to: a cylinder, a cone, a torus, a cube, a cuboid, a triangular pyramid, a square pyramid.

The web page 710 further includes fields 714 that allow a user to enter the length, width and height dimensions of a 3D box shape for the virtual object, which in this case are 10 centimeters, 20 centimeters and 15 centimeters, respectively. The web page 710 also includes an indicator 716 of a size link corresponding to the selected dimensions and a user selectable element 718 that allows a user to copy the size link, e.g., so that the particular size link can be made available to other users. Furthermore, the web page 710 includes another user selectable element 720 that allows a user of the user device 700 to directly launch an AR experience on the user device 700 to allow the user to view a 3D representation of the virtual object in an AR space representative of the user's physical environment. In some implementations, the user device 700 may launch the AR experience within the same browser application that is used to view the web page 710 without requiring a standalone AR application to be installed on the user device 700.

Figure 8:
FIG. 8 illustrates another example of a web page that enables a user to enter the length, width and height dimensions of an object to create a link that can be accessed to initiate an AR experience to view a 3D representation of the object within a physical environment, according to an embodiment.

The user device 700 is an example of a user device that is capable of providing a user with an AR experience, i.e., the user device 700 can be considered an AR device as described herein. In other implementations, an AR web page such as the AR web page 710 depicted in FIG. 7, which allows a user to create a size link may be accessed by a user device that is not itself capable of providing an AR experience. For example, FIG. 8 illustrates another example of a web page 810 that enables a user of a user device that is not necessarily capable of providing an AR experience to enter the length, width and height dimensions of an object to create a link that can be accessed to initiate an AR experience to view a 3D representation of the object as described herein. For example, the web page 810 may be viewed in the browser application of a desktop computer that is not itself capable of providing an AR experience. The web page 810 has many of the same or similar elements as the web page 710 of FIG. 7, but differs therefrom in that, rather than having the user selectable element 720 that allows a user to directly launch an AR experience on the AR device through which they are viewing the web page 710, the web page 810 instead includes a quick response (QR) code encoded with information identifying a size link corresponding to the selected dimensions. The QR code can then be used to launch an AR experience on an AR device that is capable of extracting and accessing the size link from the QR code in order to view a virtual object sized according to the selected dimensions in an AR experience.

Figure 9A:
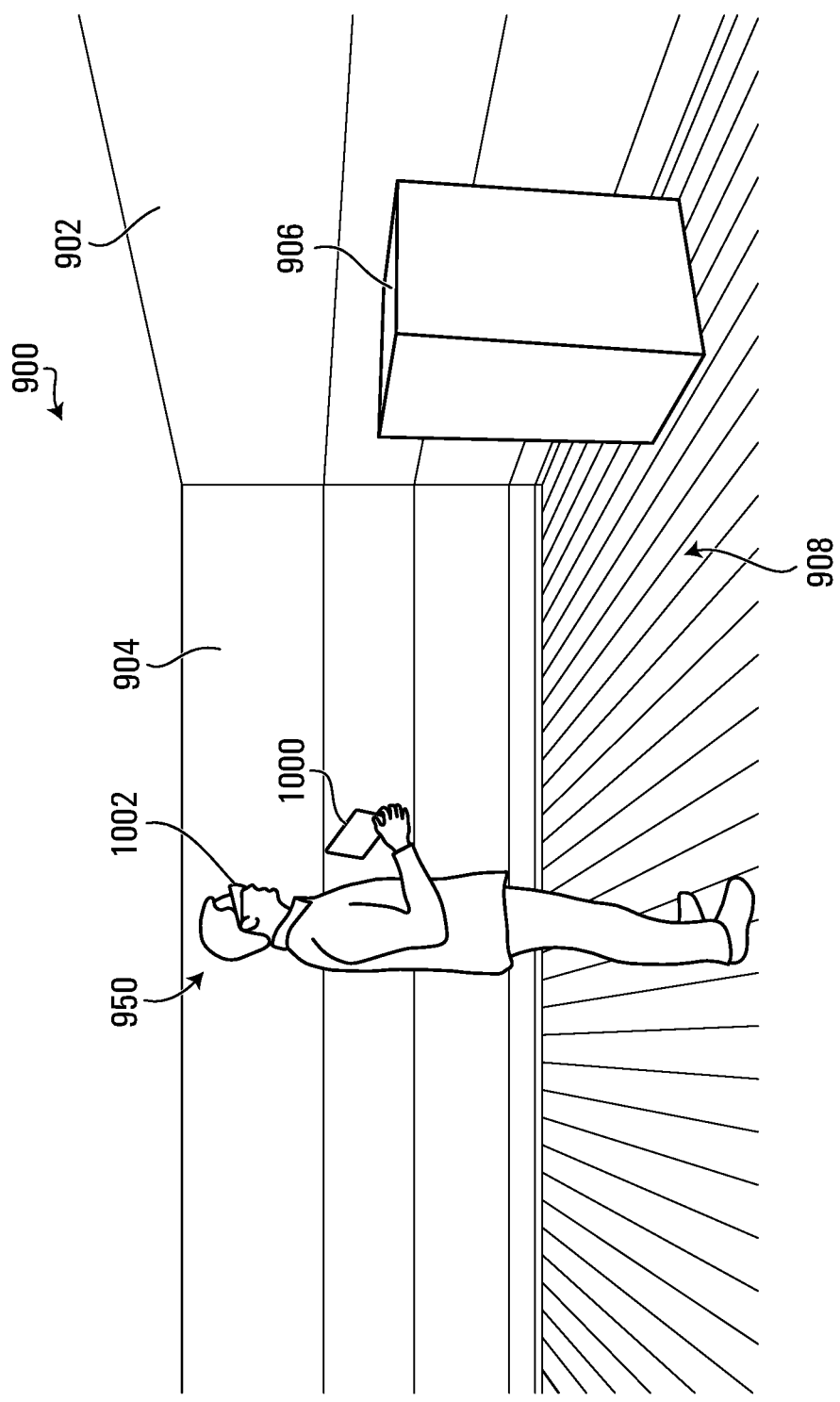
FIG. 9A is a perspective view of a physical environment, a user and a user device, according to an embodiment.

FIG. 9A is a perspective view of a physical environment 900, a user 950 and a user device 1000, according to another embodiment of the present disclosure. In this embodiment, the user device 1000 is an AR device in the form of a tablet that is capable of providing an AR experience for the user 950. In this example, the physical environment 900 includes portions of two walls 902 and 904, a box 906 and a portion of a floor 908. The physical environment 900 may be the corner of a room, a storage container or a transport vehicle (e.g., a panel van or truck trailer), for example.

For illustrative purposes, it will be assumed that at the point in time depicted in FIG. 9A, the user 950 has initiated an AR experience on the user device 1000. For example, the user 950 may have initiated the AR experience by first generating the QR code 820 on a desktop computer and then using the user device 1000 to access the size link corresponding to the QR code 820 in order to view a virtual 3D box with the dimensions shown in FIG. 8, i.e., a 3D box with length, width and height dimensions of 30 inches, 52 inches and 24 inches, respectively.

Although the AR experience described herein with reference to FIGS. 9A-9K is provided by the user device 1000, in other implementations the AR experience may be provided in conjunction with one or more other devices. For example, as shown in the FIG. 9A, in other implementations the AR experience may be at least partially provided by an AR headset 1002 worn by the user 950.

Figure 9B:
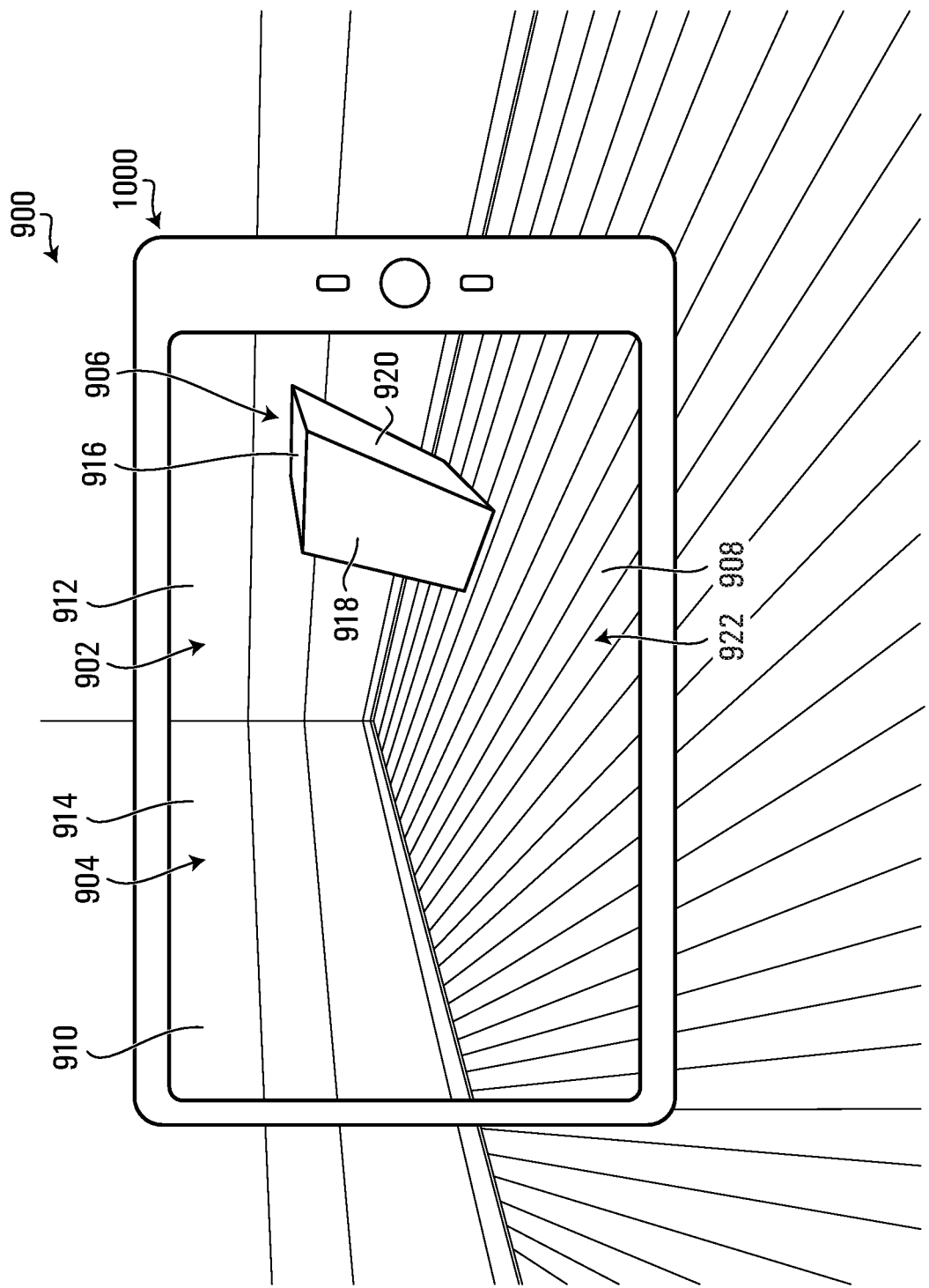
FIG. 9B is an alternative perspective view of the physical environment and user device of FIG. 9A, in which the user device is depicting an AR space representative of the physical environment in a field of view of the user device after an AR experience has been initiated on the user device, according to an embodiment.

FIG. 9B is an alternative perspective view of the physical environment 900 and user device 1000 of FIG. 9A, in which the user device 1000 is depicting an AR space 910 representative of the physical environment 900 in a field of view of the user device 1000, according to an embodiment. In particular, in FIG. 9B, a touch screen display 1002 of the user device 1000 depicts the AR space 910. As discussed previously, at this stage of the AR experience the user device 1000 may perform surface detection in order to detect surfaces of the physical environment 900. In this example, the user device 500 may detect surfaces 912 and 914 of the walls 902 and 904, the top surface 916, front surface 918 and one side surface 920 of the box 906 and surface 922 of the floor 908. In some implementations, at this stage the user device 1000 may provide the user with a prompt (not shown) to move the user device from side to side or in a panning motion in order to facilitate surface detection.

Figure 9C:
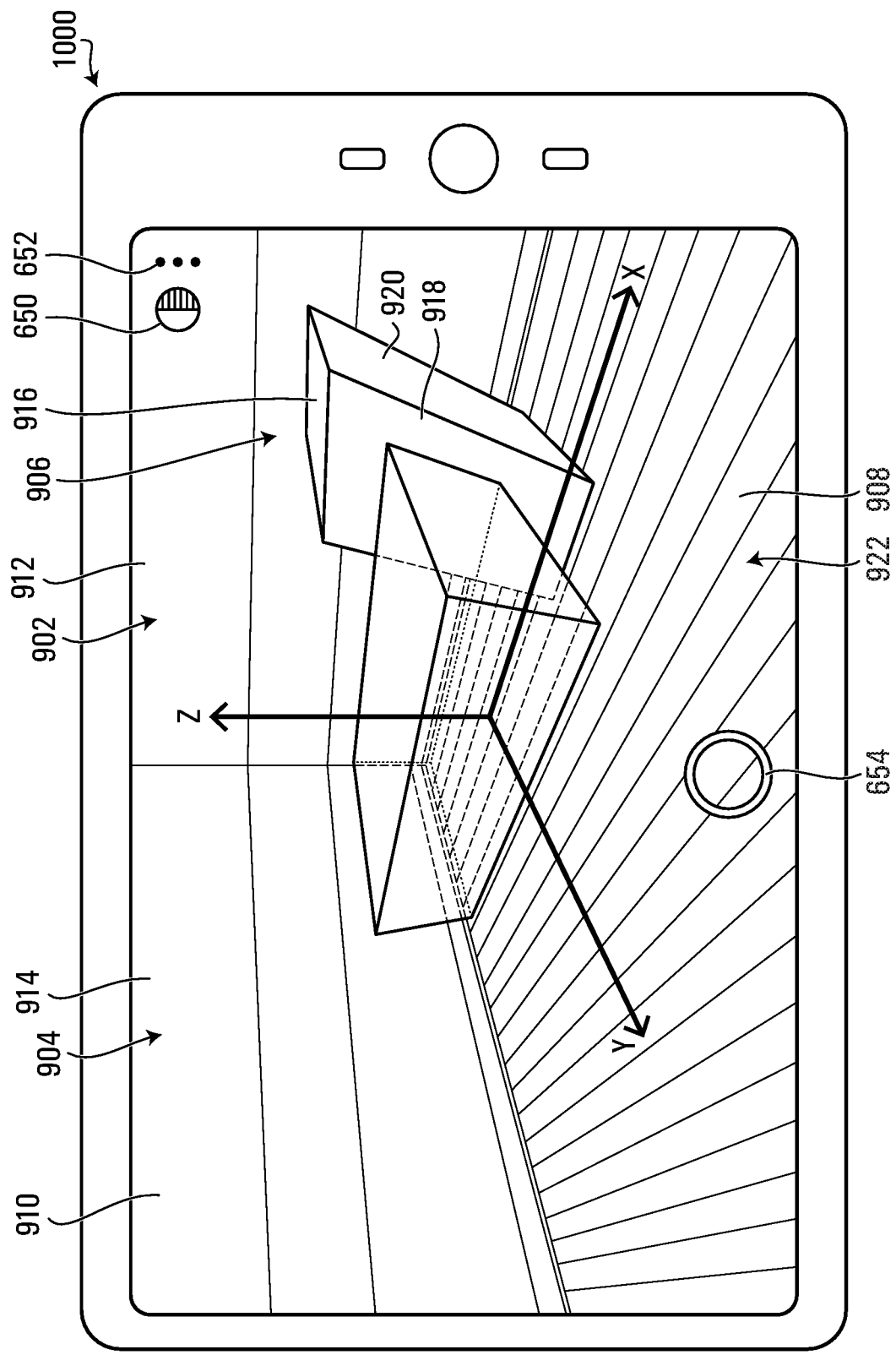
FIG. 9C illustrates the user device of FIG. 9B depicting a perspective view of the AR space with a 3D representation of a virtual object at a first position within the AR space, according to an embodiment.

FIG. 9C illustrates the user device 1000 depicting a perspective view of the AR space 910 with a 3D representation of a virtual object 940 at a first position adjacent to the detected surface 922 of the floor 908. In this example, the 3D representation of the virtual object 940 is rendered as a partially transparent frame model sized according to the dimensions selected on the web page 810 of FIG. 8. As discussed previously, in some implementations a virtual coordinate system may be mapped to the AR space 910. For example, the virtual coordinate system may be a Cartesian coordinate system including an x-axis, y-axis and z-axis as shown in FIG. 9C. It is also noted that the Cartesian coordinate system in FIG. 9C is shown as being anchored at the first position of the 3D representation of the virtual object 940. However, this is not necessary, and in other implementations the origin of a virtual coordinate system may be anchored at another point in the AR space 910 and the 3D representation of the virtual object 940 may be positioned at a first position elsewhere in the AR space 910. As discussed previously, the first position of the 3D representation of the virtual object 940 may be automatically selected by the user device 1000, or alternatively the user 950 of the user device 1000 may have selected the first position.

Similar to the display of the AR space 610 on the user device 500 shown in FIG. 6B, the display of the AR space 910 on the user device 1000 includes the user-selectable elements 650, 652 and 654 that allow the user to initiate further processes and/or change settings related to the display of the AR space 910, etc. For example, FIGS. 9D-9G, illustrate the user device 1000 depicting the perspective view of the AR space 910 illustrated in FIG. 9C but with different blend and opacity settings for the display of the 3D representation of the virtual object 940, which may assist a user in assessing the 3D fit of the virtual object 940 within the bounded space defined by the walls 902 and 904, the floor 908 and the box 906 of the physical environment 900.

Figure 9D:
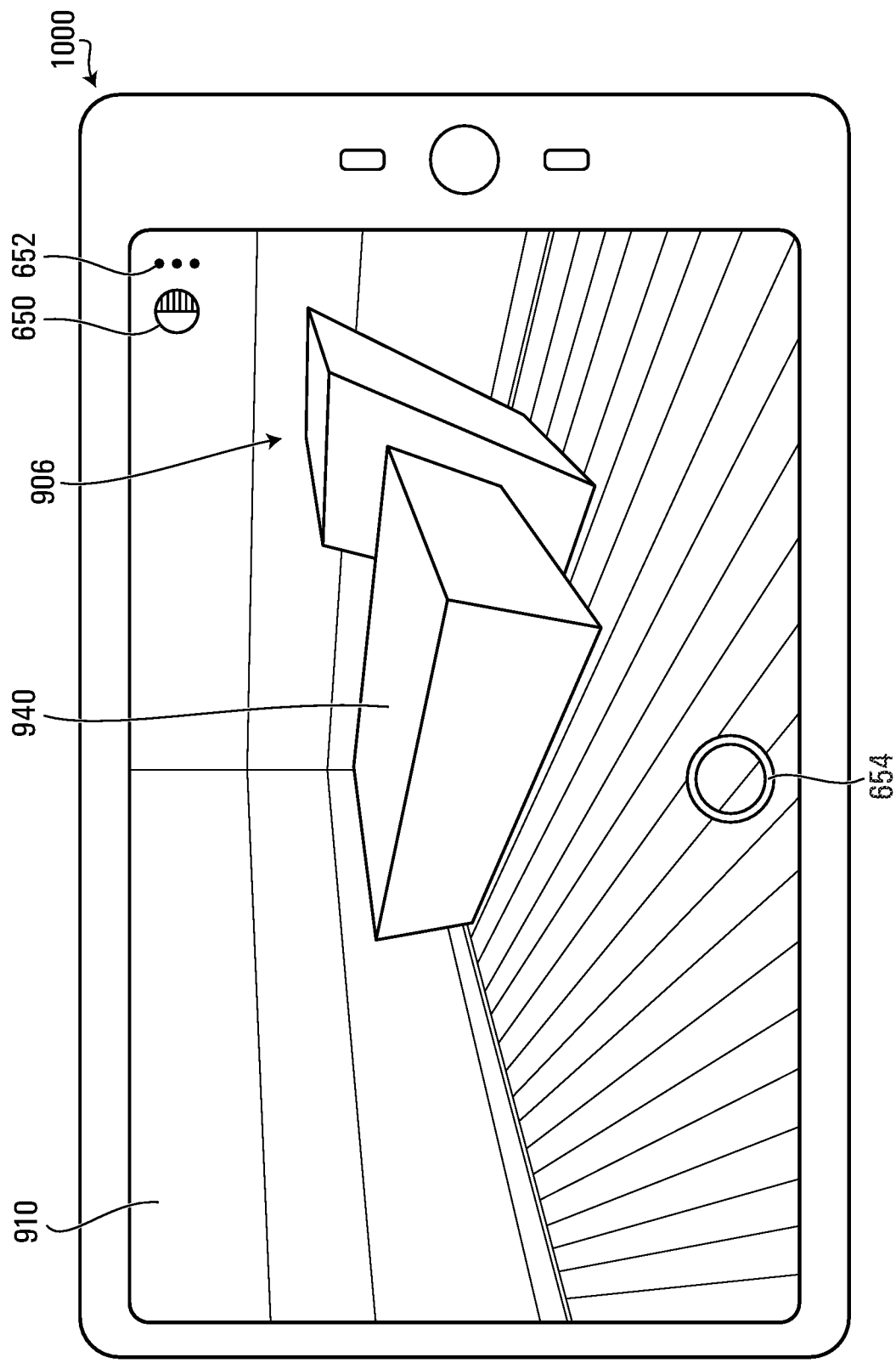
FIG. 9D illustrates the user device depicting the perspective view of the AR space illustrated in FIG. 9C, but in which an opacity of the 3D representation of the virtual object has been changed, according to an embodiment.

For example, in FIG. 9D the opacity of the 3D representation of the virtual object 940 has been changed so that the 3D representation of the virtual object 940 is rendered as an opaque object.

Figure 9E:
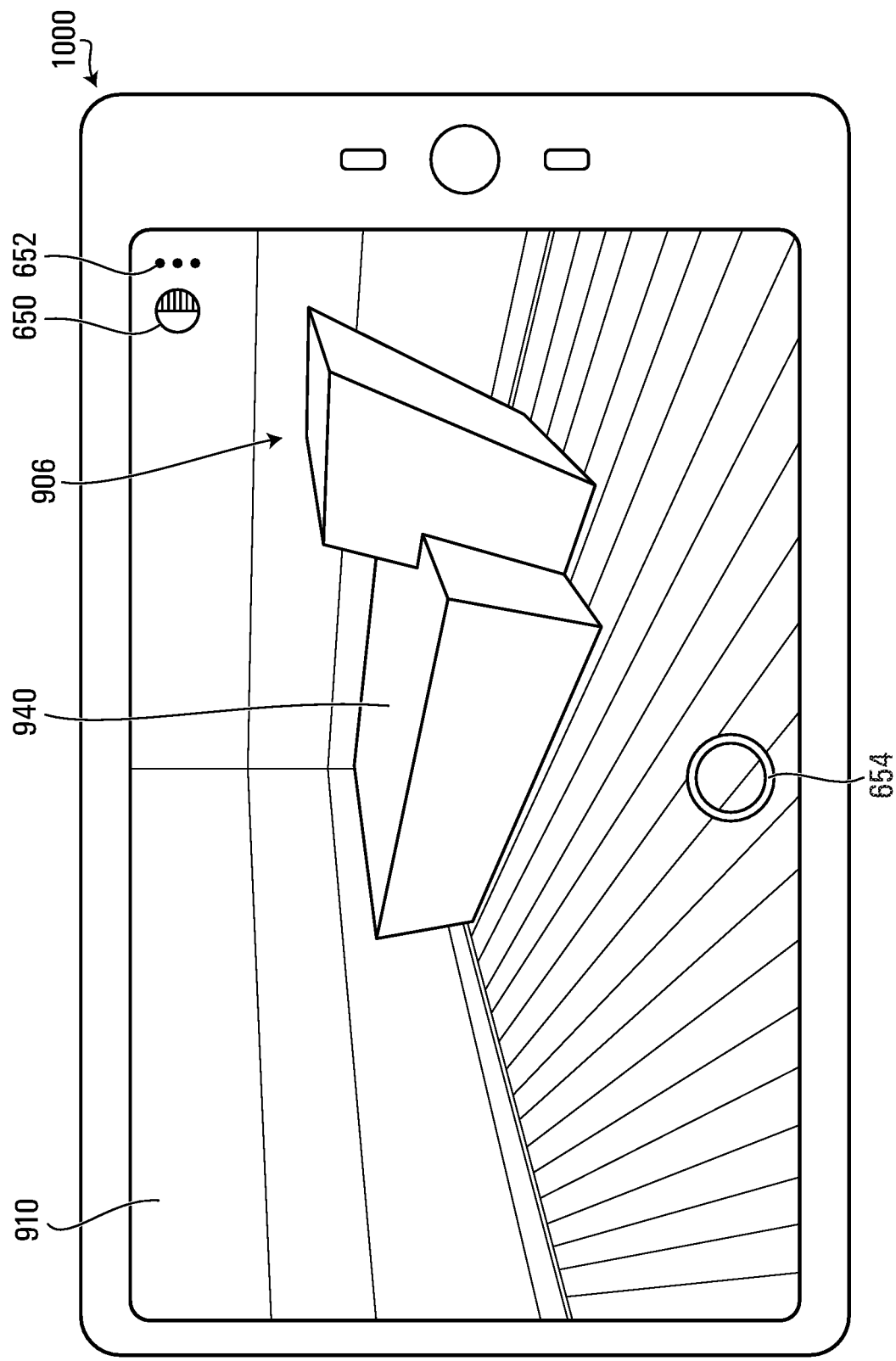
FIG. 9E illustrates the user device depicting the perspective view of the AR space illustrated in FIG. 9D, but in which the user device is configured to display the 3D representation of the virtual object within the AR space such that any portion of the 3D representation of the virtual object having a blocked line of sight to the user device is visually occluded, according to an embodiment.

It is noted that in FIGS. 9C and 9D the blend feature is deactivated. FIG. 9E illustrates the user device 1000 depicting the perspective view of the AR space 910 illustrated in FIG. 9D, but in which the blend feature has been activated so that any portion of the 3D representation of the virtual object 940 having a blocked line of sight to the user device is visually occluded. In this example, that means that a portion of the 3D representation of the virtual object 940 that is blocked by the box 906 is visually occluded.

Figure 9F:
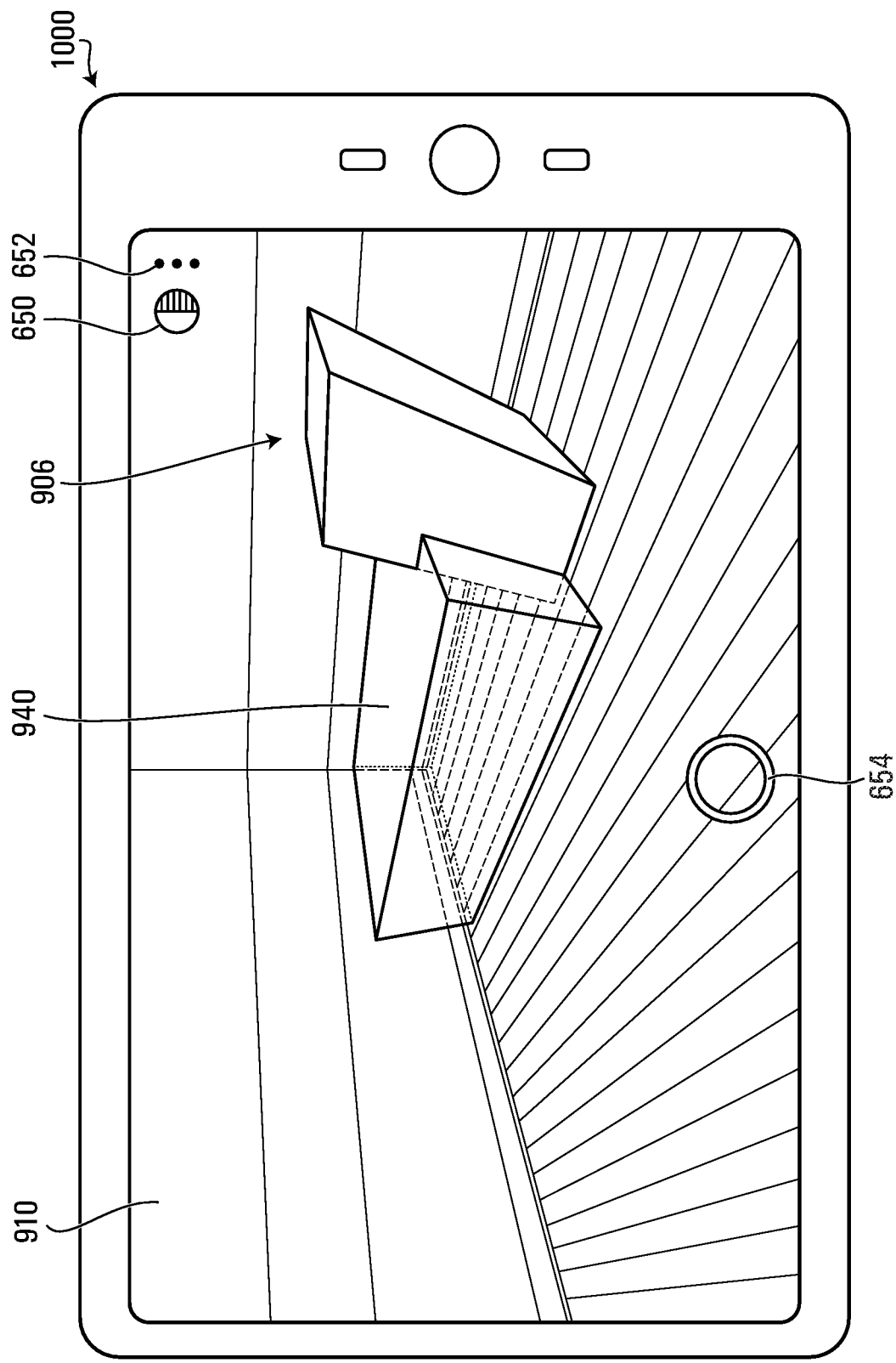
FIG. 9F illustrates the user device depicting the perspective view of the AR space illustrated in FIG. 9E, but in which an opacity of the 3D representation of the virtual object has been changed, according to an embodiment.

FIG. 9F illustrates the user device 1000 depicting the perspective view of the AR space 910 illustrated in FIG. 9E, but in which the opacity of the 3D representation of the virtual object 940 has been changed so that the 3D representation of the virtual object 940 is rendered as a partially transparent frame model. It is noted that this same view may have been obtained by activating the blend feature for the perspective view of the AR space 910 illustrated in FIG. 9C.

Figure 9G:
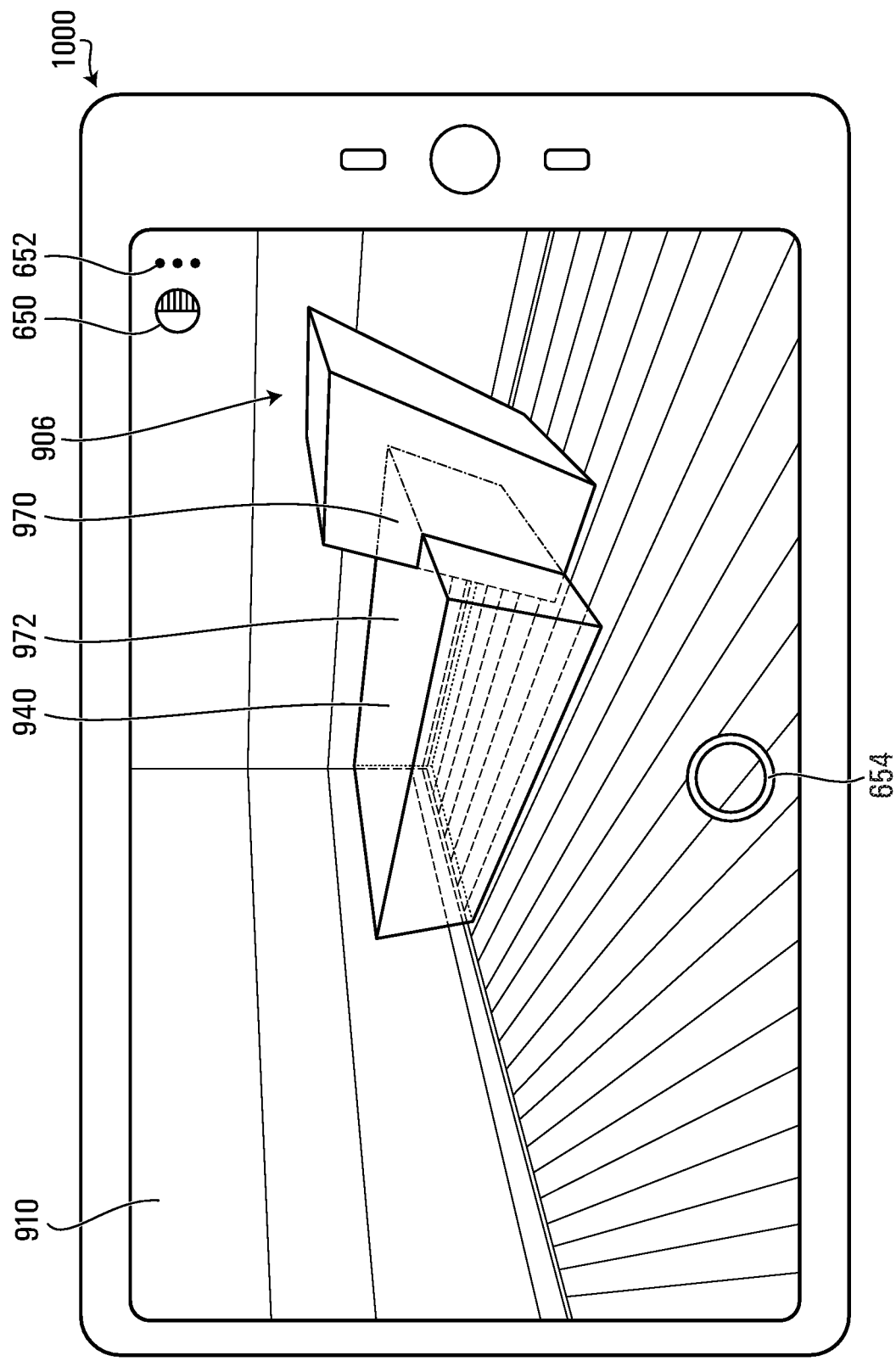
FIG. 9G illustrates the user device depicting the perspective view of the AR space illustrated in FIG. 9F, but in which portions of the 3D representation of the virtual object that are visually occluded in FIG. 9F are displayed in a manner that is visually distinguished from the remainder of the 3D representation of the virtual object, according to an embodiment.

It is noted that in FIGS. 9E and 9F the blend feature is configured so that any portion of the 3D representation of the virtual object 940 having a blocked line of sight to the user device is visually occluded. FIG. 9G illustrates the user device 1000 depicting the perspective view of the AR space 910 illustrated in FIG. 9F, but in which the blend feature is configured so that a portion 970 of the 3D representation of the virtual object 940 that is visually occluded in FIG. 9F is displayed in a manner that is visually distinguished from the remaining portion 972 of the 3D representation of the virtual object 940 that has an unblocked line of sight to the user device 1000. For example, the portion 970 may be displayed with different color(s), opacity and/or luminance than that of the remaining portion 972.

As described herein, collision detection by the user device 1000 may allow the user device 1000 to alert the user that there is a collision between the 3D representation of the virtual object 940 and the box 906. For example, this collision may be detected by the user device 1000 based on a determination that, in the first position, the portion 970 of the 3D representation of the virtual object 940 crosses the front surface 918 of the box 906.

The 3D representation of the virtual object 940 is repositionable in the AR space 910, and therefore the user may reposition the 3D representation of the virtual object 940 in order to avoid the collision between the 3D representation of the virtual object 940 and the box 906 in the first position.

Figure 9H:
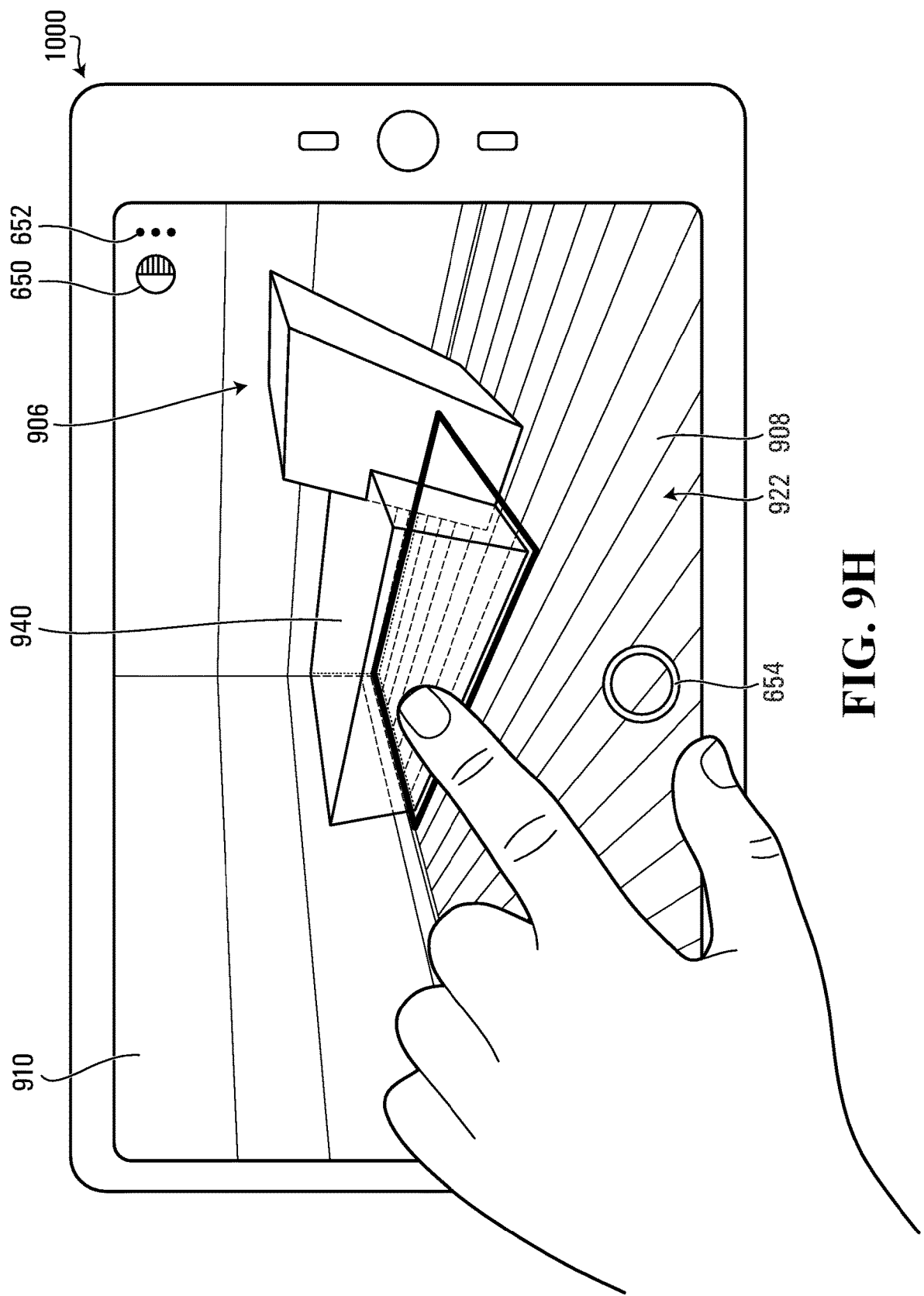
FIG. 9H illustrates the user device depicting a perspective view of the AR space illustrated in FIG. 9F as the 3D representation of the virtual object is being repositioned, at a first point in time, according to an embodiment.

FIG. 9H illustrates the user device depicting a perspective view of the AR space illustrated in FIG. 9F as the 3D representation of the virtual object is being repositioned, at a first point in time, according to an embodiment. In particular, FIG. 9H illustrates an example in which, at the first point in time, the user has contacted the touch screen display 902 in an area of the surface 922 of the floor 908 proximate to the base of the 3D representation of the virtual object 940 and is in the process of rotating the 3D representation of the virtual object 940 about its center to adjust its orientation in the AR space 910.

Figure 9I:
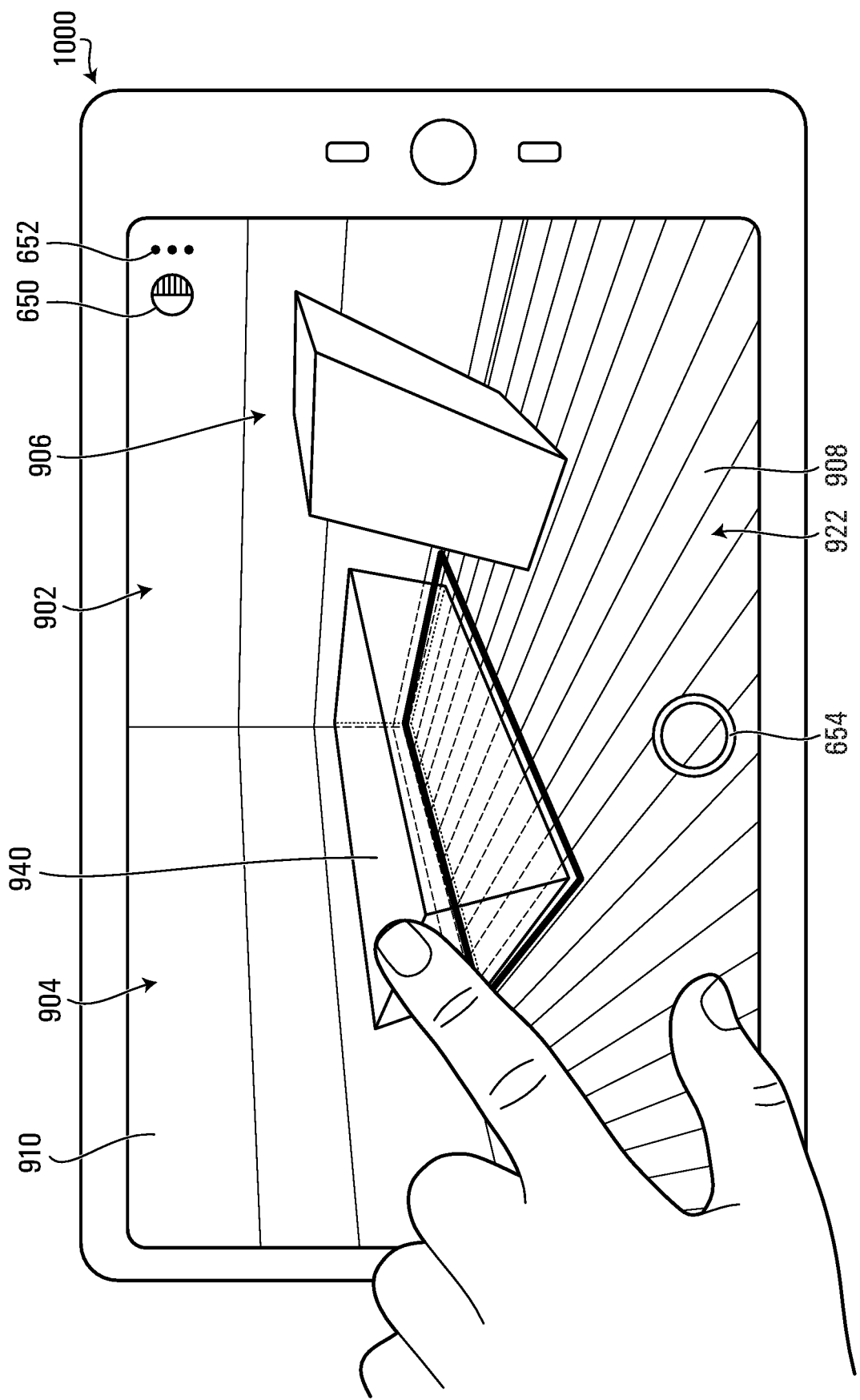
FIG. 9I illustrates the user device depicting a perspective view of the AR space as the 3D representation of the virtual object is being repositioned, at a second point in time, according to an embodiment.

FIG. 9I illustrates the user device depicting a perspective view of the AR space 910 as the 3D representation of the virtual object 940 is being repositioned, at a second point in time, according to an embodiment. In particular, at the second point in time depicted in FIG. 9I, the user has reoriented and dragged the 3D representation of the virtual object 940 to a second position within the AR space 910 that is more proximate to the corner of the two walls 902 and 904.

Figure 9J:
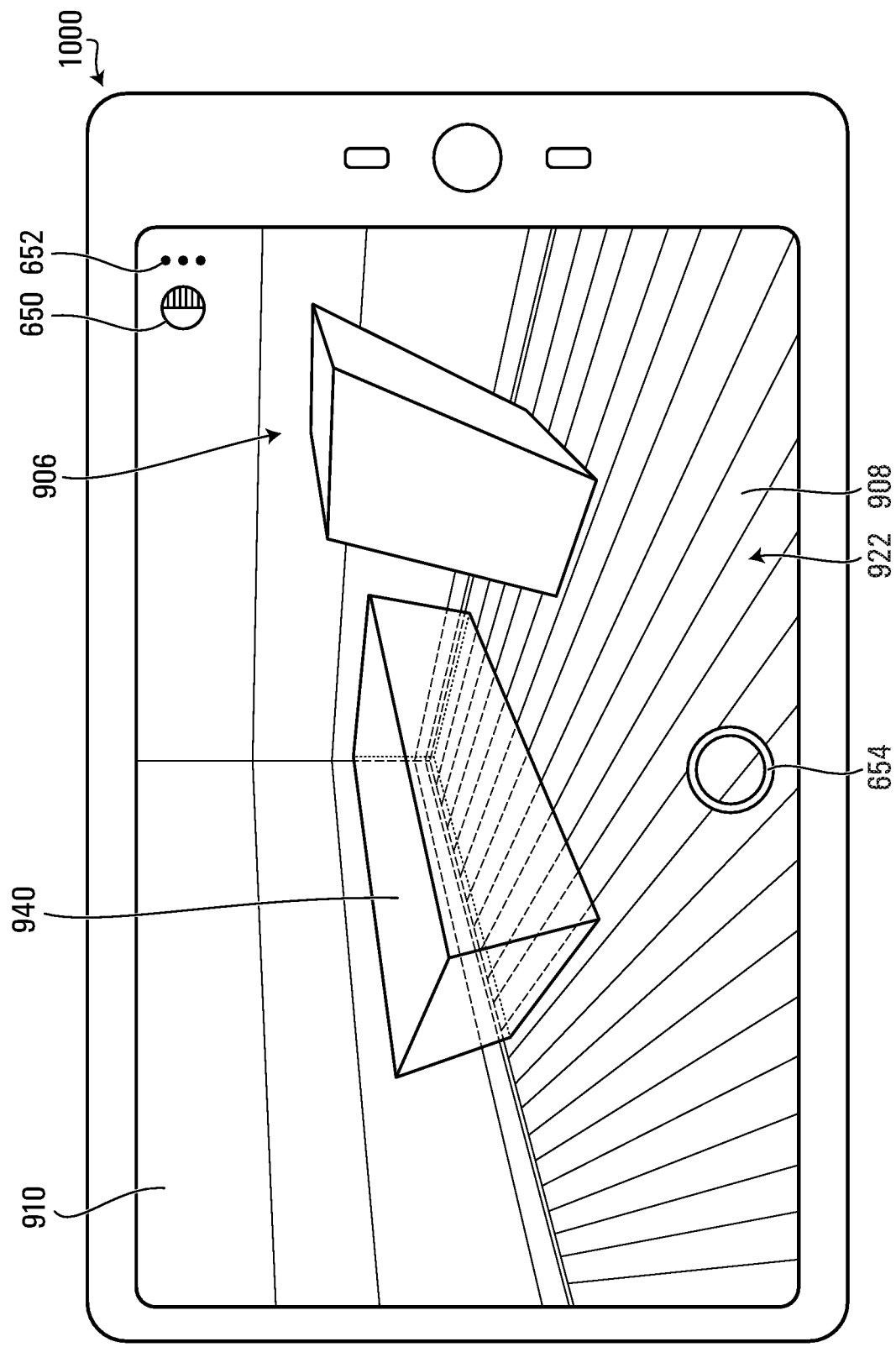
FIG. 9J illustrates the user device depicting a perspective view of the AR space after the 3D representation of the virtual object has been repositioned to a second position within the AR space, according to an embodiment.

FIG. 9J illustrates the user device 1000 depicting a perspective view of the AR space 910 after the 3D representation of the virtual object 940 has been repositioned to the second position within the AR space 910 by the user, according to an embodiment. In some implementations, rather than being moved from the first position depicted in FIGS. 9C-9G to the second position depicted in FIG. 9J in response to user input (e.g., in response to the user reorienting and relocating the 3D representation of the virtual object 940 from the first position to the second position), the user device 1000 may instead automatically reposition the 3D representation of the virtual object 940 responsive to the collision detected in the first position. For example, repositioning from the first position to the second position may be the result of one or more of the automatic repositioning processes discussed earlier. At this stage, collision detection by the user device 1000 indicates that no collision is detected between the 3D representation of the virtual object 940 and any surface of the AR space 910. In some implementations, the user device 1000 may provide the user with one or more indicators indicating that no collision is detected, which indicates that the 3D representation of the virtual object 940 physically fits within the bounded space defined by the spatial features of the AR space 910.

Figure 9K:
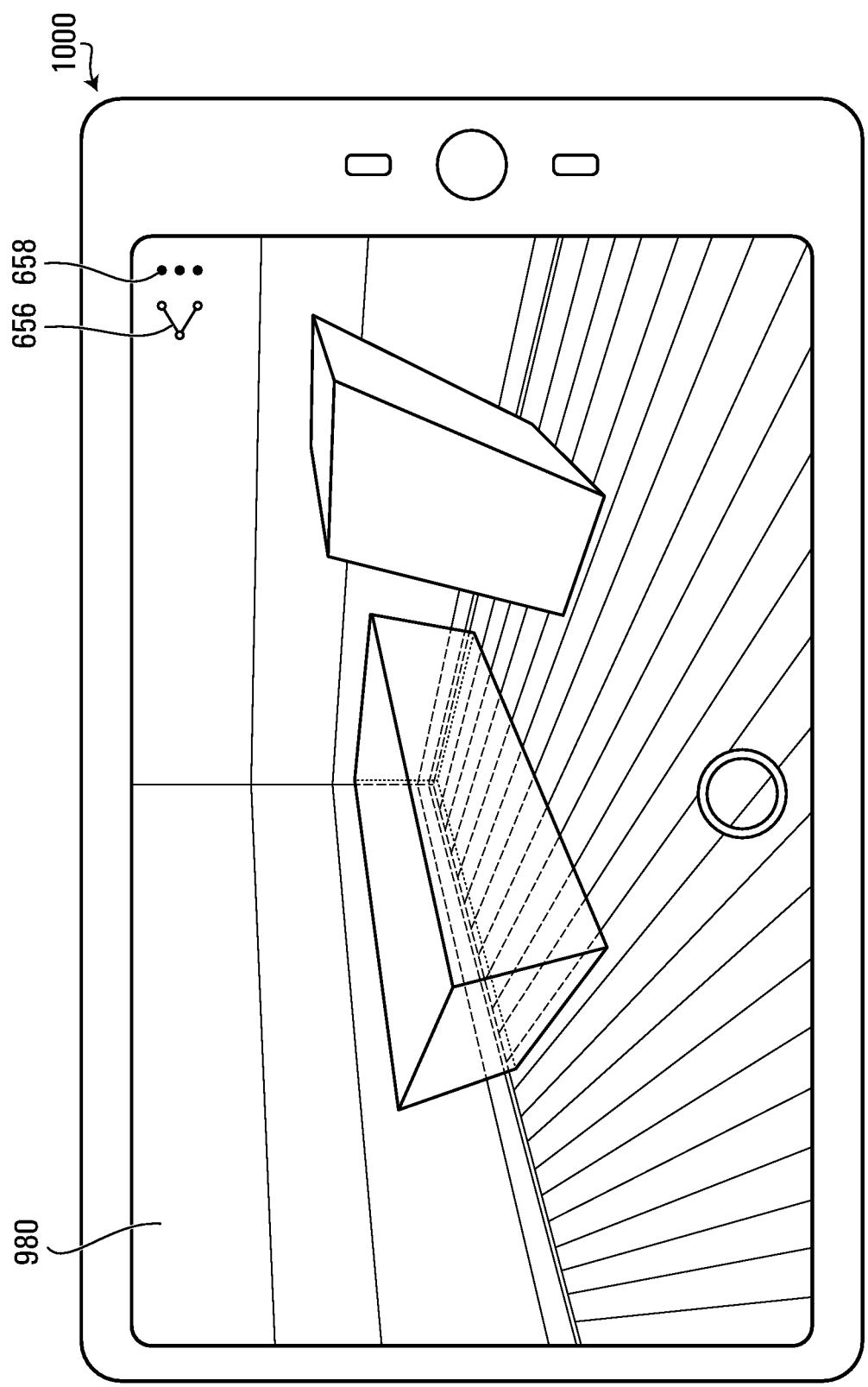
FIG. 9K illustrates the user device depicting an image captured by the user device of the AR space illustrated in FIG. 9J, according to an embodiment.

The user-selectable element 654 is user-operable to cause the user device 1000 to capture an image or video of the AR space 910, e.g., using one or more cameras of the user device 1000, which can then potentially be shared with one or more other users. FIG. 9K illustrates the user device 1000 depicting an image 980 captured by the user device 1000 of the AR space 910 illustrated in FIG. 9J, according to an embodiment. Similar to the display of the image 680 on the user device 500 shown in FIG. 6I, the display of the image 980 on the user device 1000 includes the user-selectable elements 656 and 658 that allow the user to initiate further processes, change settings related to the display of the image, etc. For example, the user may initiate a process to share the image with one or more other users by selecting the element 656 as discussed previously.

As noted earlier, the AR experience provided by the user device 500 depicted in FIG. 6 and the AR experience provided by the user device 1000 depicted in FIG. 9 may have been initiated by user selection of a size link on the product page of an online store (FIG. 6) or by the user accessing an AR web page such as the AR web page 310 of FIG. 3 to create and access a size link based on a specific item that the user wishes to assess the size of in an AR experience (FIG. 9). In other implementations, a user associated with a first user device may also or instead obtain a size link from another user operating a second user device. For example, the first user may be a customer associated with a customer device and the second user may be a merchant associated with a merchant device that has created and sent a size link to the customer, e.g., via an email, SMS, MMS, IM and the like, to allow the customer to launch an AR experience on the customer device. An example of such an embodiment is described below in further detail with reference to FIGS. 10 to 15.

Figure 10:
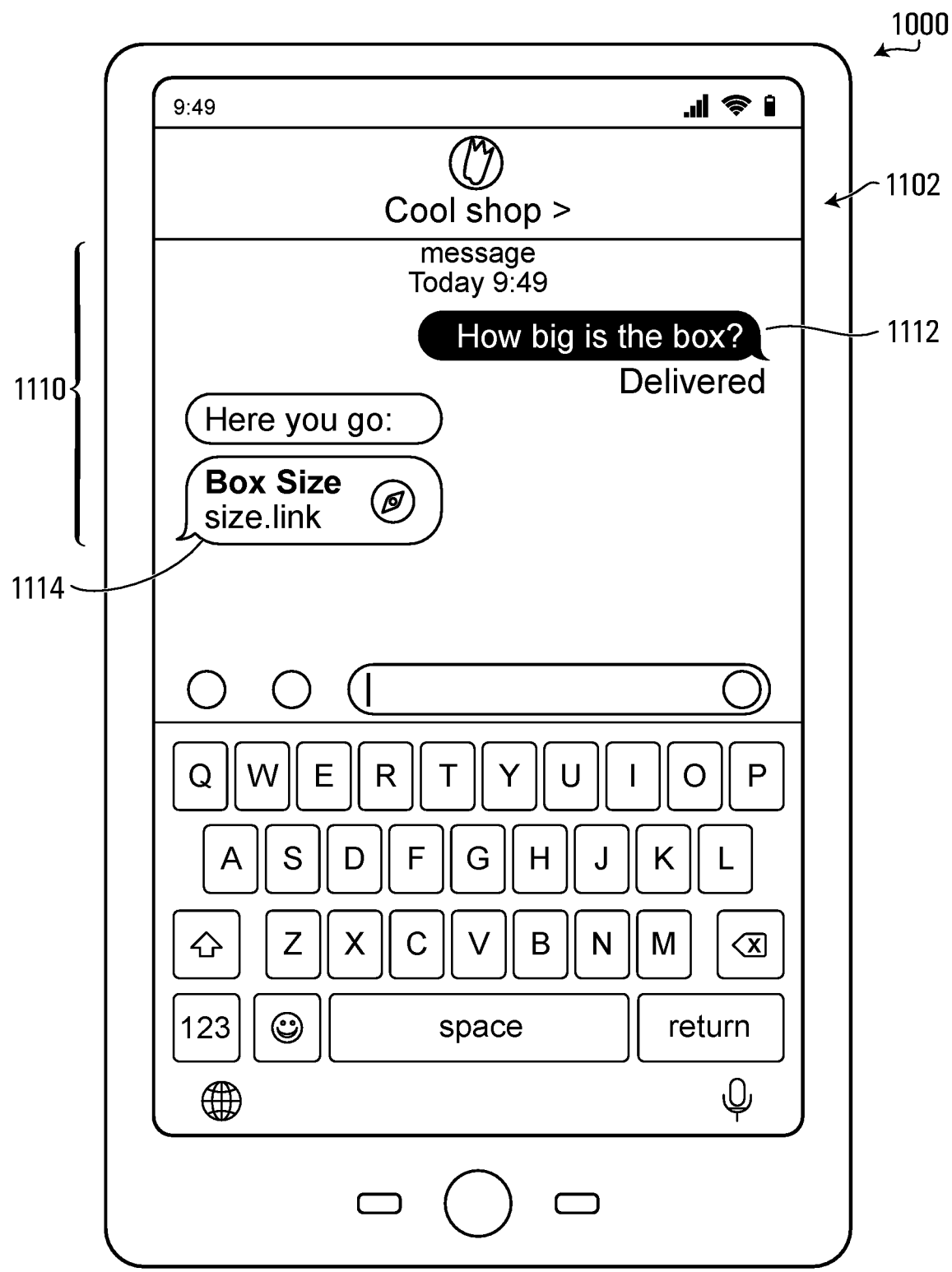
FIG. 10 illustrates a user device displaying a message exchange between a customer and an online store in which the operator of the online store has provided the customer with a web link that enables the customer to launch an AR experience on the user device to view a 3D representation of the object within a physical environment, according to an embodiment.

FIG. 10 illustrates a user device 1100 displaying a message exchange 1110 between a customer and an online store in which the operator of the online store, in response to a message 1112 from the customer requesting the size of a box, has responded with a message 1114 that includes a size link that enables the customer to launch an AR experience on the user device 1100 to view a 3D representation of the size of the box within the customer's physical environment.

Figure 11A:
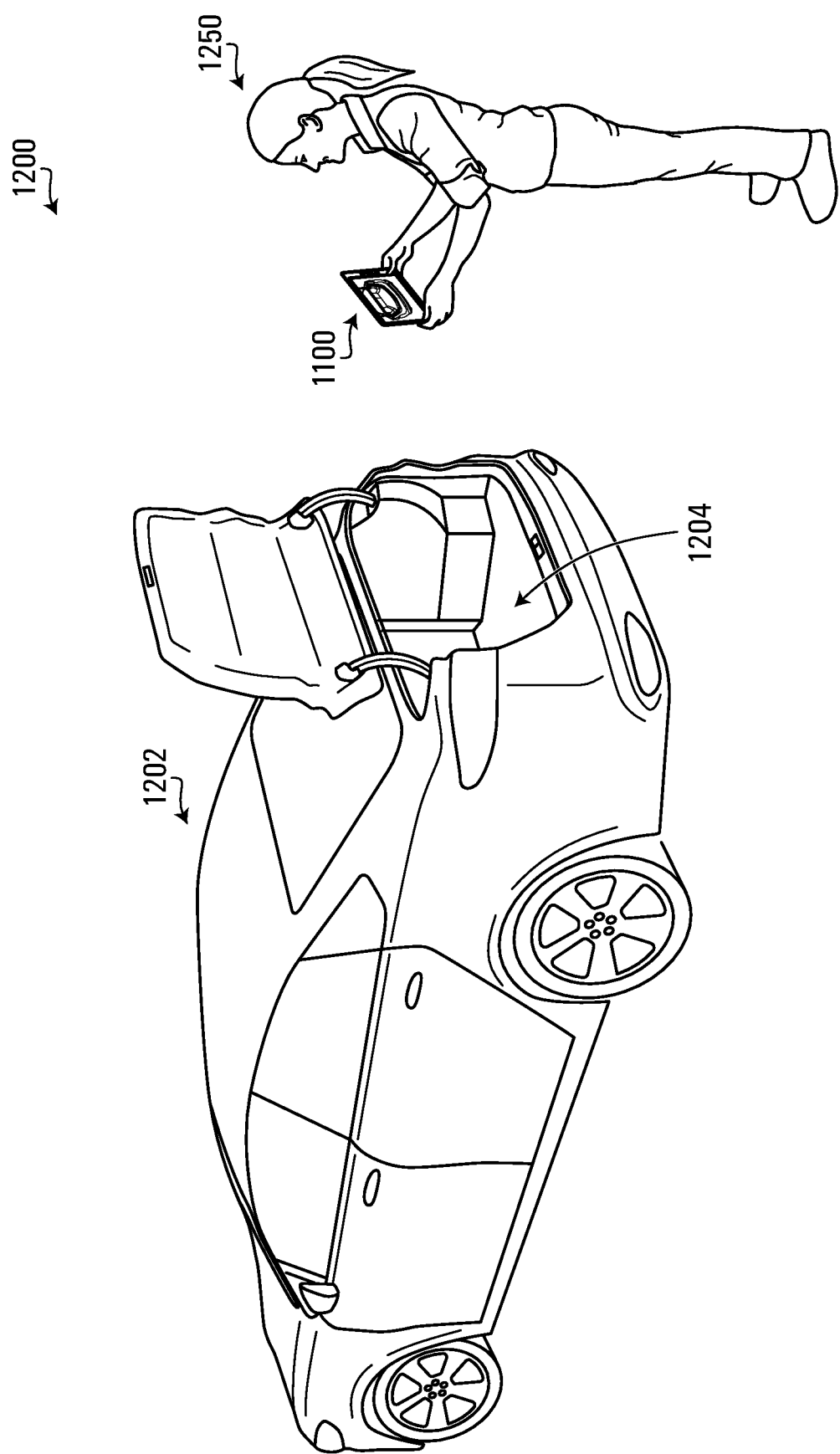
FIG. 11A is a perspective view of a physical environment, a user and a user device, according to an embodiment.

FIG. 11A is a perspective view of a physical environment 1200, a user 1250 and the user device 1100 of FIG. 10, according to another embodiment of the present disclosure. In this example, the physical environment 1200 includes a car 1202 with an open trunk 1204. For illustrative purposes, it will be assumed that the user 1250 wishes to assess whether the box that was the subject of the message exchange of FIG. 10 will fit within the trunk 1204 of the car 1202. For example, at the point in time depicted in FIG. 11A, the user 1250 may have initiated an AR experience on the user device 1100 to view the size of the box by selecting the size link received in the merchant's message 1114.

Figure 11B:
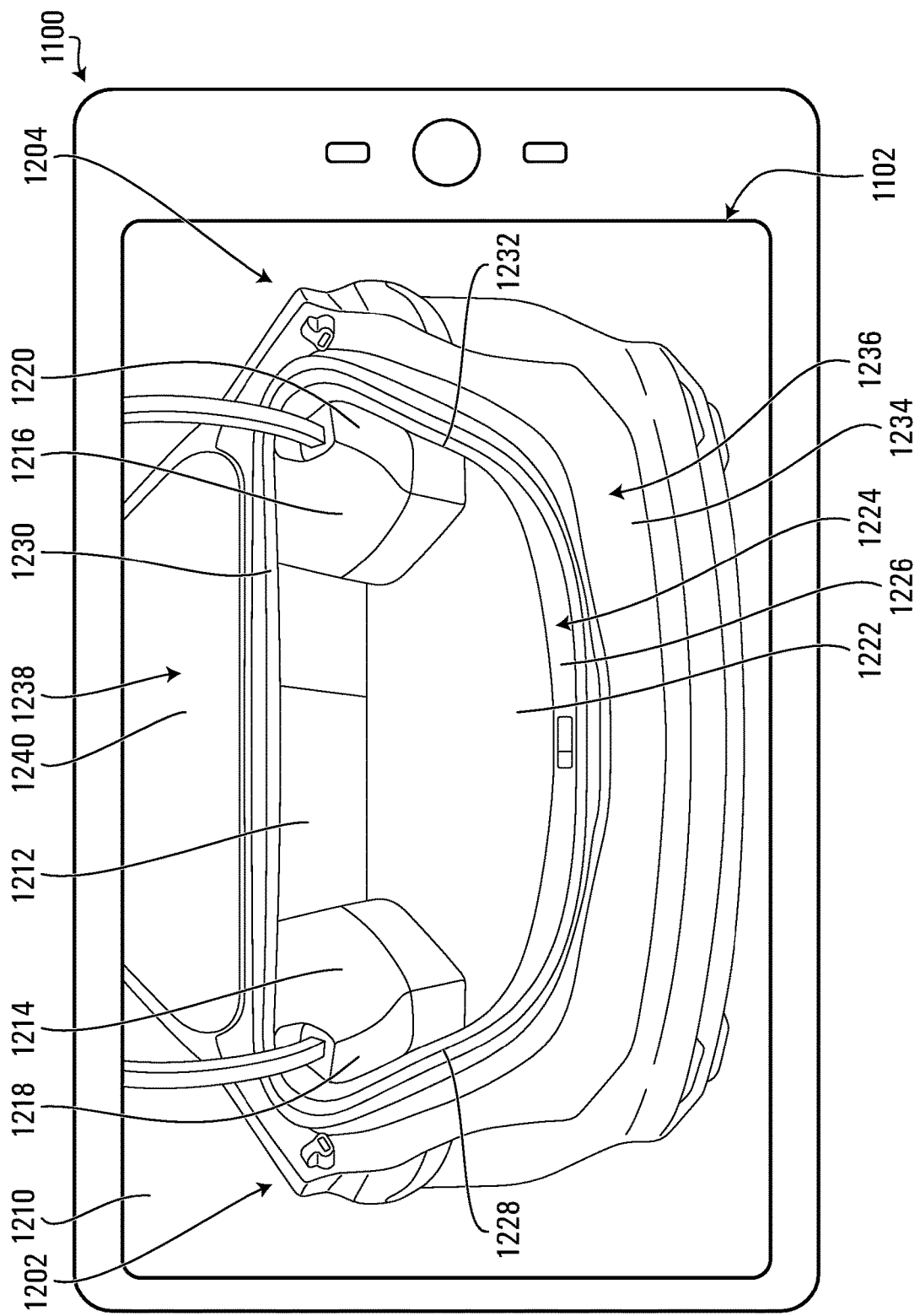
FIG. 11B is an alternative perspective view of the physical environment and user device of FIG. 11A, in which the user device is depicting an AR space representative of the physical environment in a field of view of the user device after an AR experience has been initiated on the user device, according to an embodiment.

FIG. 11B illustrates the user device 1100 depicting an AR space 1210 representative of the physical environment 1200 of FIG. 11A in a field of view of the user device 1100, according to an embodiment. In particular, in FIG. 11B, a touch screen display 1102 of the user device 1100 depicts the AR space 1210. As discussed previously, at this stage of the AR experience the user device 1100 may perform surface detection in order to detect surfaces of the physical environment 900. In this example, the user device 1100 may detect surfaces 1212, 1214, 1216, 1218, 1220 and 1222 of the interior of the trunk 1204, surfaces 1226, 1228, 1230 and 1232 around the edge 1224 of the trunk 1204, the outer surface 1236 of a rear fender 1234 of the car 1202, and the outer surface 1240 of a rear window 1238 of the car 1202. In some implementations, at this stage the user device 1100 may provide the user with a prompt (not shown) to move the user device from side to side or in a panning motion in order to facilitate surface detection.

Figure 11C:
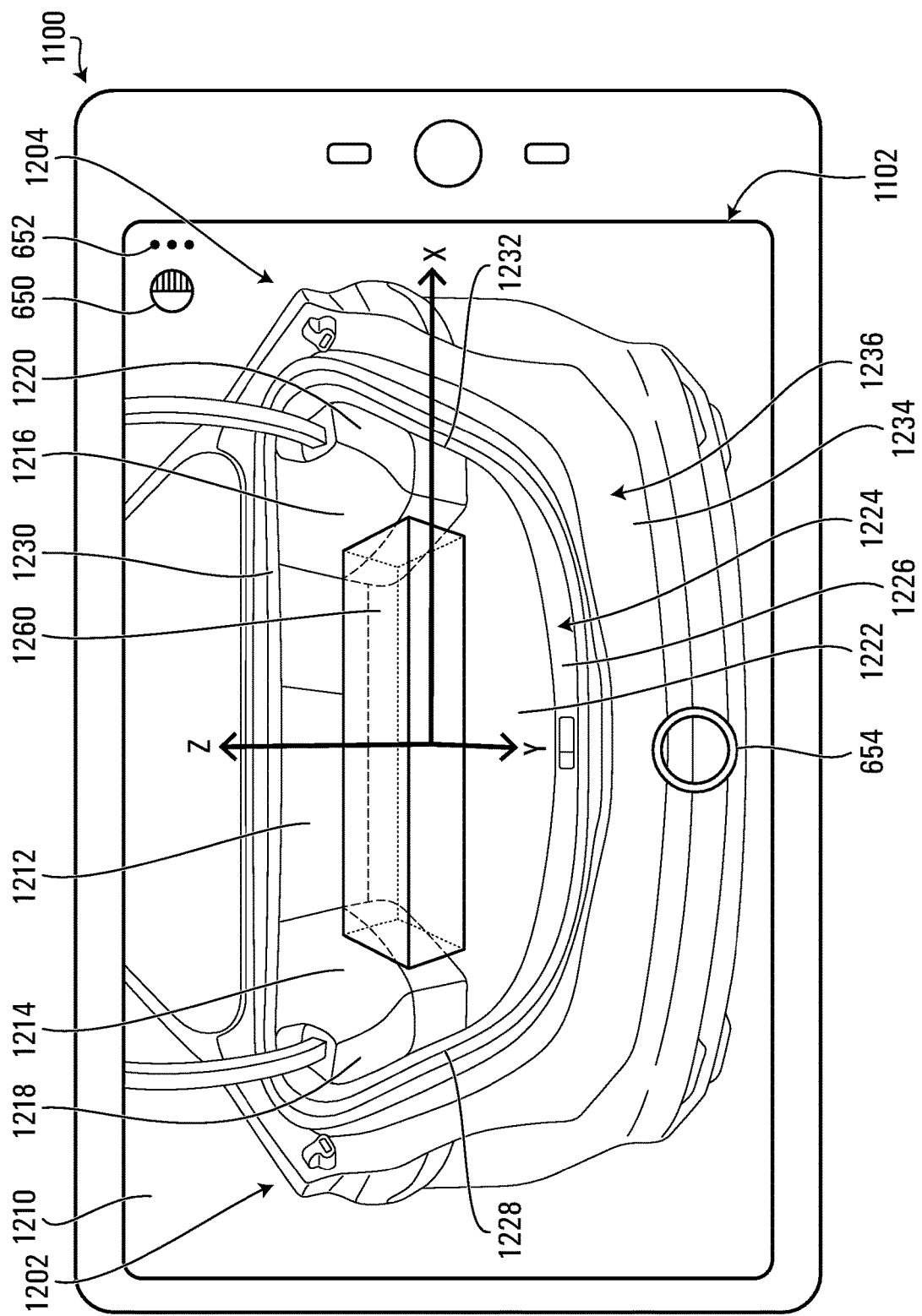
FIG. 11C illustrates the user device of FIG. 11A depicting a perspective view of the AR space with a 3D representation of a virtual object at a first position within the AR space, according to an embodiment.

FIG. 11C illustrates the user device 1100 depicting a perspective view of the AR space 1210 with a 3D representation of a virtual object 1260 at a first position adjacent to the detected surface 1222 of the floor of the trunk 1204. In this example, the 3D representation of the virtual object 1260 is rendered as a partially transparent frame model sized according to the dimensions of the size link provided in the merchant's message 1114 of FIG. 10. As discussed previously, in some implementations a virtual coordinate system may be mapped to the AR space 1210. For example, the virtual coordinate system may be a Cartesian coordinate system including an x-axis, y-axis and z-axis as shown in FIG. 11B. It is also noted that the Cartesian coordinate system in FIG. 11B is shown as being anchored at the first position of the 3D representation of the virtual object 1260. However, this is not necessary, and in other implementations the origin of a virtual coordinate system may be anchored at another point in the AR space 1210 and the 3D representation of the virtual object 1260 may be positioned at a first position elsewhere in the AR space 1210. As discussed previously, the first position of the 3D representation of the virtual object 1260 may be automatically selected by the user device 1100, or alternatively the user 1250 of the user device 1100 may have selected the first position.

Figure 11D:
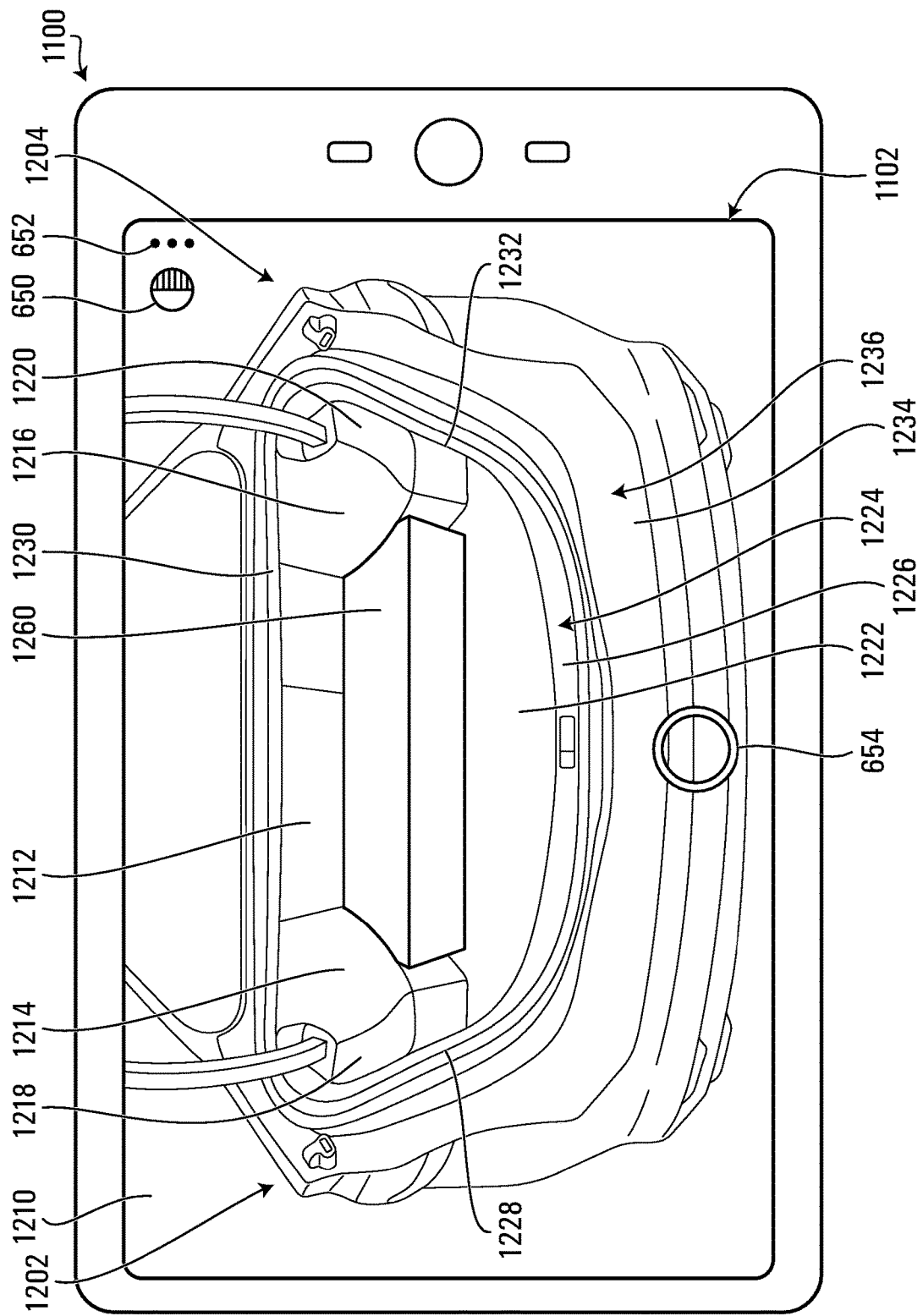
FIG. 11D illustrates the user device of FIG. 11A depicting the perspective view of the AR space illustrated in FIG. 11C, but in which the user device is configured to change an opacity of the 3D representation of the virtual object and display the 3D representation of the virtual object within the AR space such that any portion of the 3D representation of the virtual object having a blocked line of sight to the user device is visually occluded, according to an embodiment.
Figure 11E:
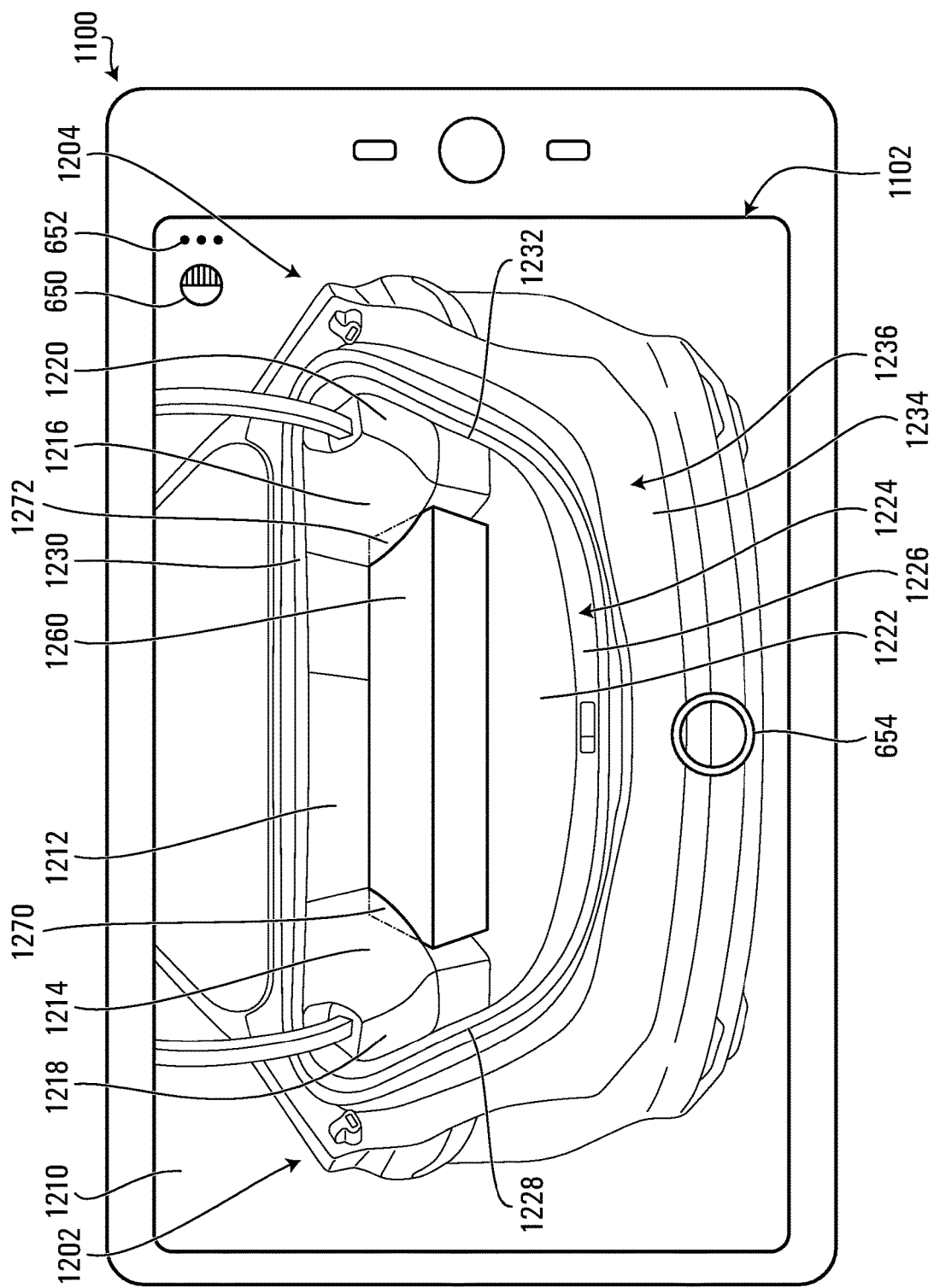
FIG. 11E illustrates the user device of FIG. 11A depicting the perspective view of the AR space illustrated in FIG. 11D, but in which the portions of the 3D representation of the virtual object that collide with boundaries of the physical environment are displayed in a manner that is visually distinguished from the remainder of the 3D representation of the virtual object, according to an embodiment.

The display of the AR space 1210 on the user device 1100 includes user-selectable elements 650, 652 and 654 that allow the user to initiate further processes and/or change settings related to the display of the AR space 1210, etc. For example, FIGS. 11D and 11E, illustrate the user device 1100 depicting the perspective view of the AR space 1210 illustrated in FIG. 11C but with different blend and opacity settings for the display of the 3D representation of the virtual object 1260, which may assist a user in assessing the 3D fit of the virtual object 1260 within the bounded space defined by the interior of the trunk 1204. In FIG. 11D the opacity of the 3D representation of the virtual object 1260 has been changed so that the 3D representation of the virtual object 1260 is rendered as an opaque object and the blend feature has been activated so that any portion of the 3D representation of the virtual object 1260 having a blocked line of sight to the user device 1100 is visually occluded. In this example, that means that portions 1270 and 1272 at the left and right ends of the 3D representation of the virtual object 1260 that are blocked due to collision with the interior surfaces 1214 and 1216 are visually occluded in FIG. 11D. In contrast, in FIG. 11E the blend feature is instead configured so that portions 1270 and 1272 of the 3D representation of the virtual object 940 that are visually occluded in FIG. 11D are displayed in a manner that is visually distinguished from the remaining portion 1274 of the 3D representation of the virtual object 1260. For example, the portions 1270 and 1272 may be displayed with different color(s), opacity and/or luminance than that of the remaining portion 1274.

As described herein, collision detection by the user device 1000 may allow the user device 1000 to alert the user that there is a collision between the 3D representation of the virtual object 1260 and the surfaces 1214 and 1216 of the trunk 1204. For example, the collision may be detected by the user device 1000 based on a determination that, in the first position, the portions 1270 and 1272 of the 3D representation of the virtual object 1260 cross the surfaces 1214 and 1216 of the trunk 1204.

Figure 11F:
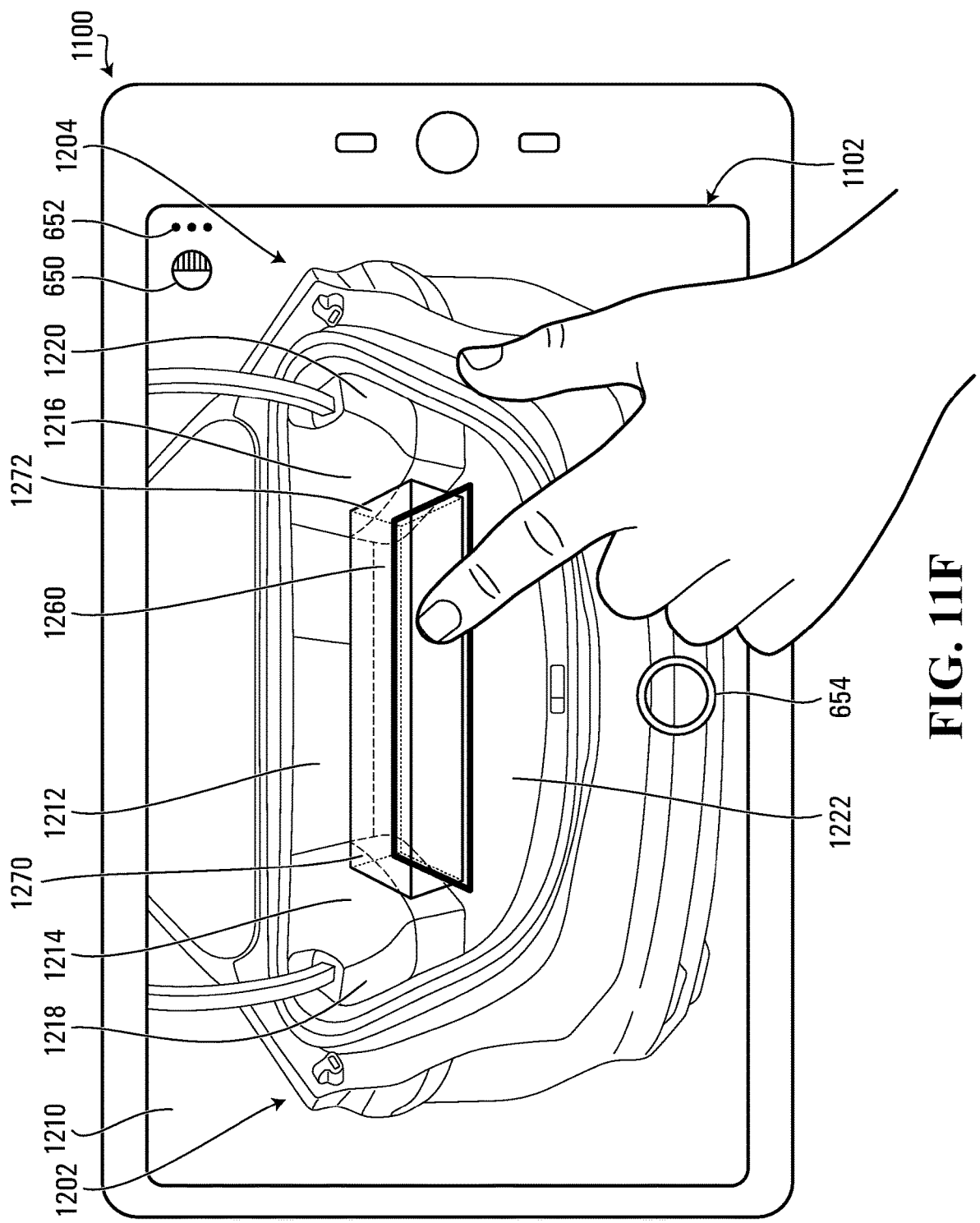
FIG. 11F illustrates the user device of FIG. 11A depicting the perspective view of the AR space illustrated in FIG. 11C as the 3D representation of the virtual object is being repositioned, at a first point in time, according to an embodiment.

FIG. 11F illustrates the user device 1100 depicting a perspective view of the AR space 1210 illustrated in FIG. 11C, at a first point in time, as the 3D representation of the virtual object 1260 is being repositioned, according to an embodiment. In particular, FIG. 11F illustrates an example in which, at the first point in time, the user has contacted the touch screen display 1102 in an area of the surface 1222 of the floor of the trunk 1204 proximate to the base of the 3D representation of the virtual object 1260 and is in the process of rotating the 3D representation of the virtual object 1260 about its center to adjust its orientation in the AR space 1210.

Figure 11G:
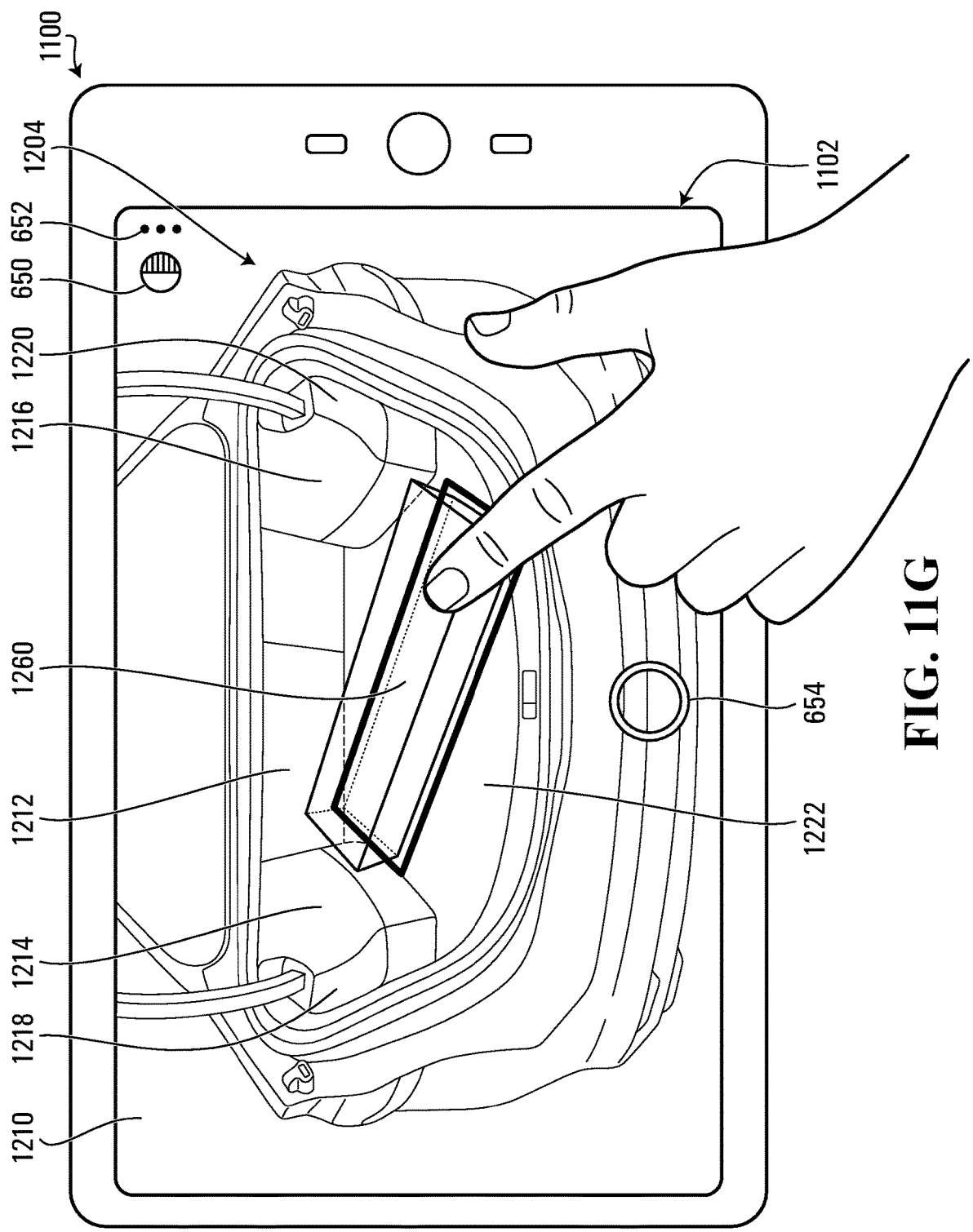
FIG. 11G illustrates the user device of FIG. 11A depicting a perspective view of the AR space illustrated in FIG. 11C as the 3D representation of the virtual object is being repositioned, at a second point in time, according to an embodiment.

FIG. 11G illustrates the user device 1100 depicting a perspective view of the AR space 1210, at a second point in time, as the 3D representation of the virtual object 940 is being repositioned, according to an embodiment. In particular, at the second point in time depicted in FIG. 11G, the user has reoriented and dragged the 3D representation of the virtual object 1260 to a second position within the trunk 1204.

Figure 11H:
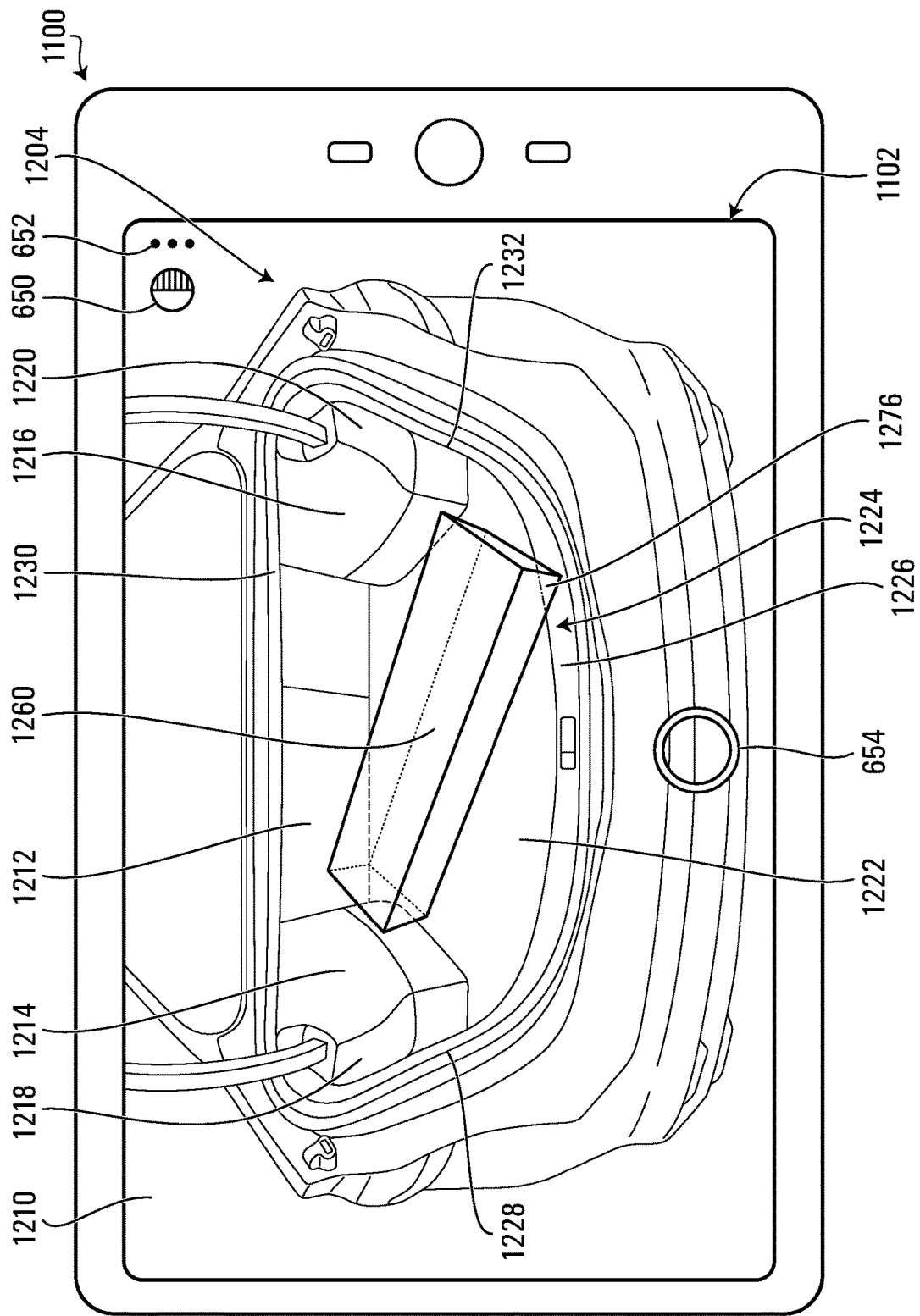
FIG. 11H illustrates the user device of FIG. 11A depicting a perspective view of the AR space after the 3D representation of the virtual object has been repositioned to a second position within the AR space, according to an embodiment.
Figure 11I:
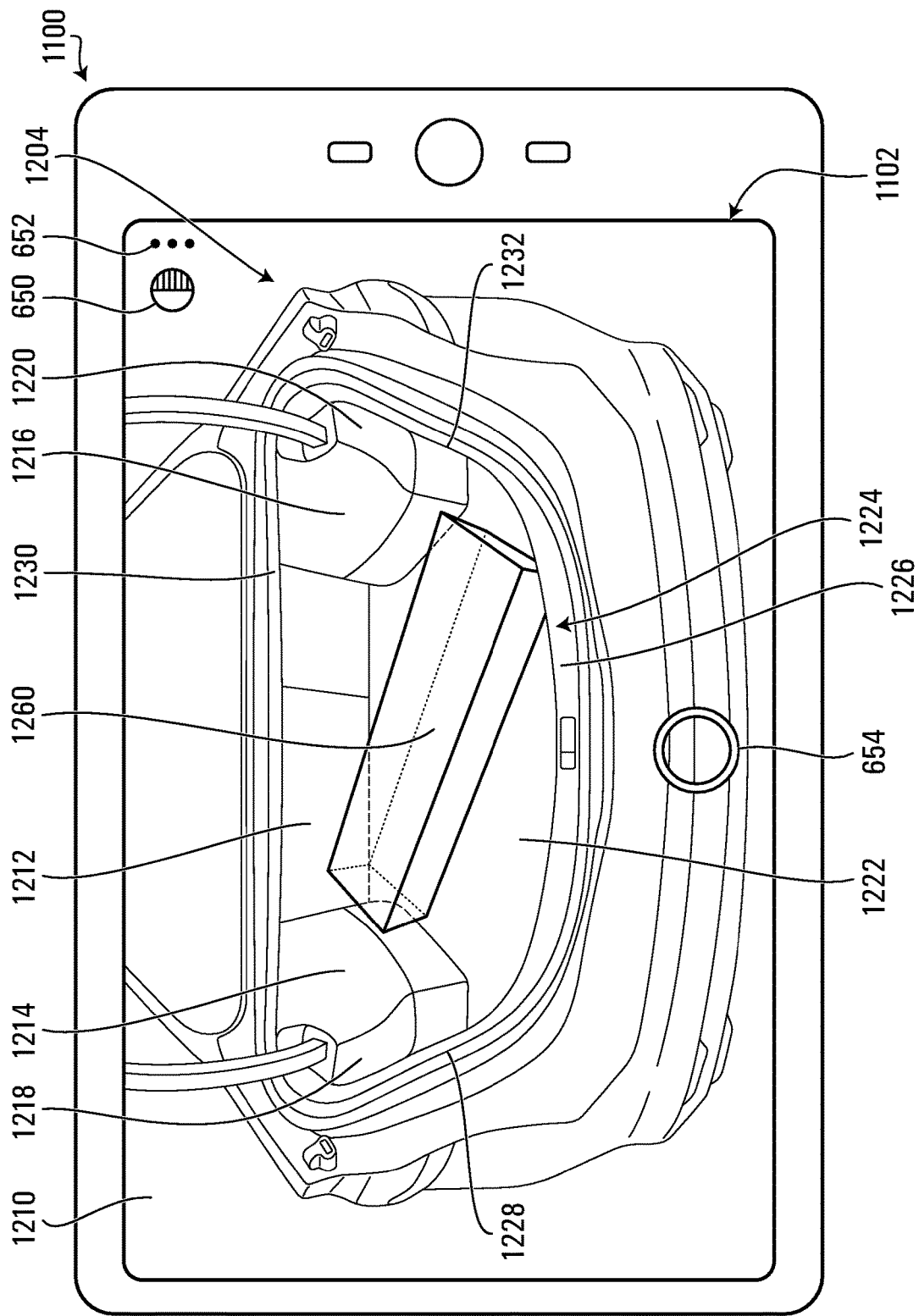
FIG. 11I illustrates the user device of FIG. 11A depicting the perspective view of the AR space illustrated in FIG. 11H, but in which the user device is configured to display the 3D representation of the virtual object within the AR space such that any portion of the 3D representation of the virtual object having a blocked line of sight to the user device is visually occluded, according to an embodiment.

FIG. 11H illustrates the user device 1100 depicting a perspective view of the AR space 1210 after the 3D representation of the virtual object 1260 has been repositioned to the second position within the trunk 1204. It is noted that in FIG. 11H, the blend feature is deactivated, which in this example means that a portion 1276 of the 3D representation of the virtual object 1260 that has a blocked line of sight to the user device 1100 is displayed in an overlaid manner over the intervening structure (e.g., the surface 1226 of the edge 1224 of the trunk 1204 in this example) that would otherwise block it from being visible to the user device 1100. In contrast, in FIG. 11I the blend feature has been activated so that any portion of the 3D representation of the virtual object 1260 having a blocked line of sight to the user device 1100 is visually occluded, which in this case means that the portion 1276 of the 3D representation of the virtual object 1260 that is visibly displayed in FIG. 11H is not displayed in FIG. 11I.

Figure 11J:
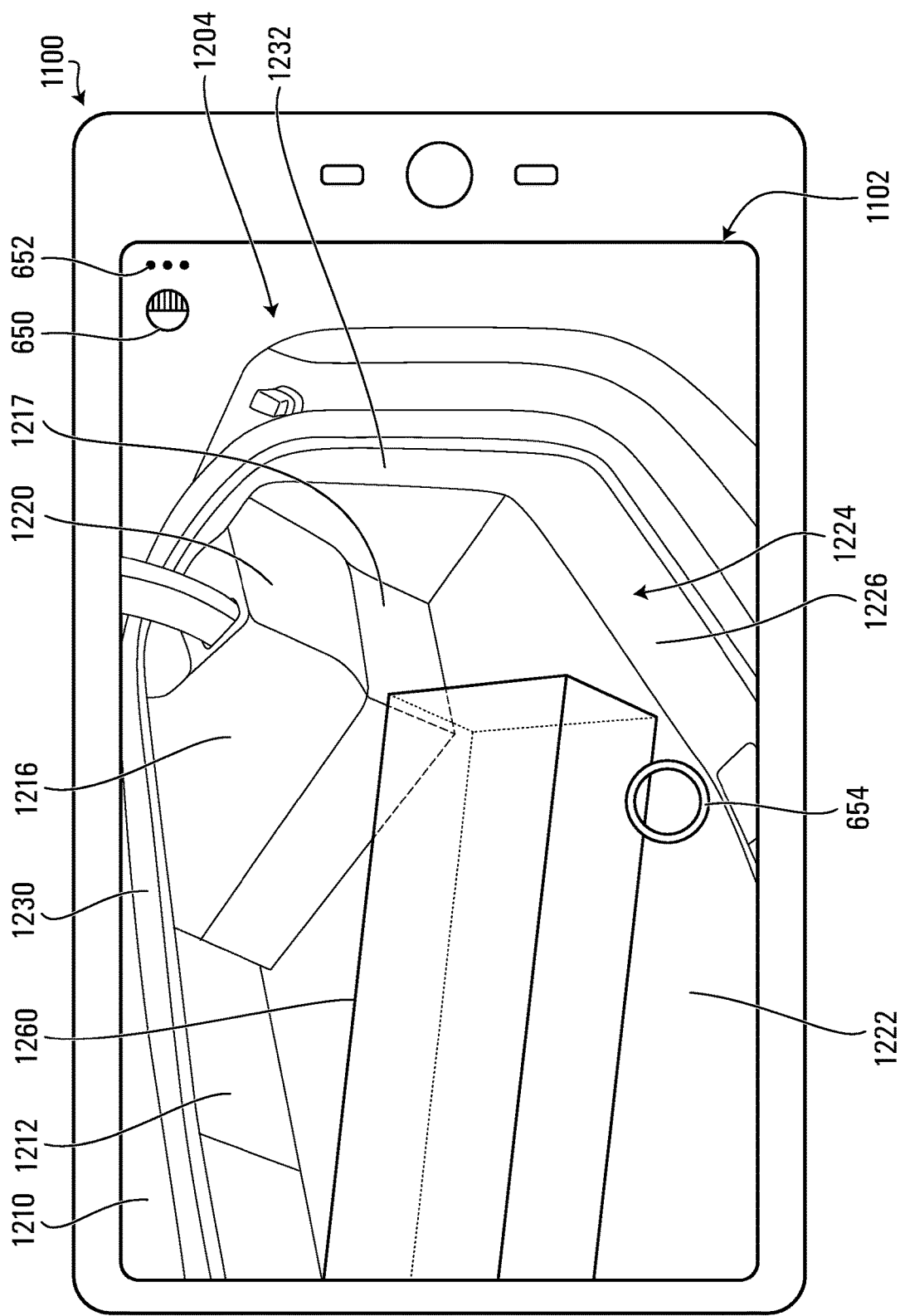
FIG. 11J illustrates the user device of FIG. 11A depicting an alternative perspective view of the AR space illustrated in FIG. 11I, according to an embodiment.

In some cases, in order to check the fit of a 3D representation of a virtual object in a bounded space within an AR space, a user may navigate within the AR space in order to view the 3D representation of the virtual object from multiple perspectives. Navigation within the AR space could involve physical movement of the user or the user device through which the AR space is being experienced. For example, in order to check the fit of the 3D representation of the virtual object 1260 in the trunk 1204, the user 1250 of the user device 1100 may move within the physical environment 1200 in order to view the 3D representation of the virtual object 1260 from multiple perspectives. As discussed earlier with reference to the example method 400 illustrated in FIG. 4, as a user physically moves themselves or the user device 1100 within the real-world space and/or repositions the 3D representation of the virtual object 1260 within the AR space 1210, updated positions of the user device 1100 and the 3D representation of the virtual object 1260 can be determined based on measurements by the user device 1100, and the display of the 3D representation of the virtual object 1260 can be updated based on the updated positions. Furthermore, in some implementations, as the user device 1260 captures more measurements of the real-world space, the representation of the real-world space can also be updated. This can add new features and/or areas to the representation of the real-world space. For example, FIG. 11J illustrates an example of the user device 1100 depicting a different perspective view of the AR space 1210 with the 3D representation of the virtual object 1260 positioned in the second position within the trunk 1204. In this example, the display of the 3D representation of the virtual object 1260 has been updated to reflect the new position of the user device 110 relative to the 3D representation of the virtual object 1260. In addition, in some implementations the user device 1100 may also capture additional measurements of features of the AR space 1210 that were not visible from the perspective view illustrated in FIG. 11I. For example, the user device 1100 may detect the interior surface 1217 of the trunk 1204 and/or capture measurement related thereto. In some implementations this may involve updating an AR space record representative of the AR space 1210 (e.g., the AR space record 332a of FIG. 3). From the perspective illustrated in FIG. 11J, the user 1250 can see that the 3D representation of the virtual object 1260 does not collide with the edge 1224 of the trunk 1204.

Figure 11K:
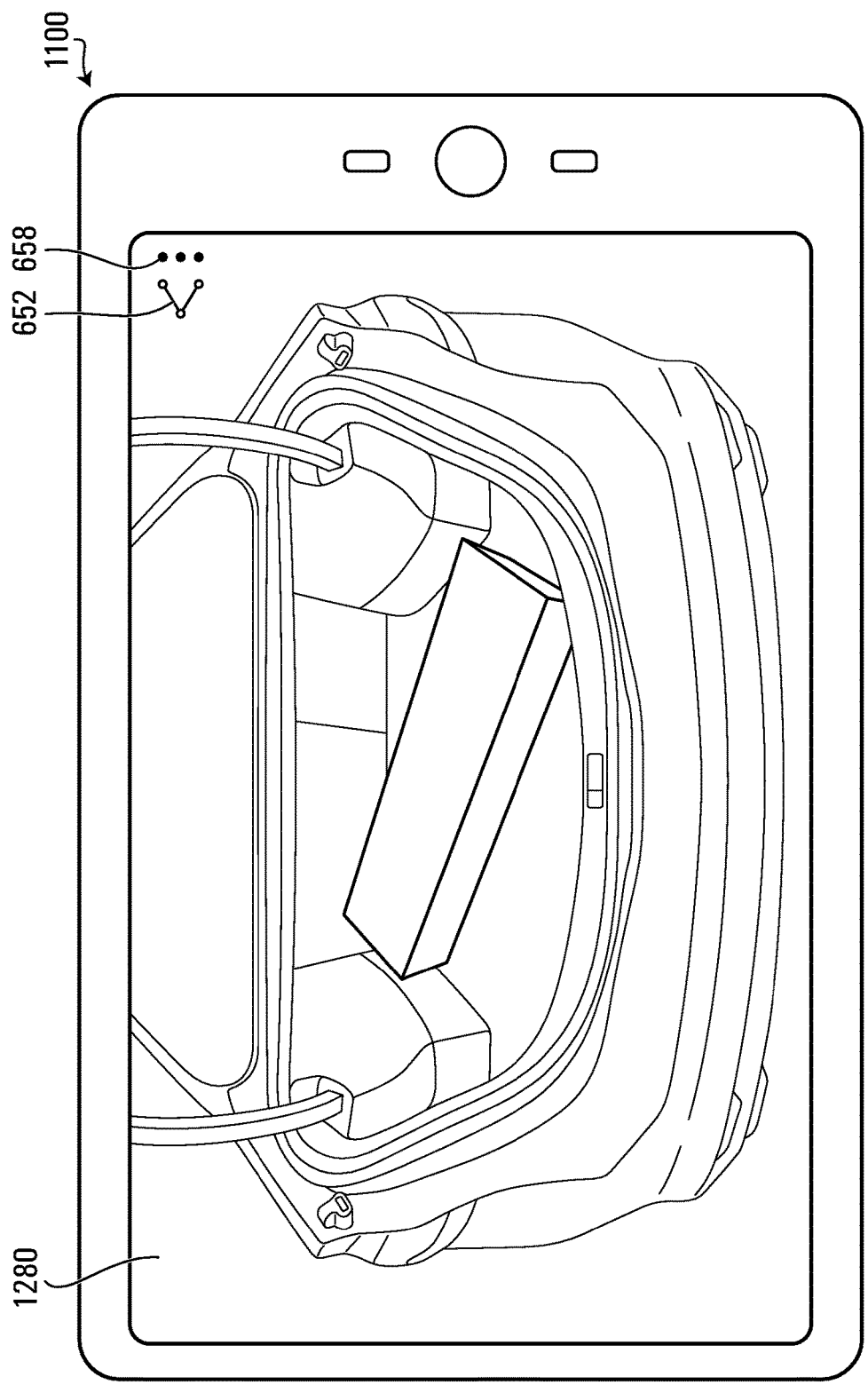
FIG. 11K illustrates the user device of FIG. 11A depicting an image captured by the user device of the AR space illustrated in FIG. 11I, but in which an opacity of the 3D representation of the virtual object has been changed, according to an embodiment.

At this stage, collision detection by the user device 1100 may indicate to the user that no collision is detected between the 3D representation of the virtual object 1260 and any surface of the AR space 1210. In some implementations, the user device 1000 may provide the user with one or more indicators indicating that no collision is detected, which indicates that the 3D representation of the virtual object 1260 physically fits within the trunk 1204. In some cases after assessing that the 3D representation of the virtual object 1260 fits within the trunk 1204, the user 1250 may wish to capture an image or video that shows the 3D representation of the virtual object 1260 positioned within the trunk 1204. For example, the user 1250 may do so by selecting the user-selectable element 654 to cause the user device 1100 to capture an image or video of the AR space 1210. For example, FIG. 11K illustrates the user device 1100 depicting an image 1280 captured by the user device 1100 from the perspective illustrated in FIG. 11I, but in which the opacity of the 3D representation of the virtual object 1260 was changed so that it appears to be totally opaque. Similar to the display of the image 680 on the user device 500 shown in FIG. 6I, the display of the image 1280 on the user device 1100 includes the user-selectable elements 656 and 658 that allow the user to initiate further processes, change settings related to the display of the image, etc.

Figure 12:
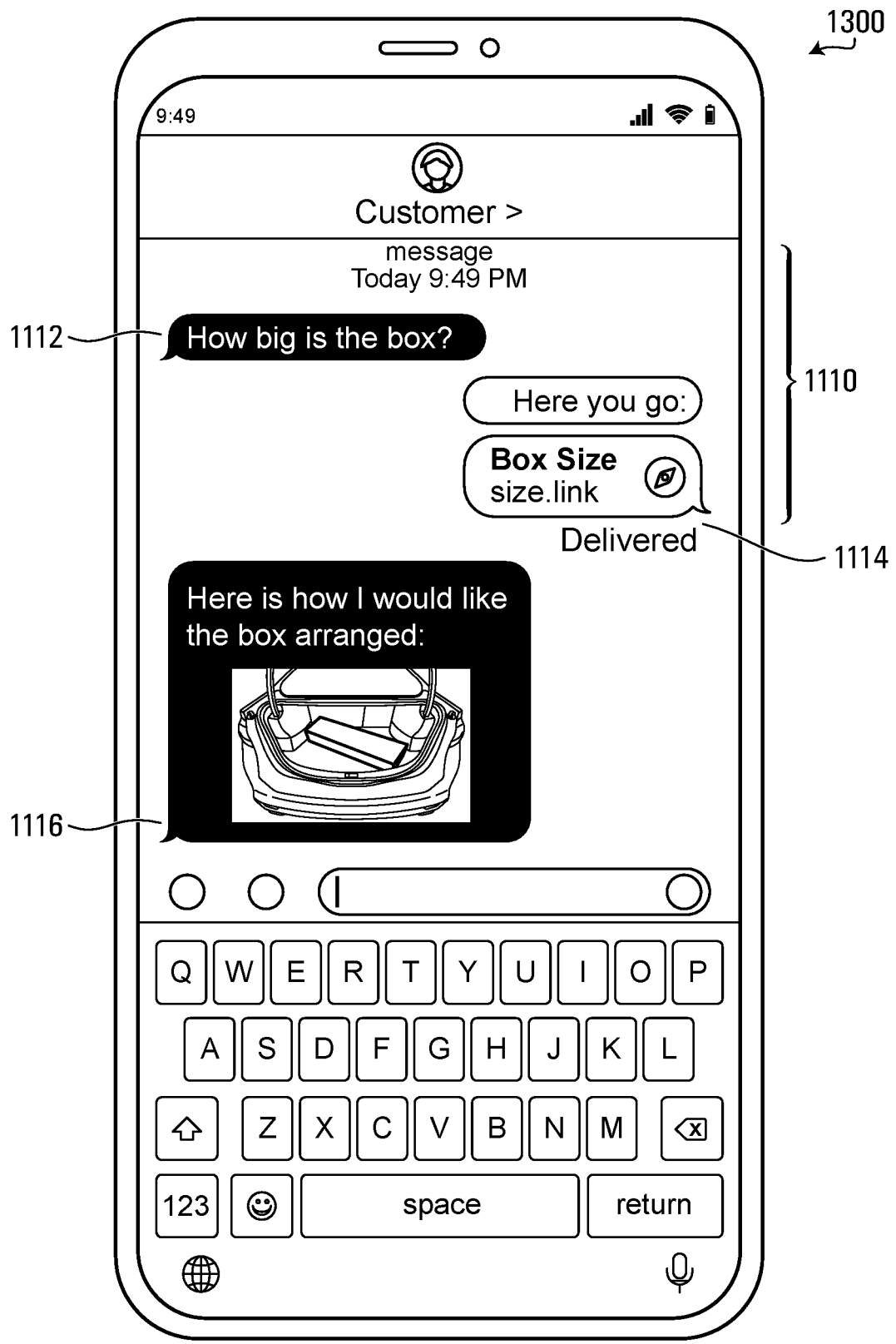
FIG. 12 illustrates a user device of the online store involved in the message exchange displayed on the user device of the customer illustrated in FIG. 10 after having received a further message from the customer that includes the image captured by the user device shown in FIG. 11L, according to an embodiment.
Figure 13:
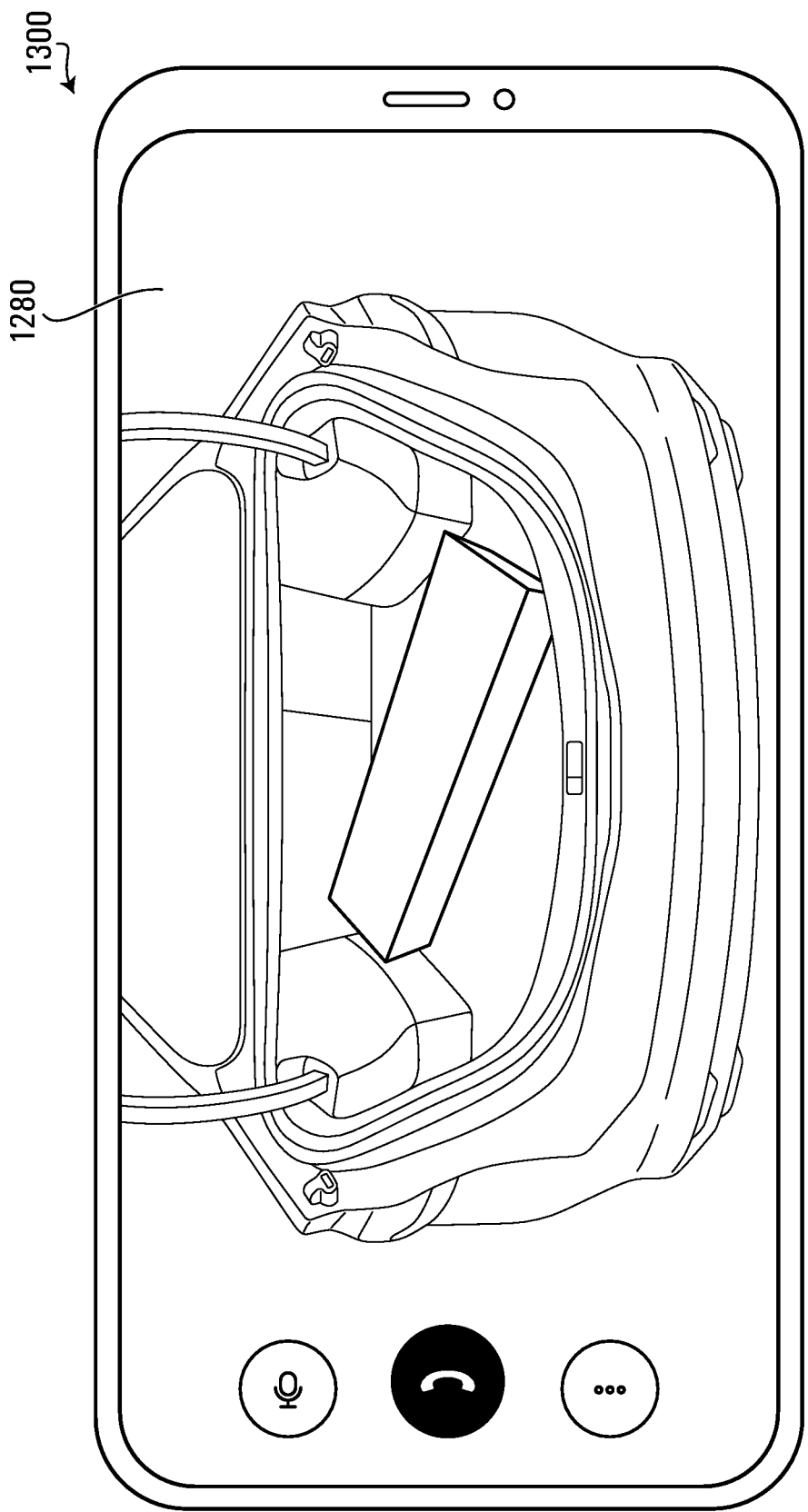
FIG. 13 illustrates the user device of FIG. 12 depicting the image captured by the user device shown in FIG. 11L, according to an embodiment.

In some cases, the user 1250 may wish to share the image 1280 with the merchant that provided the size link in the message exchange 1100 shown in FIG. 11. For example, the user 1250 may do so to let the merchant know how the user 1250 would like the physical box that is represented by the virtual object 1260 to be positioned within the trunk 1204 of the car 1202, e.g., for curbside pick-up. For example, FIG. 12 illustrates a user device 1300 of the merchant involved in the message exchange displayed on the user device 1100 of the customer illustrated in FIG. 10 after having received a further message 1116 from the user 1250 that includes the image 1280 captured by the user device 1100 shown in FIG. 11K. FIG. 13 illustrates the user device 1300 of FIG. 12 depicting the image 1280 that was captured by the user device 1100 and shared with the merchant in the message 1116, according to an embodiment.

In some embodiments, a user may wish to view 3D representations of multiple virtual objects within an AR space, e.g., in order to assess the 3D fit of the virtual objects together within a physical environment represented by the AR space. For example, perhaps the user 1250 of FIG. 11A is interested in determining whether a second box can fit within the trunk 1204 of the car 1202 together with the first box. For example, the user 1250 may receive a second size link for the second box from the merchant that provided the first size link in the message exchange 1110 depicted in FIG. 10. In other scenarios, the 3D dimensions for a virtual object representative of the second box may be obtained by any of the methods described herein, e.g., the user 1250 may provide the dimensions themselves or they may be obtained from a second merchant that could be unrelated to the first merchant. For example, the user 1250 may intend to pick-up the first box from the first merchant and the second box from the second merchant, possibly at a different physical pick-up location.

Figure 14A:
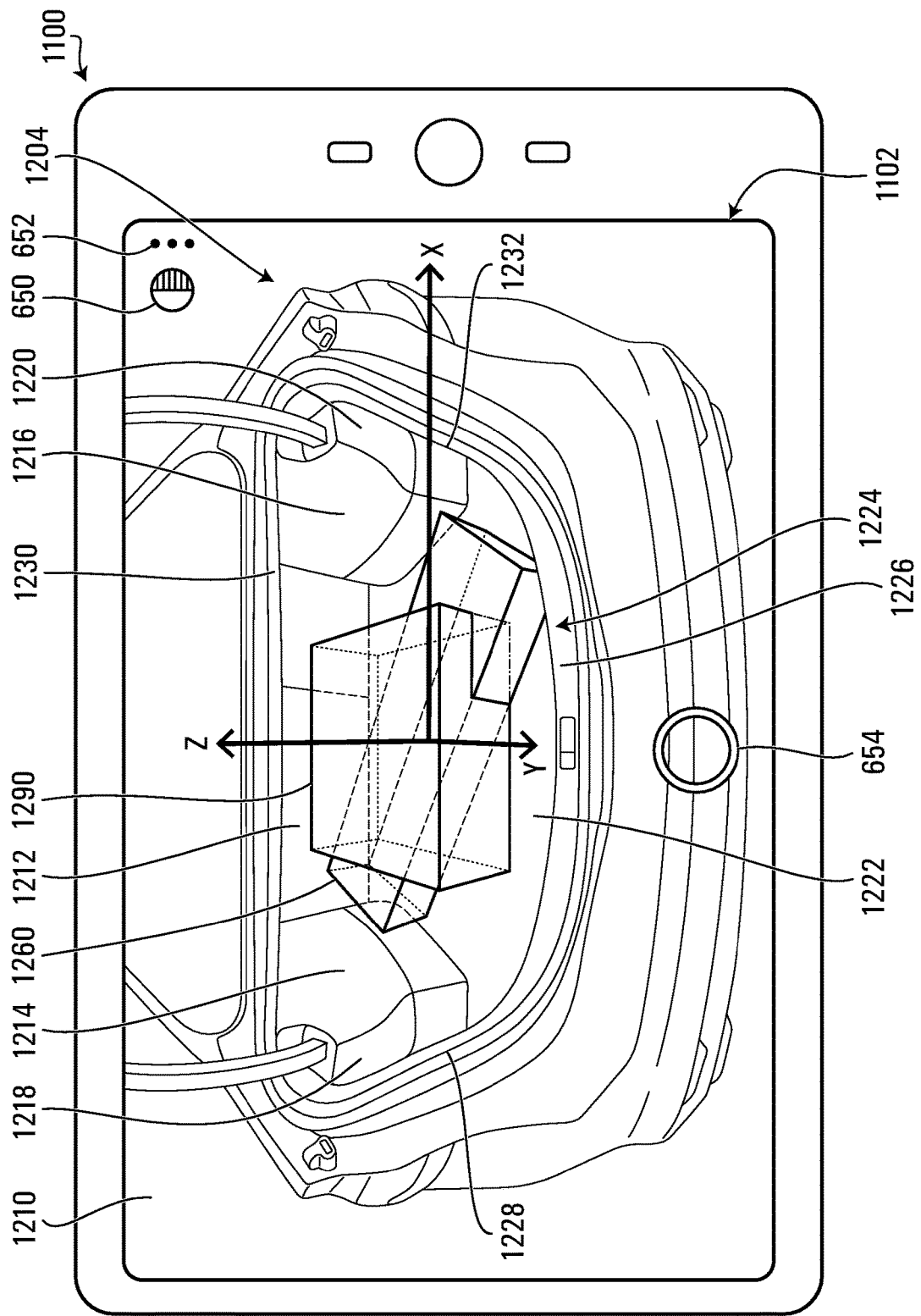
FIG. 14A illustrates the user device of FIG. 11A depicting the perspective view of the AR space illustrated in FIG. 11L, but with the addition of a 3D representation of a second virtual object at a first position within the AR space, according to an embodiment.
Figure 14B:
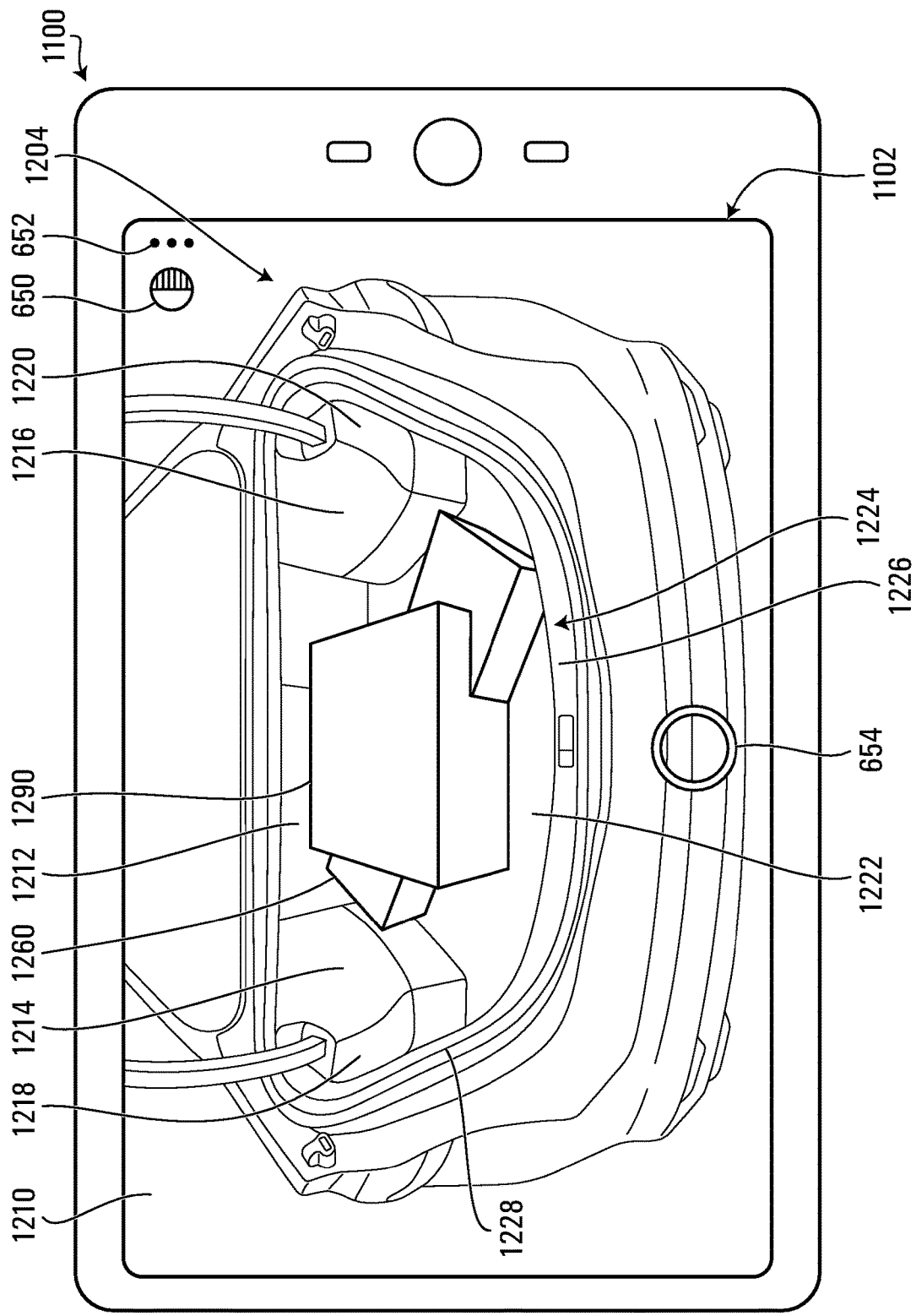
FIG. 14B illustrates the user device depicting the perspective view of the AR space illustrated in FIG. 14A, but in which an opacity of the 3D representation of the virtual objects has been changed, according to an embodiment.

For example, FIG. 14A illustrates the user device 1100 of FIG. 11A depicting the perspective view of the AR space illustrated in FIG. 11K, but with the addition of a 3D representation of a second virtual object 1290 at a first position within the AR space 1210 adjacent to the detected surface 1222 of the floor of the trunk 1204. In some cases, the first position of the 3D representation of the virtual object 1290 may be automatically selected by the user device 1100, or alternatively the user 1250 of the user device 1100 may have selected the first position.

In this case, it can be seen that in this position the 3D representation of the second virtual object 1290 does not collide with any of the detected surfaces of the trunk 1204, but does collide with the 3D representation of the first virtual object 1260. This is perhaps even more clearly seen in FIG. 14B, which illustrates the user device 1100 depicting the perspective view of the AR space 1210 illustrated in FIG. 14A, but in which the opacity of the 3D representations of the virtual objects have been changed so that they are displayed as being opaque.

Figure 14C:
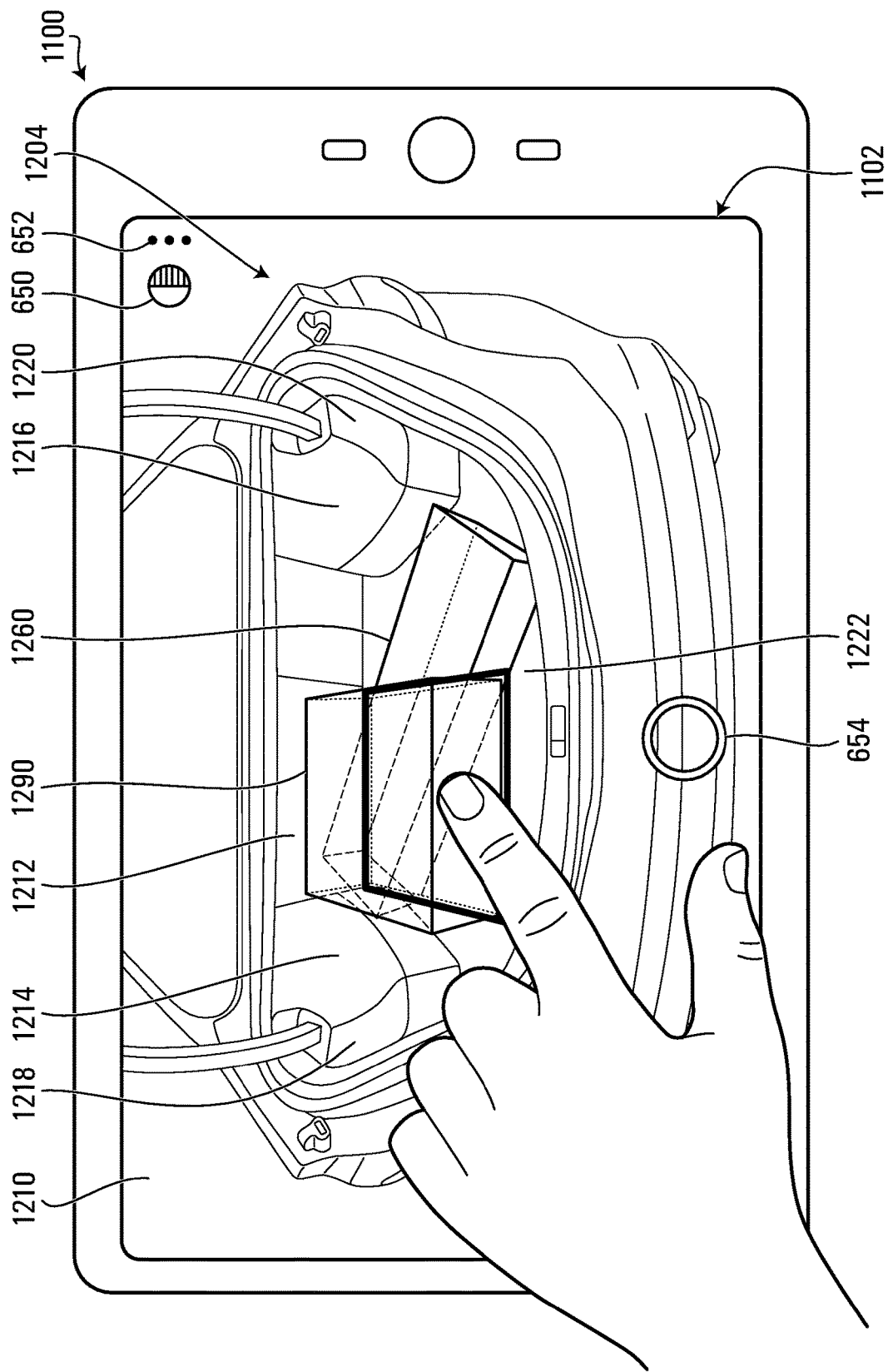
FIG. 14C illustrates the user device of FIG. 11A depicting a perspective view of the AR space illustrated in 14A as the 3D representation of the second virtual object is being repositioned, at a third point in time, according to an embodiment.
Figure 14D:
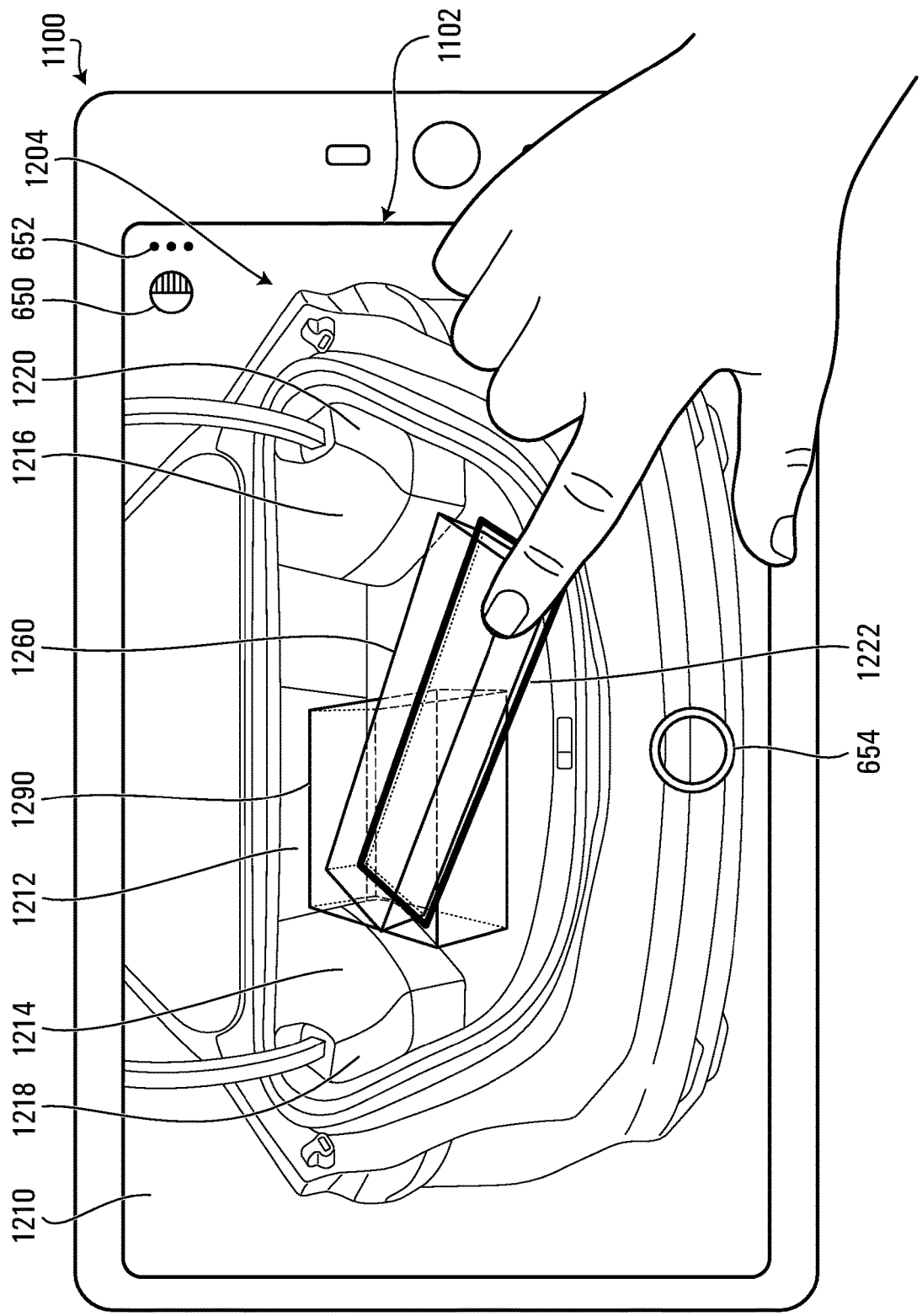
FIG. 14D illustrates the user device of FIG. 11A depicting the perspective view of the AR space after the 3D representation of the second virtual object has been repositioned to a second position and as the 3D representation of the first virtual object is being repositioned, at a fourth point in time, according to an embodiment.
Figure 14E:
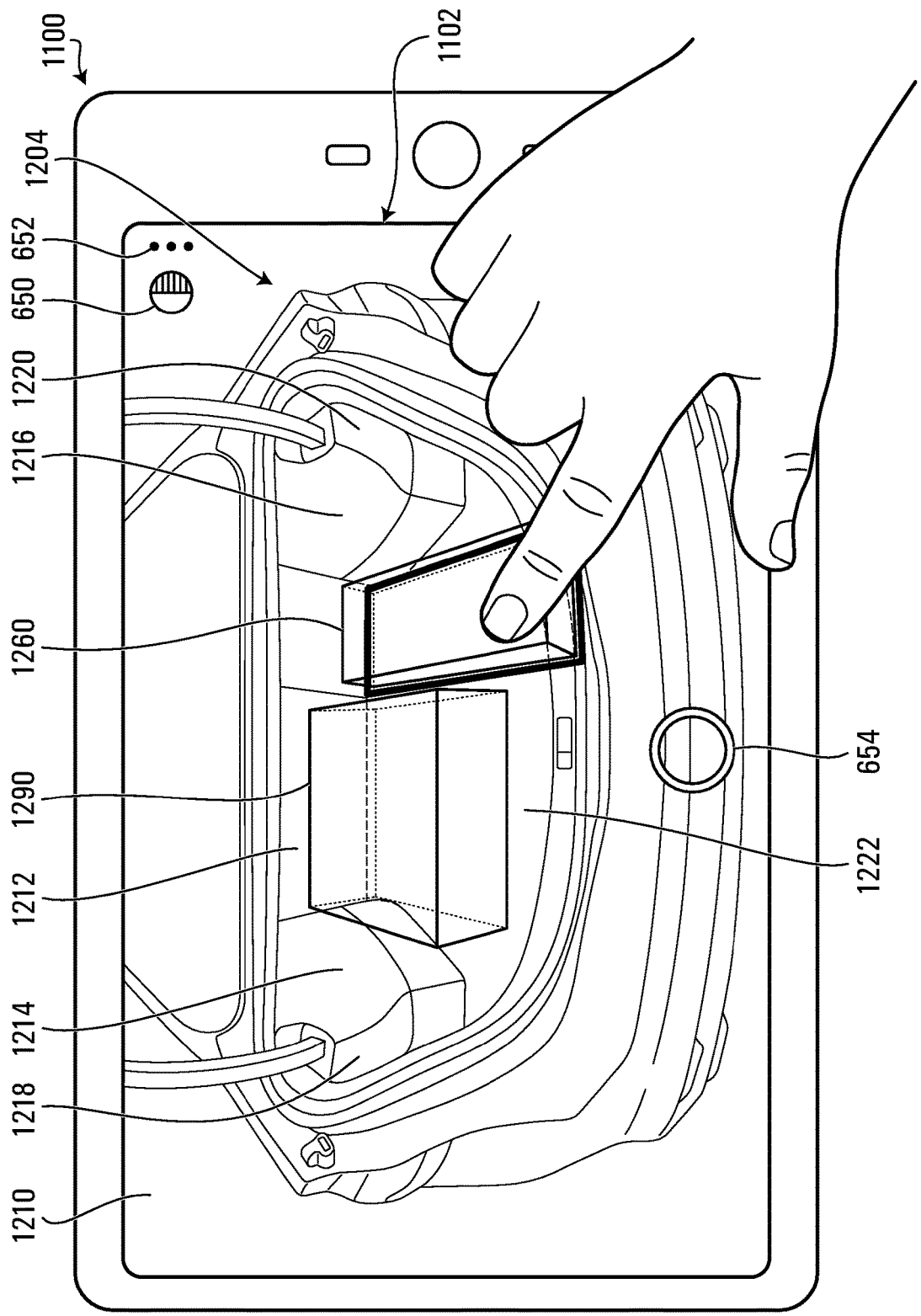
FIG. 14E illustrates the user device of FIG. 11A depicting a perspective view of the AR space after the 3D representation of the second virtual object has been repositioned to a second position and as the 3D representation of the first virtual object is being repositioned, at a fifth point in time, according to an embodiment.

FIGS. 14C-14E illustrate the user device 1100 depicting the perspective view of the AR space illustrated in FIG. 14A at various points in time as the user changes the location and/or orientation of the 3D representations of the two virtual objects 1260 and 1290 within the trunk 1204. In this example each of the virtual objects is repositionable in the AR space 1210 independent of the other to allow assessment of the 3D fit of the virtual objects 1260 and 1290 together within the trunk 1204 in different positions. For example, FIG. 14C illustrates the user device 1100 at an instant in time as the user 1250 is dragging the 3D representation of the second virtual object 1290 to a second position within the trunk 1204. FIG. 14D illustrates the user device 1100 depicting the perspective view of the AR space 1210 after the 3D representation of the second virtual object 1290 has been repositioned to its second position and as the 3D representation of the first virtual object 1260 is being repositioned by adjusting its orientation (e.g., by rotating it about an axis at its center that is perpendicular to the surface 1222 of the trunk 1204). FIG. 14E illustrates the user device 1100 depicting a perspective view of the AR space 1210 at a further point in time as the 3D representation of the first virtual object 1260 is being further repositioned by dragging it to a third position within the trunk 1204.

Figure 14F:
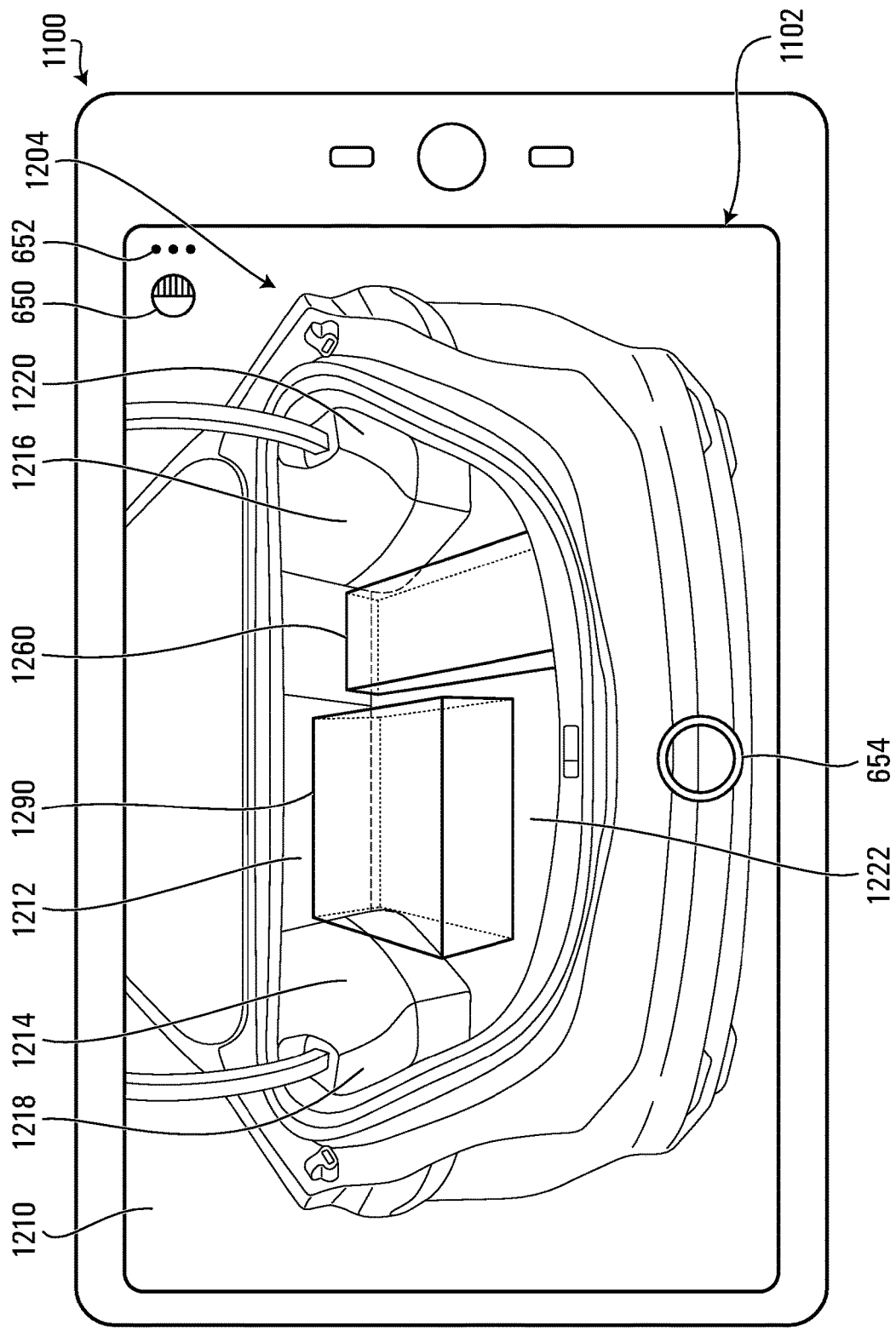
FIG. 14F illustrates the user device of FIG. 11A depicting a perspective view of the AR space after the 3D representation of the first virtual object has been repositioned to a third position within the AR space, according to an embodiment.

FIG. 14F illustrates the user device 1100 depicting a perspective view of the AR space 1210 after the 3D representations of the first and second virtual objects 1260 and 1290 have been independently repositioned to their respective third and second positions within the trunk 1204.

Figure 14G:
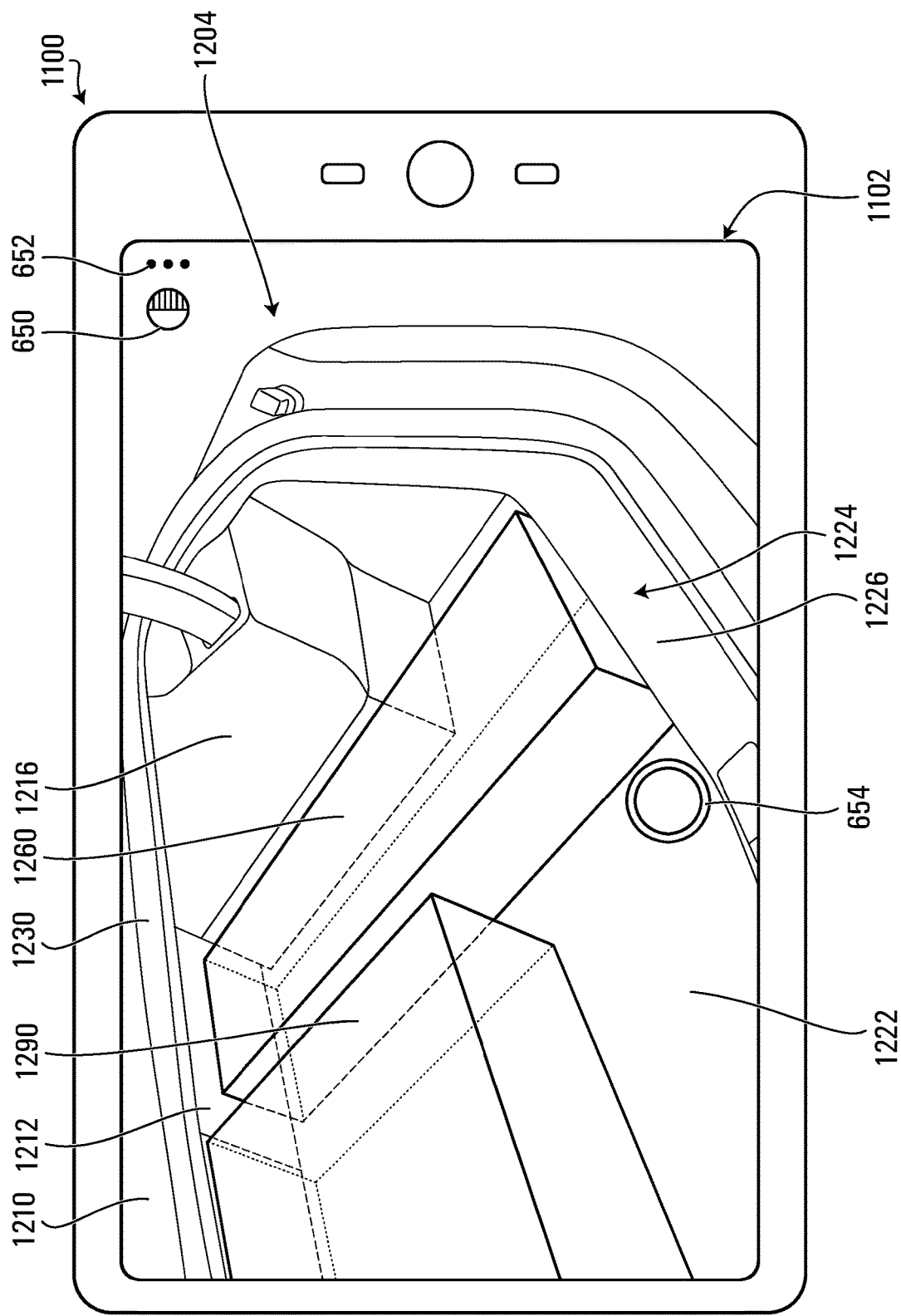
FIG. 14G illustrates the user device of FIG. 11A depicting an alternative perspective view of the AR space illustrated in FIG. 14F, according to an embodiment.

As discussed previously, in order to check the fit of the 3D representations of the first and second virtual objects 1260 and 1290 in the trunk 1204, the user 1250 may move within the physical environment 1200 in order to view the 3D representations of the virtual objects 1260 and 1290 from multiple perspectives. For example, FIG. 14G illustrates the user device 1100 depicting a different perspective view of the AR space 1210 with the 3D representations of the virtual objects 1260 and 1290 positioned in their respective third and second positions within the trunk 1204. In this example, the display of the 3D representations of the virtual objects 1260 and 1290 have been updated to reflect the new position of the user device 1100 relative to the 3D representations of the virtual objects 1260 and 1290. From the perspective illustrated in FIG. 14G, the user 1250 can see that the 3D representations of the virtual objects 1260 and 1290 appear to fit within the trunk 1204 without any collision.

Figure 14H:
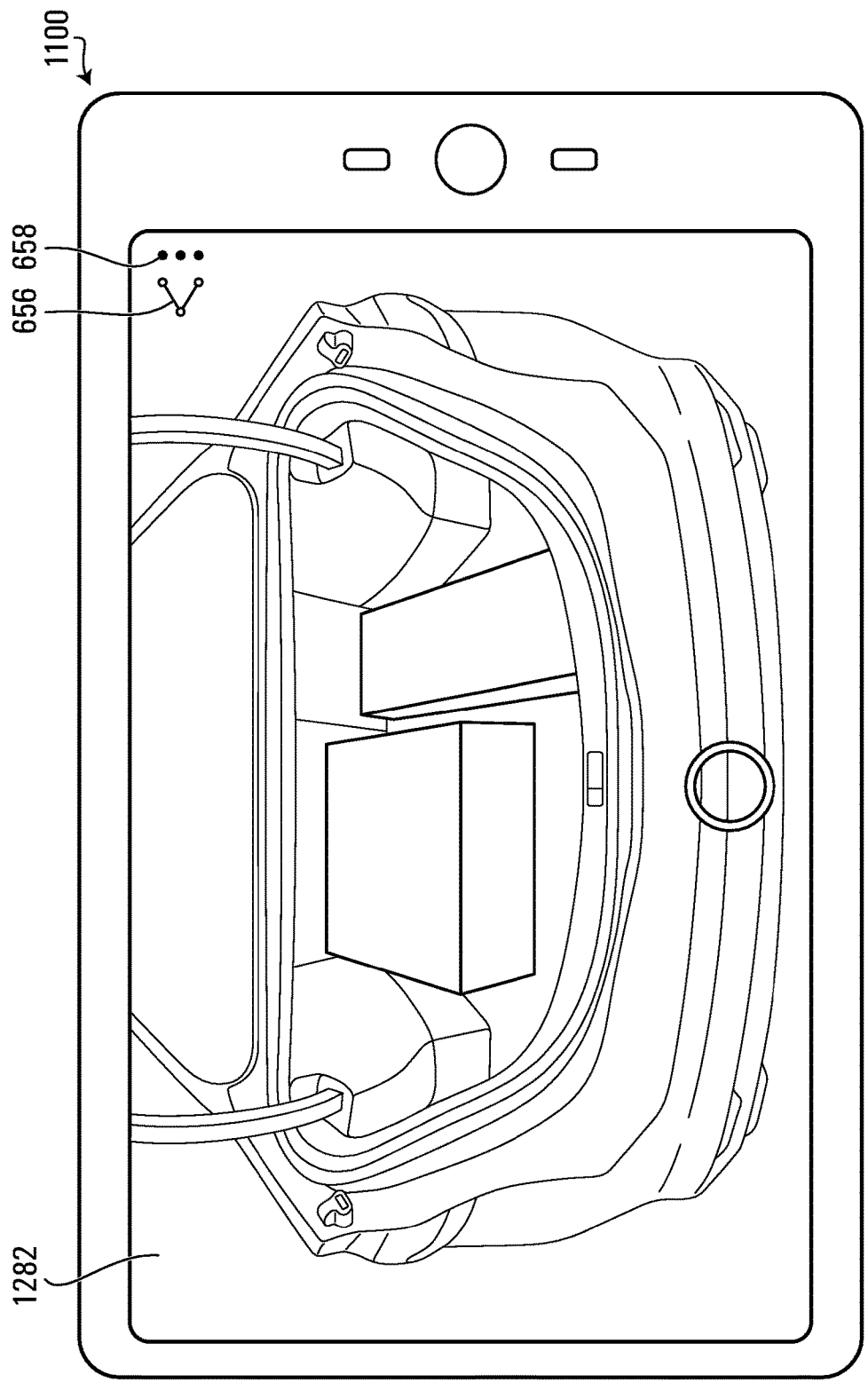
FIG. 14H illustrates the user device of FIG. 11A depicting an image captured by the user device of the AR space illustrated in FIG. 14G, but in which an opacity of the 3D representation of the virtual objects has been changed, according to an embodiment.

At this stage, the user 1250 may wish to capture an image or video that shows the 3D representations of the virtual objects 1260 and 1290 positioned within the trunk 1204. For example, FIG. 14H illustrates the user device 1100 depicting an image 1282 captured by the user device 1100 from the perspective illustrated in FIG. 14F, but in which the opacity of the 3D representations of the virtual objects 1260 and 1290 were changed so that they appear to be totally opaque.

In some cases, the user 1250 may wish to share the image 1282 with the merchant that provided the size link in the message exchange 1100 shown in FIG. 11. For example, the user 1250 may do so to let the merchant know how the user 1250 would like the physical boxes that are represented by the virtual objects 1260 and 1290 to be positioned within the trunk 1204 of the car 1202, e.g., for curbside pick-up.

Figure 15A:
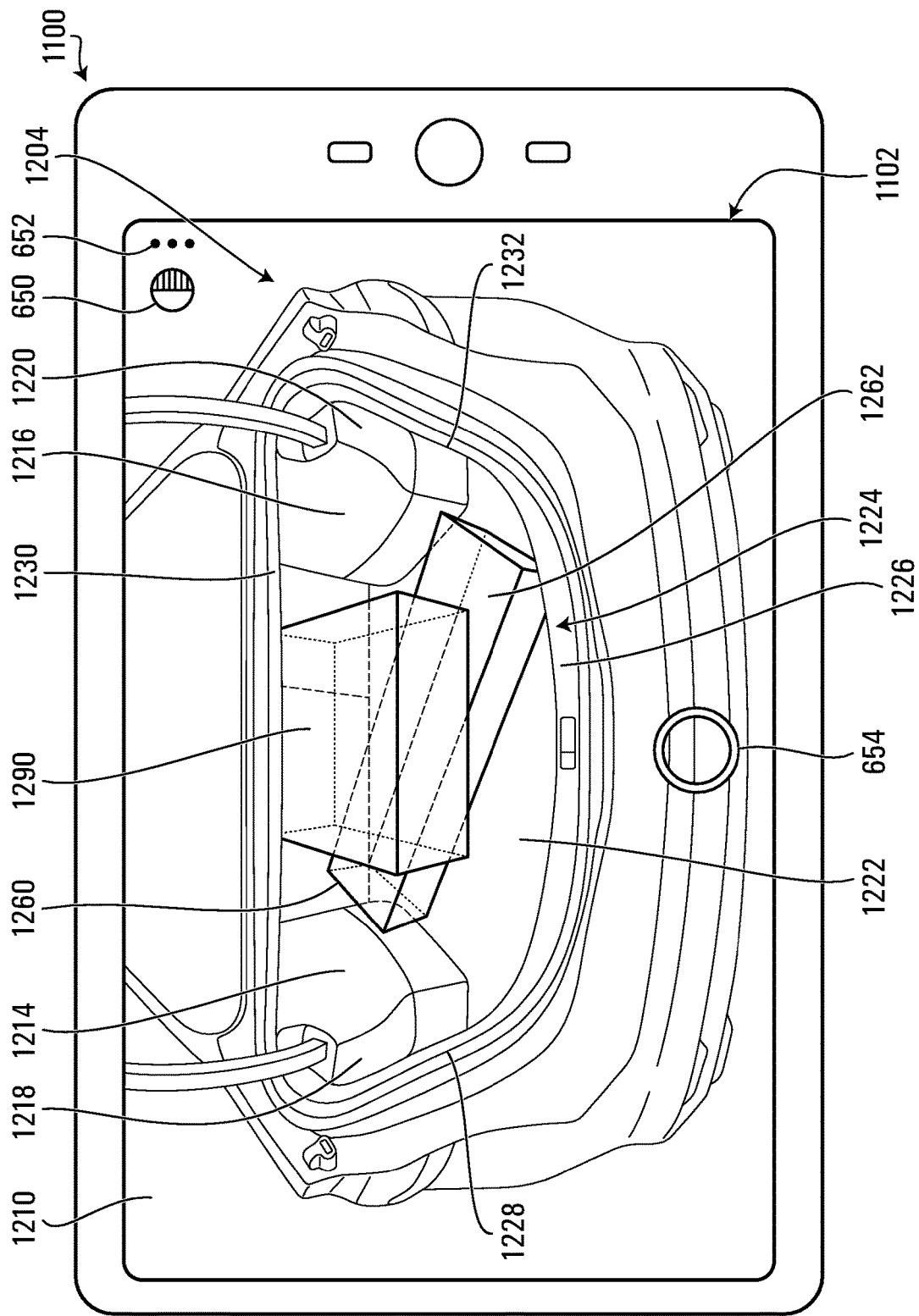
FIG. 15A illustrates the user device of FIG. 11A depicting the perspective view of the AR space illustrated in FIG. 14A, but with the 3D representation of the second virtual object initially placed at a different first position within the AR space, according to an embodiment.

Referring again to the example illustrated in FIG. 14A, it is noted that in that example the 3D representation of the second virtual object 1290 was initially placed in a first position adjacent to a portion of the surface 1222 of the floor of the trunk 1204 that was already occupied by the 3D representation of the first virtual object 1260. In other implementations, once a 3D representation of a virtual object has been positioned adjacent to a surface within an AR space, any portion of that surface that is occupied by the virtual object becomes unavailable for positioning a 3D representation of another virtual object. In other words, once a 3D representation of a virtual object has been positioned within an AR space, it may then be treated like a real physical object within the AR space. For example, in some implementations, surfaces of a 3D representation of a virtual object that has been positioned within an AR space may become available as surfaces adjacent to which 3D representations of other virtual objects can be positioned/anchored. For example, FIG. 15A illustrates the user device 1100 of FIG. 11A depicting the perspective view of the AR space illustrated in FIG. 11K, but with the addition of a 3D representation of the second virtual object 1290 at a first position within the AR space 1210 adjacent to the top surface 1262 of the 3D representation of the first virtual object 1260.

Figure 15B:
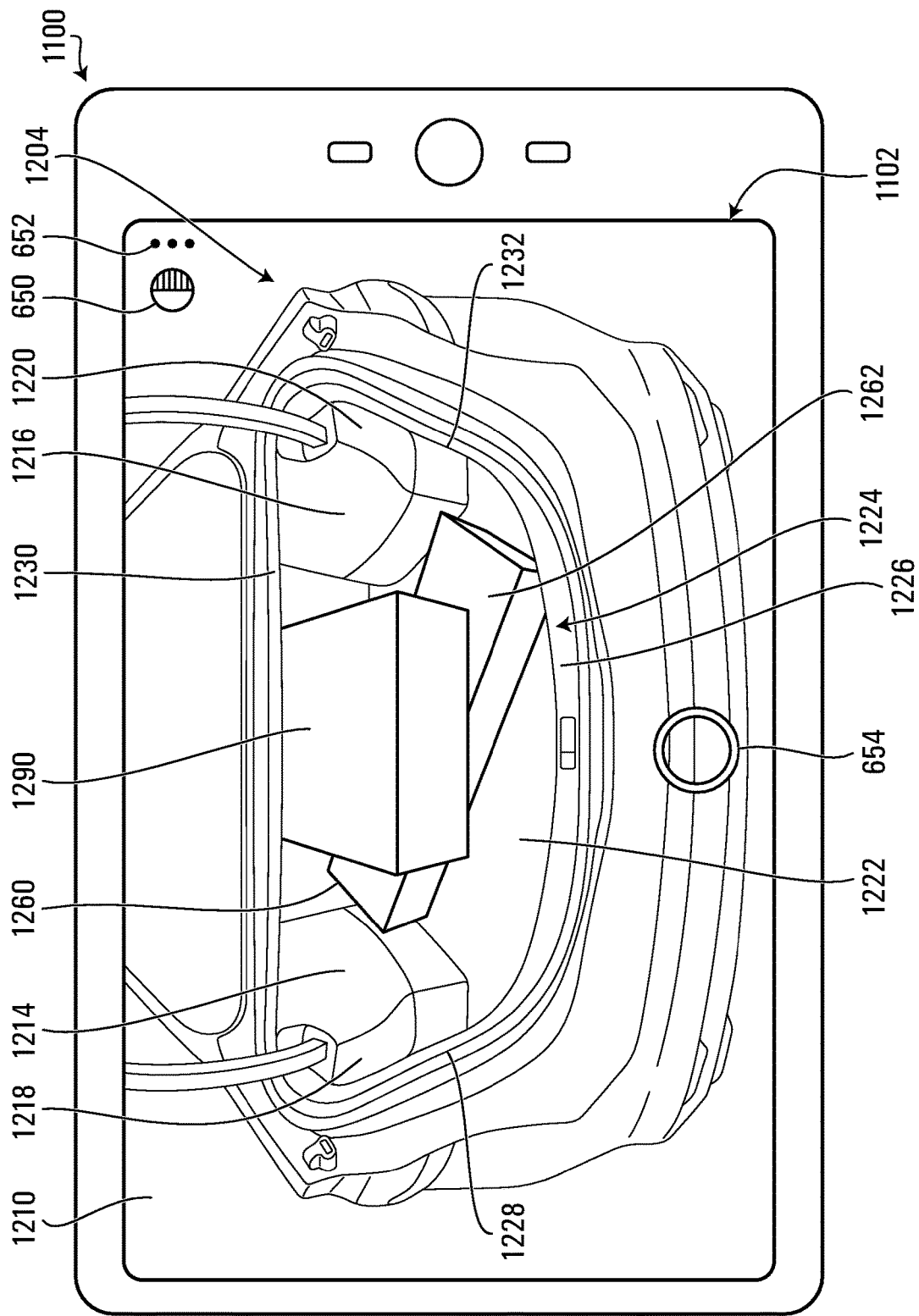
FIG. 15B illustrates the user device of FIG. 11A depicting the perspective view of the AR space illustrated in FIG. 15A, but in which an opacity of the 3D representation of the virtual objects has been changed, according to an embodiment.
Figure 15C:
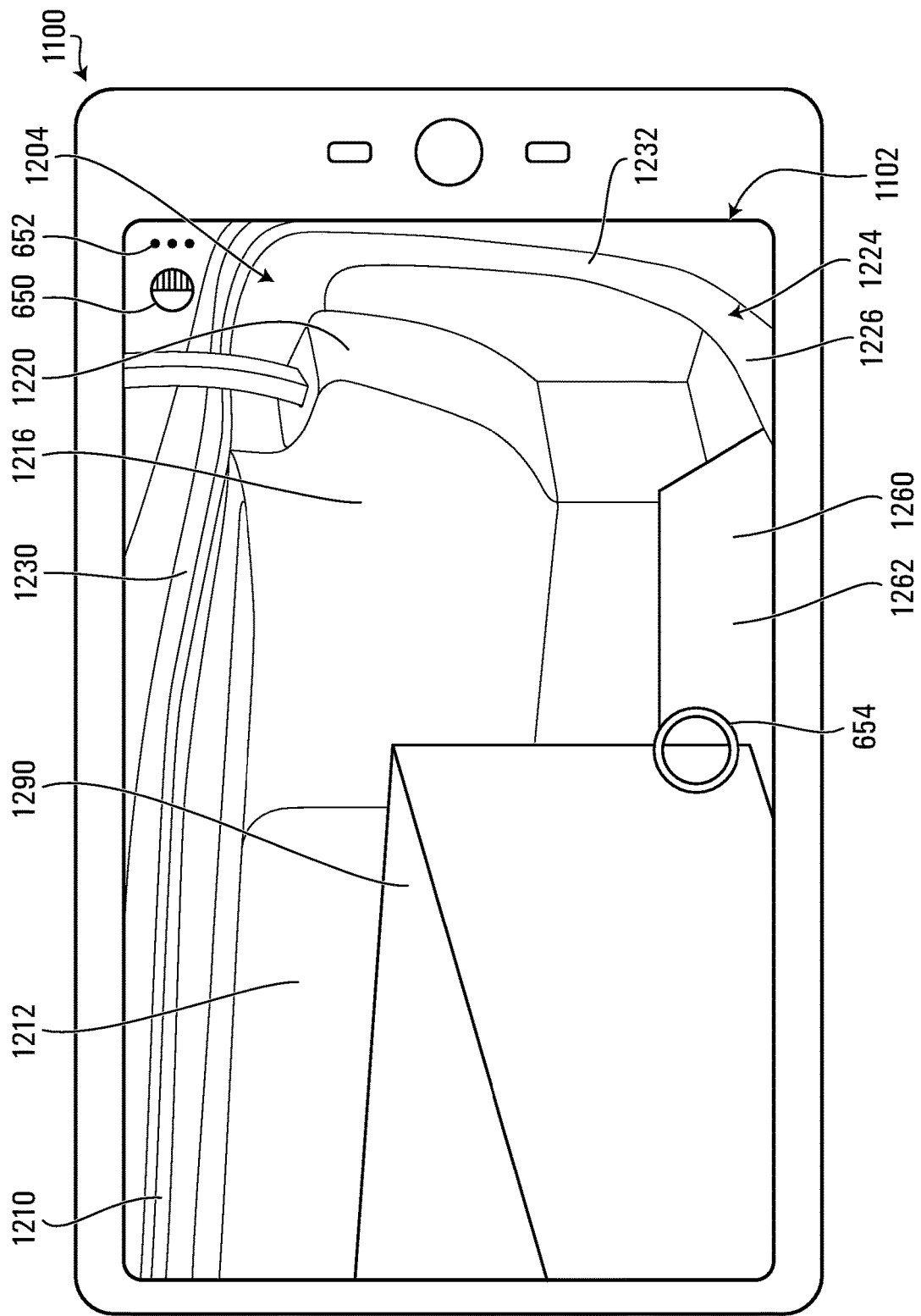
FIG. 15C illustrates the user device of FIG. 11A depicting an alternative perspective view of the AR space illustrated in FIG. 15B, according to an embodiment.

As noted earlier, in some cases in order to facilitate an assessment of the fit of one or more virtual objects within an AR space a user may change the display settings (e.g. activate/deactivate the blend feature and/or change the opacity with which 3D representations of virtual objects are displayed) and/or navigate within the AR space in order to view the virtual object(s) from multiple perspectives. For example, FIG. 15B illustrates the user device 1100 depicting the perspective view of the AR space 1210 illustrated in FIG. 15A, but in which the opacity of the 3D representations of the virtual objects 1260 and 1290 have been changed so that they are displayed as being opaque. As another example, FIG. 15C illustrates the user device 1100 depicting a different perspective view of the AR space 1210 of FIG. 15B. In this example, the display of the 3D representations of the virtual objects 1260 and 1290 have been updated to reflect the new position of the user device 1100 relative to the 3D representations of the virtual objects 1260 and 1290. From the perspective illustrated in FIG. 15C, the user 1250 can see that the 3D representations of the virtual objects 1260 and 1290 appear to fit within the trunk 1204 without any collision in this arrangement.

In some embodiments, a user's interaction with a 3D representation of a virtual object in order to adjust the location and/or orientation of the 3D representation of the virtual object within an AR space may be limited to prevent a placement of the virtual object that would result in a collision with at least one boundary of the 3D bounded space. With this feature, a user may only be permitted to position a 3D representation at locations and orientations that would not result in any collision. In many of the foregoing examples the user has adjusted the position of a 3D representation of a virtual object by rotating it about an axis perpendicular to a surface of the AR space and/or by sliding the 3D representation of the virtual object in a plane parallel to a surface of the AR space. In some cases, a user may also or instead be able to rotate a 3D representation of a virtual object about two or more axes. For example, referring again to FIG. 9C, in addition to being rotatable about the z-axis, which is perpendicular to the plane of the floor 908 in this example, the 3D representation of the virtual object 940 may also be rotatable about an axis that is perpendicular to x-z plane (i.e., parallel to the y-axis) and passes through its center and/or it may be rotatable about an axis that is perpendicular to y-z plane (i.e., parallel to the x-axis) and passes through its center. In this example, rotating the 3D representation of the virtual object 940 about an axis that passes through its center and is perpendicular to the x-z plane effectively switches its width and height dimensions. Similarly, rotating the 3D representation of the virtual object 940 about an axis that passes through its center and is perpendicular to the y-z plane effectively switches its length and height dimensions.

Methods and apparatuses disclosed herein leverage augmented reality to enable an AR-capable device to assist a user in assessing the fit of physical objects in 3D spaces that are bounded in one or more dimensions. This allows a user to assess virtually whether a physical object that may be physically remote from the operational environment of the AR-capable device will fit within a bounded 3D space within the field of view of the AR-capable device. As demonstrated above, such capability is advantageous in a wide variety of applications in which physical goods must be moved from one location to another.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. An augmented reality-assisted method of assessing fit of physical objects in three-dimensional bounded spaces, the method comprising:
obtaining, by an augmented reality (AR) device, three-dimensional (3D) dimensions of a virtual object representative of a real-world physical object;
displaying a 3D representation of the virtual object in an augmented reality space depicted by a user interface of the AR device, the AR space being representative of a real-world physical environment in a field of view of the AR device, the 3D representation of the virtual object being proportionally dimensioned relative to the physical environment based on the obtained 3D dimensions of the virtual object;
obtaining, by the AR device, boundaries of a 3D bounded space within the physical environment in the field of view of the AR device;
determining, by the AR device, whether the virtual object, in its current position within the 3D bounded space of the physical environment, collides with any boundary of the 3D bounded space; and
providing, by the AR device, one or more indicators based on whether the virtual object fits within the 3D bounded space in its current position without colliding with any boundary of the 3D bounded space,
wherein the virtual object is interactively repositionable in the AR space responsive to input received by the AR device while the virtual object is displayed in the AR space, and wherein the virtual object is interactively translatable relative to the AR space and interactively rotatable in the AR space about two or more axes responsive to input received by the AR device while the virtual object is displayed in the AR space to allow assessment of 3D fit of the virtual object within the physical environment in different positions,
wherein providing the one or more indicators comprises displaying, within the user interface of the AR device, one or more indicators based on whether the virtual object fits within the 3D bounded space in its current position without colliding with any boundary of the 3D bounded space,
wherein displaying one or more indicators comprises, after determining that the virtual object, in its current position within the 3D bounded space, currently collides with at least one boundary of the 3D bounded space, displaying one or more visual indicators on the user interface to indicate where the at least one collision occurs within the AR space such that portions of the virtual object that, in the current position of the virtual object within the 3D bounded space, are within a colliding portion are visually distinguished from a remainder of the virtual object in order to highlight the collision, and
wherein providing one or more indicators further comprises, after determining that the virtual object cannot be fit within the 3D bounded space without colliding with at least one boundary of the 3D bounded space, displaying a visual indicator on the user interface of the AR device to allow selection of an alternative transportation option for the physical object.

2. The method of claim 1, wherein the 3D bounded space within the physical environment is defined by a potential transportation receptacle for the physical object.

3. The method of claim 2, further comprising:
after determining that the virtual object fits within the 3D bounded space in its current position without colliding with any boundary of the 3D bounded space, capturing an image of the AR space with the virtual object placed within the 3D bounded space in its current position; and
transmitting the image for display on a transportation service device to convey how the physical object is to be placed within the 3D bounded space of the physical environment for transportation of the physical object.

4. The method of claim 1 wherein the one or more indicators further comprise one or more of a haptic indication or an auditory indication.

5. The method of claim 1, wherein providing one or more indicators further comprises:
after determining that the virtual object collides with at least one boundary of the 3D bounded space in its current position and displaying the one or more visual indicators on the user interface to indicate where the at least one collision occurs within the AR space, automatically repositioning the virtual object to a second position within the 3D bounded space in which the virtual object fits within the 3D bounded space without colliding with any boundary of the 3D bounded space.

6. The method of claim 1, wherein the virtual object is a first virtual object, the method further comprising:

obtaining, by the AR device, 3D dimensions of a second virtual object; and displaying 3D representations of the first virtual object and the second virtual object in the AR space depicted by the user interface of the AR device, wherein the second virtual object is repositionable in the AR space independent of the first virtual object responsive to input received by the AR device to allow assessment of the 3D fit of the virtual objects together within the physical environment in different positions.

7. The method of claim 6, the method further comprising:

after determining that the first virtual object and the second virtual object fit within the 3D bounded space in their current positions without colliding with any boundary of the 3D bounded space, capturing one or more images of the AR space, the one or more images of the AR space comprising at least one image of the first virtual object placed within the 3D bounded space in its current position; and transmitting the at least one image for display on a transportation service device to convey how the physical object is to be placed within the 3D bounded space of the physical environment for transportation of the physical object.

8. The method of claim 7, wherein:

the one or more images of the AR space further comprises at least one further image of the first virtual object and the second virtual object placed within the 3D bounded space in their current positions; and the method further comprises transmitting the at least one further image.

9. The method of claim 1, wherein obtaining boundaries of the 3D bounded space comprises:

obtaining 3D dimensions of the 3D bounded space using one or more sensor systems of the AR device.

10. The method of claim 9, wherein the one or more sensor systems of the AR device include one or more of:

a light detection and ranging (lidar) sensor system;
a radar sensor system;
a depth camera; or
a multi-camera system.

11. An apparatus comprising:

memory to store three-dimensional (3D) dimensions of a virtual object representative of a real-world physical object;

a user interface configured to depict an augmented reality (AR) space representative of a real-world physical environment in a field of view of the apparatus;

one or more sensor systems to obtain boundaries of a 3D bounded space within the physical environment in the field of view of the apparatus;

a user-operable input element configured to receive user input; and at least one processor configured to:

cause the user interface to display a 3D representation of the virtual object in the AR space depicted by the user interface, the 3D representation of the virtual object being proportionally dimensioned relative to the physical environment based on the 3D dimensions of the virtual object;

determine whether the virtual object, in its current position within the 3D bounded space of the physical environment, collides with any boundary of the 3D bounded space; and provide one or more indicators based on whether the virtual object fits within the 3D bounded space in its current position without colliding with any boundary of the 3D bounded space, wherein the virtual object is interactively repositionable in the AR space responsive to input received by the user-operable input element while the virtual object is displayed in the AR space, and wherein the virtual object is interactively translatable relative to the AR space and interactively rotatable in the AR space about two or more axes responsive to input received by the user-operable input element while the virtual object is displayed in the AR space to allow assessment of 3D fit of the virtual object within the physical environment in different positions, wherein the at least one processor is configured to provide the one or more indicators by, after determining that the virtual object, in its current position within the 3D bounded space, currently collides with at least one boundary of the 3D bounded space, causing the user interface to display one or more visual indicators to indicate where the at least one collision occurs within the AR space such that portions of the virtual object that, in the current position of the virtual object within the 3D bounded space, are within a colliding portion are visually distinguished from a remainder of the virtual object in order to highlight the collision, and wherein the at least one processor is further configured to, after determining that the virtual object cannot be fit within the 3D bounded space without colliding with at least one boundary of the 3D bounded space, causing the user interface to display a visual indicator to allow selection of an alternative transportation option for the physical object.

12. The apparatus of claim 11, wherein the 3D bounded space within the physical environment is defined by a potential transportation receptacle for the physical object.

13. The apparatus of claim 12, wherein the at least one processor is further configured to:

after determining that the virtual object fits within the 3D bounded space in its current position without colliding with any boundary of the 3D bounded space, capture an image of the AR space with the virtual object placed within the 3D bounded space in its current position; and transmit the image for display on a transportation service device to convey how the physical object is to be placed within the 3D bounded space of the physical environment for transportation of the physical object.

14. The apparatus of claim 11 wherein the one or more indicators further comprise one or more of a haptic indication or an auditory indication.

15. The apparatus of claim 11, wherein the at least one processor is further configured to:

after determining that the virtual object collides with at least one boundary of the 3D bounded space in its current position and causing the user interface to display the one or more visual indicators on the user interface to indicate where the at least one collision occurs within the AR space, automatically reposition the virtual object to a second position within the 3D bounded space in which the virtual object fits within the 3D bounded space without colliding with any boundary of the 3D bounded space.

16. The apparatus of claim 11, wherein:

the virtual object is a first virtual object;
the memory stores 3D dimensions of a second virtual object; and the at least one processor is further configured to cause the user interface to display 3D representations of the first virtual object and the second virtual object in the AR space,
wherein the second virtual object is repositionable in the AR space independent of the first virtual object responsive to input received by the user-operable input element to allow assessment of the 3D fit of the virtual objects together within the physical environment in different positions.

17. The apparatus of claim 16, wherein the at least one processor is further configured to:
   after determining that the first virtual object and the second virtual object fit within the 3D bounded space in their current positions without colliding with any boundary of the 3D bounded space, capture one or more images of the AR space, the one or more images of the AR space comprising at least one image of the first virtual object placed within the 3D bounded space in its current position; and
   transmit the at least one image for display on a transportation service device to convey how the physical object is to be placed within the 3D bounded space of the physical environment for transportation of the physical object.

18. The apparatus of claim 17, wherein:
   the one or more images of the AR space further comprises at least one further image of the first virtual object and the second virtual object placed within the 3D bounded space in their current positions; and
   the at least one processor is further configured to transmit the at least one further image.

19. The apparatus of claim 11, wherein the one or more sensor systems include one or more of:
   a light detection and ranging (lidar) sensor system;
   a radar sensor system;
   a depth camera; or
   a multi-camera system.

20. A non-transitory computer readable medium storing computer executable instructions which, when executed by at least one processor of an augmented reality (AR) device, cause the AR device to:
   obtain three-dimensional (3D) dimensions of a virtual object representative of a real-world physical object;
   display a 3D representation of the virtual object in an augmented reality space depicted by a user interface of the AR device, the AR space being representative of a real-world physical environment in a field of view of the AR device, the 3D representation of the virtual object being proportionally dimensioned relative to the physical environment based on the obtained 3D dimensions of the virtual object;
   obtain boundaries of a 3D bounded space within the physical environment in the field of view of the AR device;
   determine whether the virtual object, in its current position within the 3D bounded space of the physical environment, collides with any boundary of the 3D bounded space; and
   provide one or more indicators based on whether the virtual object fits within the 3D bounded space in its current position without colliding with any boundary of the 3D bounded space,
   wherein the virtual object is interactively repositionable in the AR space responsive to input received by the AR device while the virtual object is displayed in the AR space, and wherein the virtual object is interactively translatable relative to the AR space and interactively rotatable in the AR space about two or more axes responsive to input received by the AR device while the virtual object is displayed in the AR space to allow assessment of 3D fit of the virtual object within the physical environment in different positions,
   wherein providing the one or more indicators comprises displaying, within the user interface of the AR device, one or more indicators based on whether the virtual object fits within the 3D bounded space in its current position without colliding with any boundary of the 3D bounded space,
   wherein displaying one or more indicators comprises, after determining that the virtual object, in its current position within the 3D bounded space, currently collides with at least one boundary of the 3D bounded space, displaying one or more visual indicators on the user interface to indicate where the at least one collision occurs within the AR space such that portions of the virtual object that, in the current position of the virtual object within the 3D bounded space, are within a colliding portion are visually distinguished from a remainder of the virtual object in order to highlight the collision, and
   wherein providing one or more indicators further comprises, after determining that the virtual object cannot be fit within the 3D bounded space without colliding with at least one boundary of the 3D bounded space, displaying a visual indicator on the user interface of the AR device to allow selection of an alternative transportation option for the physical object.

* * * * *